(12) United States Patent
Kotovsky

(10) Patent No.: US 8,109,149 B2
(45) Date of Patent: Feb. 7, 2012

(54) CONTACT STRESS SENSOR

(75) Inventor: Jack Kotovsky, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 552 days.

(21) Appl. No.: 12/274,253

(22) Filed: Nov. 19, 2008

(65) Prior Publication Data

US 2009/0223299 A1    Sep. 10, 2009

Related U.S. Application Data

(63) Continuation-in-part of application No. 11/869,874, filed on Oct. 10, 2007, which is a continuation of application No. 11/143,543, filed on Jun. 1, 2005, now Pat. No. 7,311,009.

(60) Provisional application No. 60/629,271, filed on Nov. 17, 2004.

(51) Int. Cl.
*G01L 1/18* (2006.01)
(52) U.S. Cl. .................. 73/777; 438/51; 438/53
(58) Field of Classification Search .......... 73/777, 73/774, 763
See application file for complete search history.

(56) References Cited

U.S. PATENT DOCUMENTS

| | | | | |
|---|---|---|---|---|
| 4,889,590 A | * | 12/1989 | Tucker et al. | 73/721 |
| 5,488,869 A | * | 2/1996 | Renaud | 73/754 |
| 6,959,608 B2 | * | 11/2005 | Bly et al. | 73/754 |

OTHER PUBLICATIONS

Fukang Jiang; Yu-Chong Tai; Walsh, K.; Tsao, T.; Gwo-Bin Lee; Chih-Ming Ho, "A flexible MEMS technology and its first application to shear stress sensor skin," Micro Electro Mechanical Systems, 1997. MEMS '97, Proceedings, IEEE., Tenth Annual International Workshop on, pp. 465-470, Jan. 26-30, 1997.*

Jonathan Engel; Jack Chen; and Chang Liu, "Development of polyimide flexible tactile sensor skin," J. Micromach. Microeng. 13, Feb. 24, 2003, pp. 359-366.*

* cited by examiner

*Primary Examiner* — Lisa Caputo
*Assistant Examiner* — Punam Roy

(57) ABSTRACT

A contact stress sensor includes one or more MEMS fabricated sensor elements, where each sensor element of includes a thin non-recessed portion, a recessed portion and a pressure sensitive element adjacent to the recessed portion. An electric circuit is connected to the pressure sensitive element. The circuit includes a thermal compensator and a pressure signal circuit element configured to provide a signal upon movement of the pressure sensitive element.

54 Claims, 47 Drawing Sheets

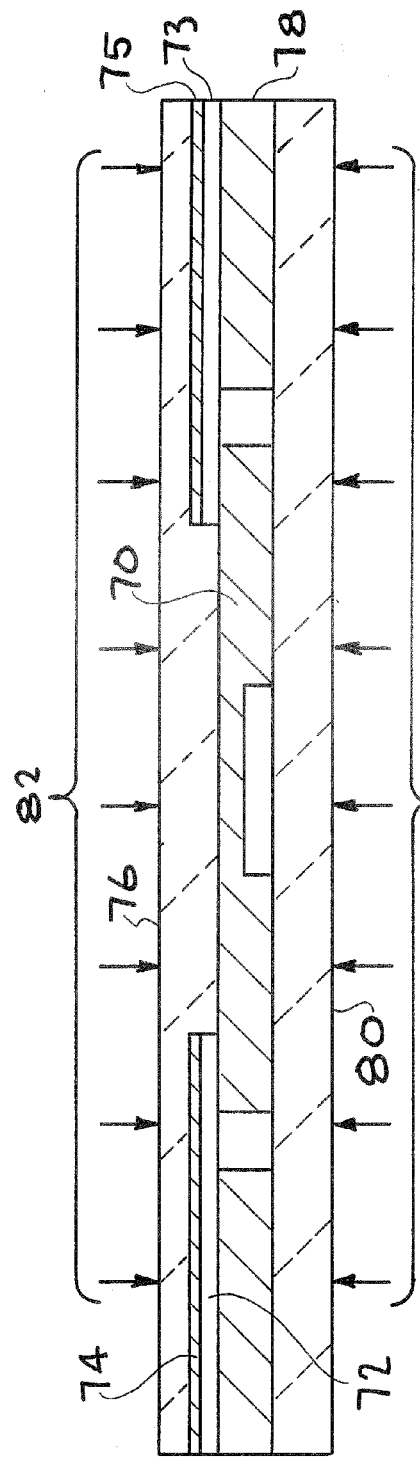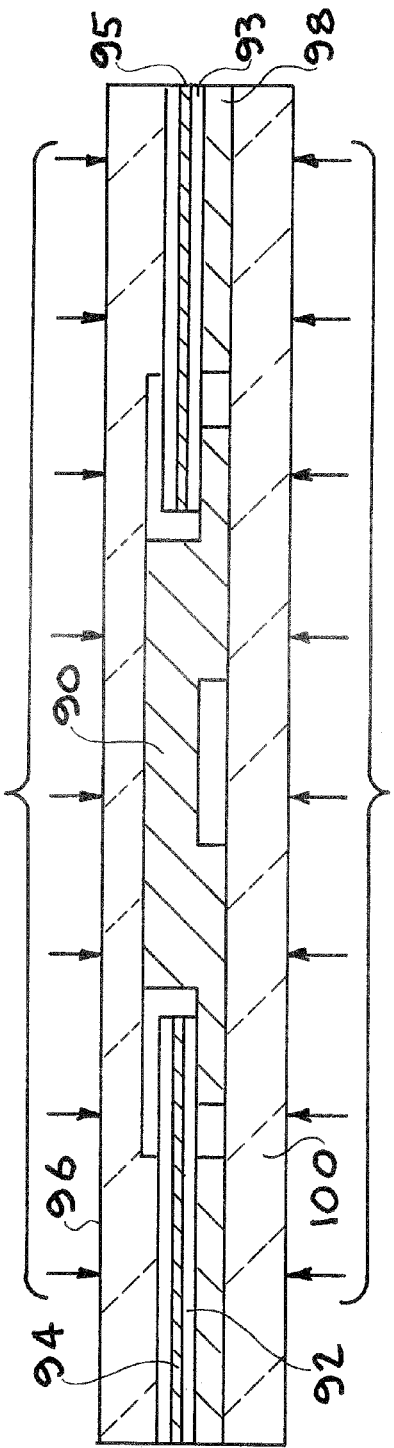

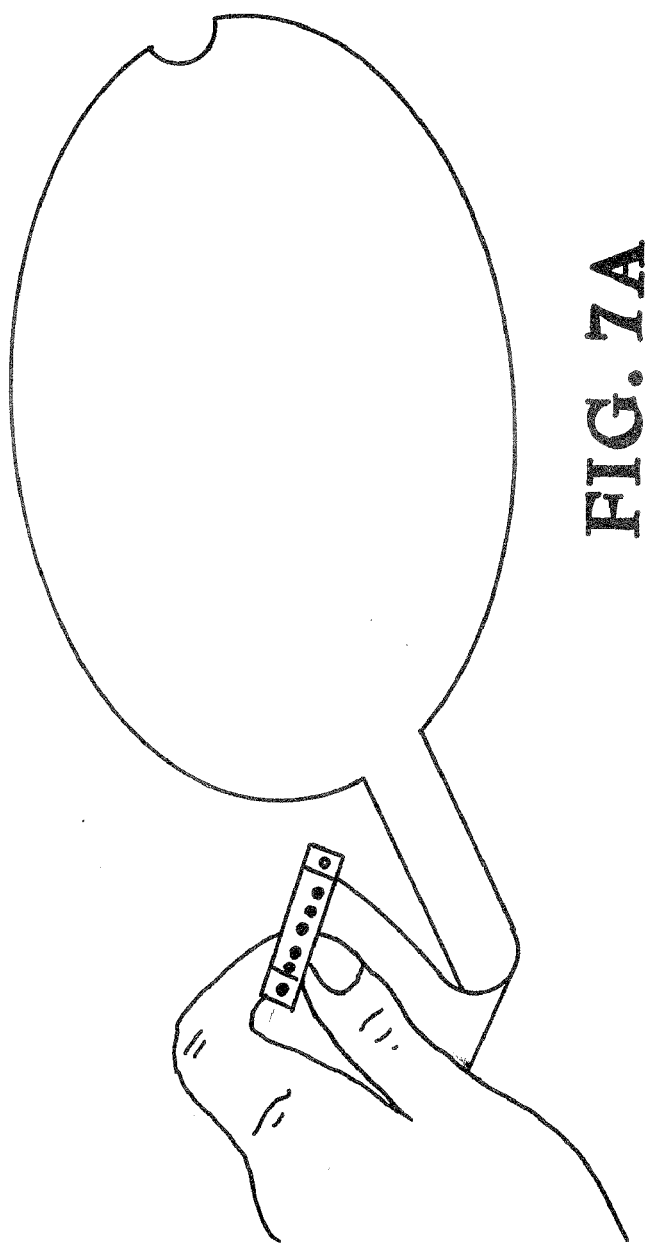

CONTACT STRESS SENSOR

This application is a continuation-in-part of U.S. patent application Ser. No. 11/869,874, titled: "Microelectromechanical Systems Contact Stress Sensor," filed Oct. 10, 2007, incorporated herein by reference, which is a continuation of U.S. patent application Ser. No. 11/143,543, filed Jun. 1, 2005, now U.S. Pat. No. 7,311,009, incorporated herein by reference, which claims priority to U.S. Provisional Patent Application Ser. No. 60/629,271, filed Nov. 17, 2004, incorporated herein by reference.

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to microelectromechanical systems (MEMS) processing technology, and more specifically, it relates to embodiments of contact stress/pressure sensors formed by MEMS processes.

2. Description of Related Art

Many industrial applications and research projects require the stress normal to contacting surfaces to be known. Several examples include: designing rollers, designing gaskets and seals, robotic tactile sensors, prosthetics, shoes, surgical instruments, automotive crash tests, brake pads and cartilage studies. There are currently three methods for determining the stresses between contacting surfaces: analytic calculation, computational methods and direct measurement (1). General contact problems are very difficult to solve analytically as geometries and material properties are typically complex and not necessarily known. If these characteristics are known, complex shapes and irregular and changing contact areas are extremely difficult to model. Additionally, deformation of contacting surfaces introduce non-linearities that typically make analytic approaches very difficult or impossible to solve. Computationally, among solid stress/strain modeling efforts, contact problems are considered the most difficult to model. Similar to analytic methods, modeling of complex and/or compliant surfaces is a very difficult and computationally intensive problem. Very large deformations and slip between surfaces add further difficulty for Finite Element Analysis (FEA). Even when it can be used, FEA benefits from direct measurement of contact stress for model validation. Due to the difficulty or impossibility of predicting contact stresses by analytic or computational methods, direct measurement of contact stress is often the only means by which they may be known. Thus, a distinct and very broad need for measurement instrumentation exists. Despite the widespread need for contact stress measurement instrumentation, great progress remains to be made towards the development of contact stress sensors.

SUMMARY OF THE INVENTION

The invention is a minimal thickness contact stress sensor and includes a variety of embodiments configured as a single sensor or as an array of sensors. Use is made of a silicon sensing element that has excellent elasticity, long term stability, sensitivity and bandwidth. The devices enable short and long term applications of either static or dynamic measurements.

An embodiment of the invention is a contact stress sensor that includes one or more sensor elements, wherein each sensor element of said sensor elements includes a non-recessed portion no thicker than 280 µm, a recessed portion and a pressure sensitive element adjacent to said recessed portion; and an electric circuit operatively connected to said pressure sensitive element, wherein said circuit includes a thermal compensator and further includes a pressure signal circuit element configured to provide a signal upon movement of said pressure sensitive element. The one or more sensor elements comprises a configuration selected from the group consisting of a single sensor element and a plurality of sensor elements and may further comprise a package within which said sensor element is located, wherein said package comprises a thickness no greater than 300 µm. The plurality of sensor elements can be configured in an array selected from the group consisting of a one dimensional array and a two dimensional array. MEMS processing technology is utilized to manufacture the elements of the present invention. The MEMS process may comprise anisotropic etching. The sensor element usually comprises silicon and particularly may comprise a single crystal of silicon. The pressure sensitive element can take a variety of shapes. Exemplary embodiments of the pressure sensitive element are described herein as a diaphragm or a cantilever. The pressure sensitive element can be manufactured by a wafer processing technology such as wet cleans, photolithography, ion implantation (wherein at least one dopant is embedded in said sensor element to create a region of increased or decreased conductivity), dry etching, wet etching, plasma ashing, a thermal treatment (selected from the group consisting of a rapid thermal anneal, a furnace anneal and thermal oxidation), chemical vapor deposition, physical vapor deposition, molecular beam epitaxy, electrochemical deposition, chemical-mechanical planarization, wafer testing and wafer backgrinding.

In an embodiment of the present invention the contact stress sensor is packaged and the package may comprise a base layer, a mid-layer with an opening for said sensor element, and a capping layer, wherein said mid-layer is between said base layer and said capping layer. A conductive trace can be located between said base layer and said mid-layer and is in electrical contact with said electrical circuit. The base layer, said mid-layer and said capping layer can comprise polyimide and solder may be located between said conductive trace and said circuit. In some embodiments, the base layer comprises polymer, wherein said mid-layer and said capping layer each comprise at least one adhesive layer and at least one polymer layer. The mid-layer may further comprise a solder shim layer configured to uniformly support said sensor element between said sensor element and said conductive trace. The solder shim layer is a means for providing a deterministic solder thickness between said sensor element and said conductive trace. In some embodiments, the conductive trace is in movable electrical contact with said electric circuit. For example, the conductive trace may not be bonded to said electric circuit. Some embodiments include a means for relieving residual stress curl of said package.

Exemplary embodiments of the contact stress sensor include a diaphragm, which may or may not be sealed to create a reference volume. The package or sensor element can include a load amplification element in operative contact with said pressure sensitive element. This load amplification element may be an electroplated bump. The exemplary electric circuit comprises boron implanted into said pressure sensitive element, wherein said boron has been annealed. In some embodiments, the pressure sensitive element comprises a diaphragm, the thermal compensator comprises at least one piezoelectric circuit operatively placed on said diaphragm, wherein said pressure signal circuit element comprises at least one piezoelectric circuit operatively placed on said diaphragm. A single crystal of silicon is often used for the sensor element and comprises a <100> crystalline axis and a <110> crystalline axis, wherein said thermal compensator is operatively placed on said <100> crystalline axis and wherein said pressure signal circuit element is operatively placed on said <110> crystalline axis. In some cases, the thermal compensator comprises a first pair of piezoelectric (PZT) circuits located about 180 degrees apart and wherein said pressure signal circuit element comprises a second pair of PZT circuits located about 180 degrees apart, and may be further limited such that at least one of said first pair and said second pair include a circuit element selected from the group consisting of a half bridge and a Wheatstone bridge. In some cases where the pressure sensitive element comprises a diaphragm, the thermal compensator comprises at least one piezoelectric circuit placed on said non-recessed portion, wherein said pressure signal circuit element comprises at least one piezoelectric circuit operatively placed on said diaphragm.

Regarding the packaging, in some cases at least one of said base layer, said mid-layer or said capping layer comprises a B-stage polyimide. The B-stage polyimide can comprise a conductor-clad laminate which may be a copper-clad laminate. A compliant layer may be attached to said base layer on the side of said base layer opposite to that of said mid-layer.

A variety of alternates may be included with the basic embodiments described. For example, at least one electric pad may be operatively attached to said electric circuit. The sensor element may includes at least a second recessed portion, wherein an electric pad of said at least one electric pad is affixed within said second recessed portion. The sensor elements may include means for connecting said plurality of sensor elements together and such means for connecting may comprise a flexible interconnect, including an electrical trace, which may be embedded in polymer. The flexible interconnect may comprises a metal trace on a silicon spring. The thermal compensator can be an element spatially separated from said sensor element. If the pressure sensor element is a cantilever, it can be formed by anisotropic etching of silicon. The invention includes methods of manufacturing all of the embodiments and variations described above.

Another exemplary embodiment of the invention is a contact stress sensor including a package having a thickness no greater than 300 µm; and a sensor element within said package, wherein said sensor element comprises: an elastic body including a recessed portion and a pressure sensitive element, wherein said pressure sensitive element extends over at least a portion of said recessed portion and is in contact with said package; means for sensing pressure, wherein said means for sensing pressure is operatively connected to said pressure sensitive element; and means for providing thermal compensation to said means for sensing pressure. The means for sensing pressure can comprise an electrical circuit which generally includes a piezoresistor material. In another embodiment, the means for sensing pressure comprises a capacitive sensor. The sensor element may have a thickness no greater than 280 µm. The package may be flexible or rigid. The rigid package may comprise a material selected from the group consisting of ceramic, metal, and plastic. The plastic may be a hard plastic or an epoxy based plastic. In some cases, the package has a thickness no greater than 100 µm. The flexible package may comprise a material selected from the group consisting of polymide, silicone and mylar.

Many variations apply to this embodiment also. For example, the pressure sensitive element may comprise a configuration selected from a group consisting of a cantilever and a diaphragm. The elastic body may comprise silicon. The elastic body may comprise a thickness no greater than 100 µm. The pressure sensitive element may also comprise silicon. The pressure sensitive element may comprise a thickness no greater than 50 µm. The sensor element may have a thickness no greater than 55 µm. The package can be configured to eliminate load risers to maintain a constant thickness. The means for providing thermal compensation can be selected from the group consisting of a full wheat-stone bridge, a half wheat-stone bridge and a temperature device. The package can comprise a material that is stretchable to conform to the surface of an object that has a complex curvature. Additional contact stress sensors can be combined together and may or may not be formed into a one or two dimensional array. A variety of flexible and rigid interconnects are disclosed to connect the contact stress sensors. See "MEMS Contact Stress Sensing", by Jack Kotovsky, Dissertation, Doctor of Philosophy in Mechanical Engineering, University Of California, Davis, incorporated herein by reference.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 6A is a side cutaway drawing of a non recessed elastic body with its electrical traces extending from the EB.

FIG. 6B is a side cutaway drawing of a recessed elastic body with its electrical traces extending from the EB.

FIG. 7A shows a photograph of a number of individual elastic bodies located in a large area multi-layered package.

DETAILED DESCRIPTION OF THE INVENTION

The invention is a contact stress sensor configured as (i) a single contact stress sensor, (ii) a collection of single contact stress sensors in a common package (paddle), (iii) a one or two dimensional array of contact stress sensors without a package and (iv) a one or two dimensional array of contact stress sensors with a package.

Figure 1A:
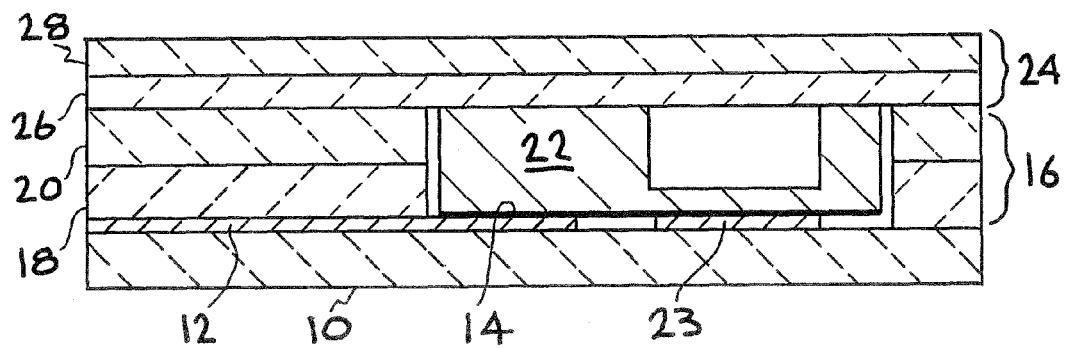
FIG. 1A shows a cutaway view of an embodiment of the present invention in the form of a single packaged contact stress sensor.
Figure 1B:
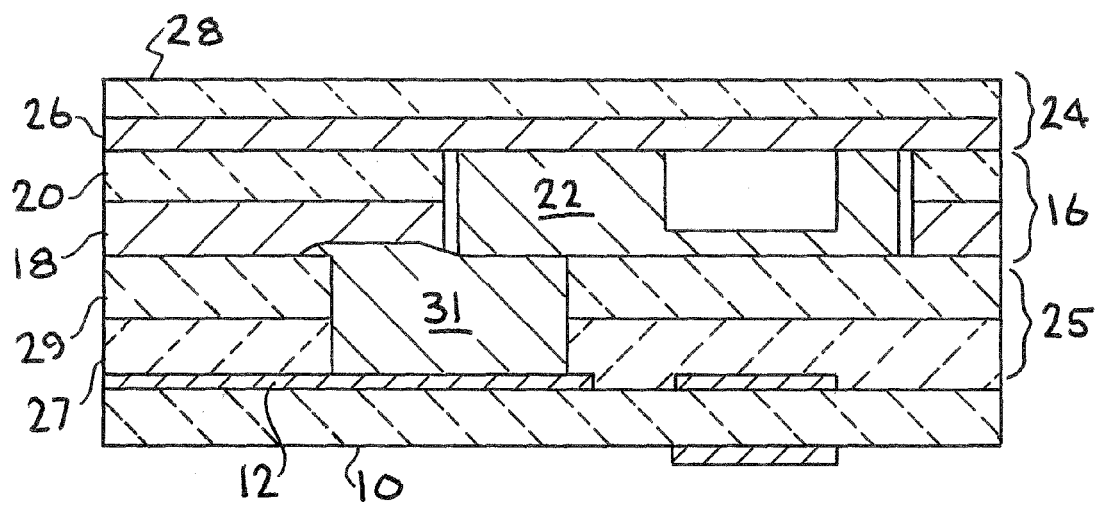
FIG. 1B shows an embodiment that includes a solder shim layer to assure that the bottom side is uniformly supported and a controlled solder thickness is achieved.
Figure 1C:
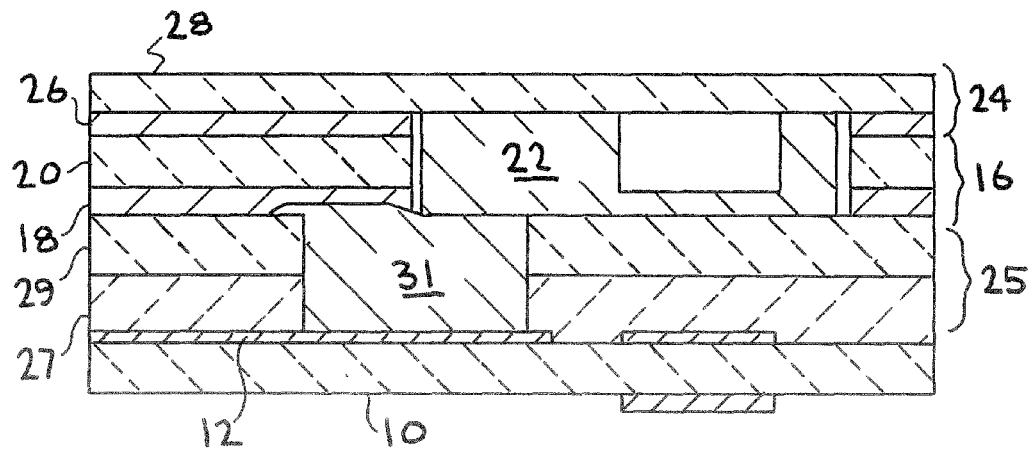
FIG. 1C shows another embodiment that includes a solder shim layer to assure that the bottom side is uniformly supported and a controlled solder thickness is achieved.

I. Single Contact Stress Sensor Embodiments
A. Basic Multi-Layered Sensor Embodiment:

FIG. 1A shows a cutaway view of an embodiment of the present invention in the form of a single packaged contact stress sensor. It includes a multi-layered package with an embedded sensor element, often referred to herein as the elastic body. The multi-layered package includes a base layer 10, patterned electrical traces 12 on the base layer 10, solder layer 14, a first coverlayer portion 16 that includes a cutout section for the elastic body 22 and a second coverlayer portion 24, sometimes referred to herein as a capping (or cover) layer. The base layer 10 is made of polyimide in several embodiments. In some embodiments, the patterned electrical traces 12 are formed from copper either bonded to the polyimide or adhered to the polyimide with an adhesive. Adhesiveless packages are the most stable. In an adhesiveless package, the copper is applied to the polyimide directly without the use of visco-elastic adhesives. A combination of adhesive material and polyimide may be used to fabricate a solder shim layer (25 in FIG. 1B). A b-stage polyimide may also be used that has no adhesives, the polyimide layers are directly bonded to each other. For example, in FIG. 1B, the adhesive layers could be replaced with polyimide layers. This embodiment shows first coverlayer portion 16 as comprising two layers; a first layer 18 is made of adhesive material and a second layer 20 is made of polyimide. The second coverlayer portion 24 comprises two layers; a first layer 26 is made of adhesive and a second layer 28 is made of polyimide. At various places within this document, the layers that comprise polyimide in this embodiment are referred to as the package layers and the particular material used may be referred to as the package material. For example, the package material in the embodiment of FIG. 1A is polyimide. Note that the elastic body 22 includes a pressure sensitive element (PSE), discussed in detail below. Exemplary embodiments of the PSE may be in the form of a diaphragm or a cantilever. An electrical sensing circuit is located on the PSE. Embodiments of PSEs and electrical sensing circuits are discussed in detail infra. FIG. 1C shows another version of the package that keeps adhesive out of the back of the diaphragm. Like components of this figure and FIG. 1B are identically labeled. Notice that adhesive layer 26 includes an opening such that the elastic body 22 makes contact with polyimide layer 28. Notice also that the total thickness of layers 18, 20 and 26 of FIG. 1C is equal to the total thickness of just layers 18 and 20 of FIG. 1B.

Referring again to FIG. 1A, electrical traces 23, on the elastic body 22, which in this embodiment includes a Micro-Electro-Mechanical Systems (MEMS) diaphragm, are soldered to the electrical traces 12 within the cutout section of the multilayered package. The elastic body includes a structural frame, a sensitive element (diaphragm or cantilever) and the embedded circuit. In other embodiments, the elastic body may have a different configuration, such as a cantilever. The elastic body in all embodiments is a MEMS device.

FIG. 1B shows an embodiment that includes a solder shim layer 25 to assure that the bottom side (shown as reference number 29 in FIG. 2), is uniformly supported. The solder shim layer also ensures a deterministic solder thickness is achieved underneath the chip to avoid solder joint failure. Too little solder can result in solder joint failures. Elements identical to those of FIG. 1A are numbered identically. The solder shim layer 25 is made of two sub layers: a first layer 27 is made of adhesive material and a second layer 29 is made of polyimide. Solder 31 can be electroplated up through solder shim layer 25, and excess solder can escape beyond the edge of the chip prior to coverlayer 16 being applied. The solder shim layer can be laser cut to create the hole for the solder to electroplate up through.

Figure 1D:
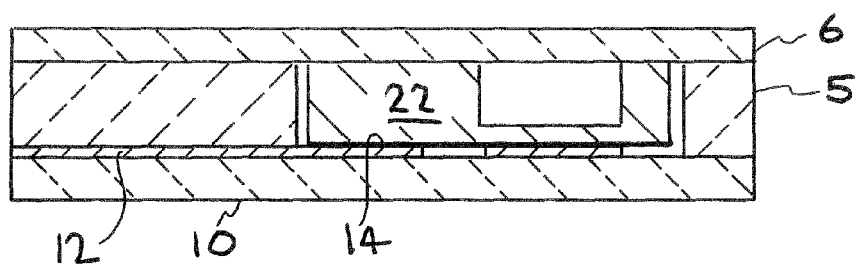
FIG. 1D shows a package that uses no adhesives, and is formed of b-stage polyimides that are directly bonded together.

FIG. 1D shows a package that uses no adhesives, and is formed of b-stage polyimides that are directly bonded together. On base layer 10 is formed copper trace 12 which is electrically connected to the elastic body 22 via solder 14 The diaphragm part of the chip is preferably not bonded to the copper trace 12 so that shear loads are not coupled into the diaphragm. It is desirable that the package be free to translate relative to the diaphragm if needed so that the diaphragm only sees perpendicular loads, not shear loads. The elastic body is packaged in the opening in a mid layer (coverlayer) 5 over which is attached coverlayer 6. Residual stress curl of the multilayer package may be relieved with a symmetrically designed package (e.g., layers 10 and 6 are matched in thickness) to cancel stresses.

Figure 2:
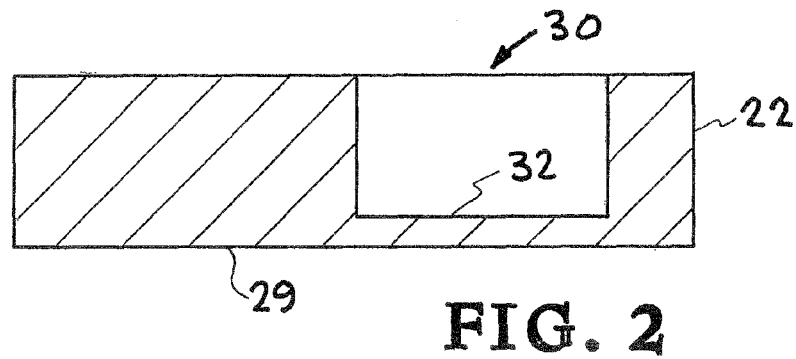
FIG. 2 shows a cutaway side view of the elastic body of FIG. 1A.

FIG. 2 shows a cutaway side view of elastic body 22 of FIG. 1A. The elastic body is fabricated from a solid body of single crystal silicon. A recessed portion 30 is formed in elastic body 22. The recessed portion in the embodiment shown would be seen as circular if viewed from the top; however, it can be formed as other areas, including rectangular and square. The pressure sensitive element 32 is a thinned area near the bottom side 29 of elastic body 22. This element can be in the form of a diaphragm, as in the embodiment of FIG. 1A and FIG. 2 or it can be a cantilever as discussed below. The diaphragm can be sealed (with top and bottom, creating a reference volume), or it can be a single unsealed diaphragm, as in this embodiment. A load amplification element (e.g., an electroplated bump), as discussed below, can be included with either the diaphragm or the cantilever embodiments. Electrical sensing circuits and thermal normalizing circuits, discussed below, are typically both included on pressure sensitive element 32. These circuits may be formed from a single resistor, a pair of resistors (a half bridge) or a wheatstone bridge (a full bridge of 4 resistors).

Figure 3A:
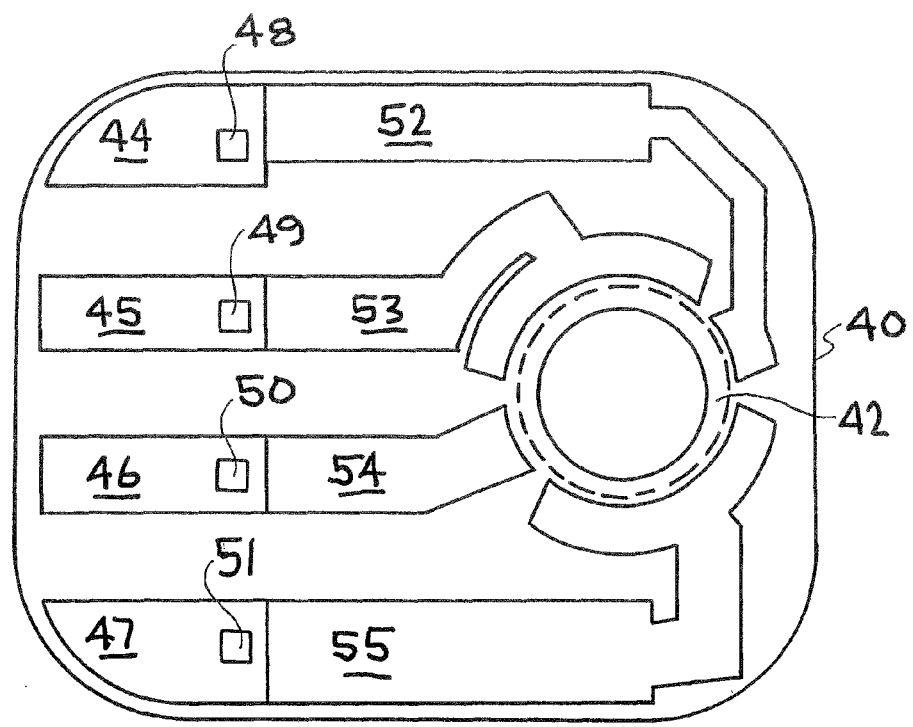
FIG. 3A is a scaled up version of a bottom view of an embodiment of a flexible body.

The relative dimensions of the elements of FIG. 1A are not presented to scale. FIG. 3A is a scaled up version of a bottom view of an embodiment of a flexible body 40. This view would roughly correspond to a bottom view (at 29) of FIG. 2, although the scales are different, especially that of the recessed portion 30 of FIG. 2 The area within the central part of dashed line 42 is the pressure sensitive element of this embodiment. The dashed line 42 shows the outline of the recessed portion, which is recessed from the opposite side. Some details of the electrical features of the flexible body are shown in this view. Metallization traces 44-47 include contact windows 48-51, respectively. The contact windows are the locations where the metal pads 44-47 electrically communicate with the doped traces 52-55. The metal pads 44-47 are soldered to the electrical traces 12 (FIGS. 1A and 1B).

Figure 3B:
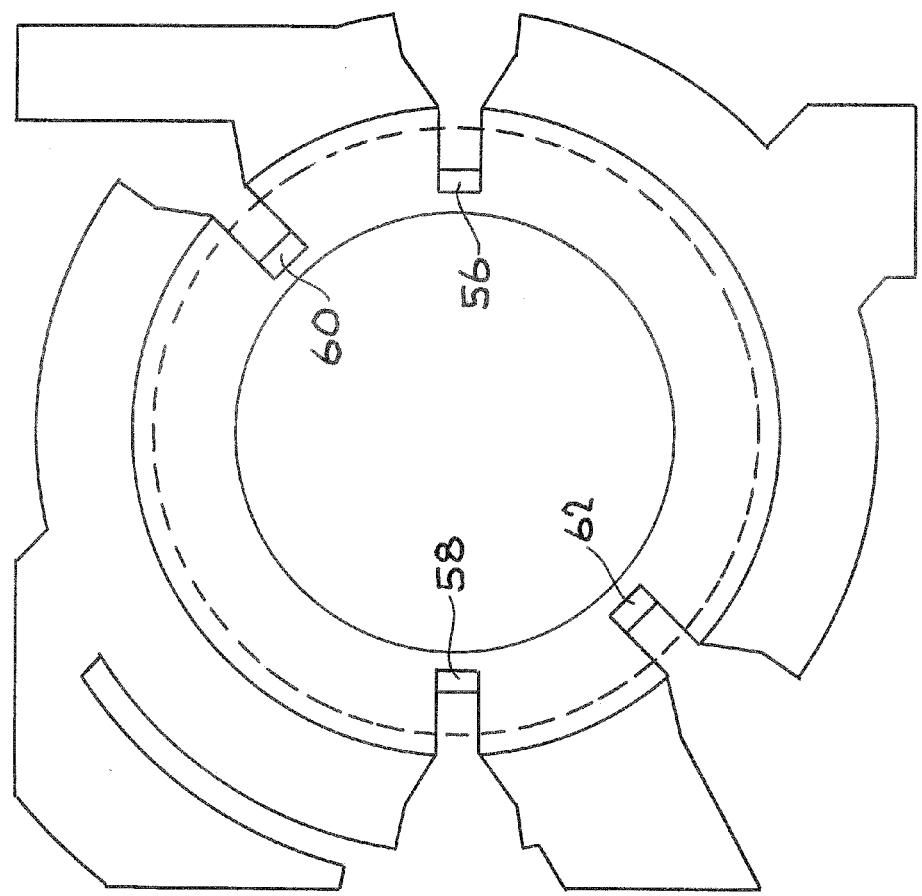
FIG. 3B is a magnified view of the boron traces on the bottom of the flexible body, near the electrical sensing circuits and thermal normalizing circuits.
Figure 3C:
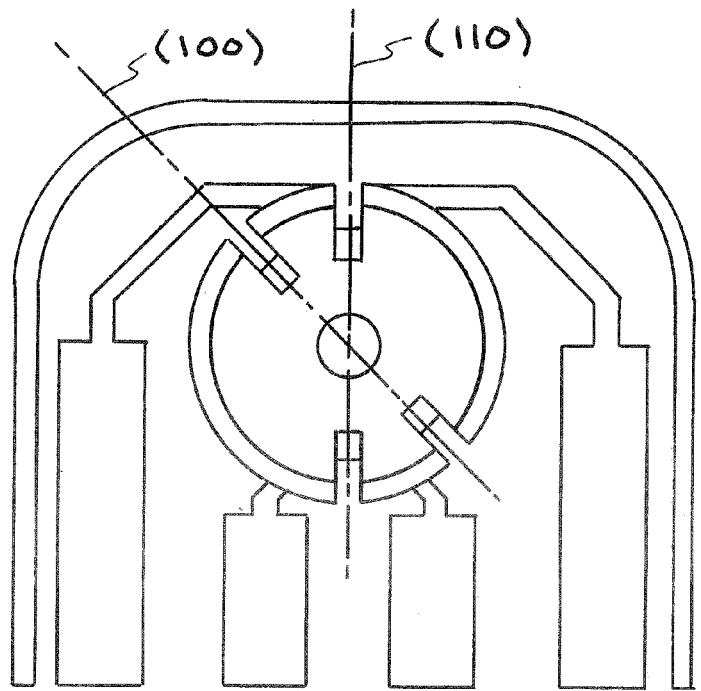
FIG. 3C shows the orientation of the <110> axis and the <100> axis the elastic body of FIG. 3A.
Figure 3D:
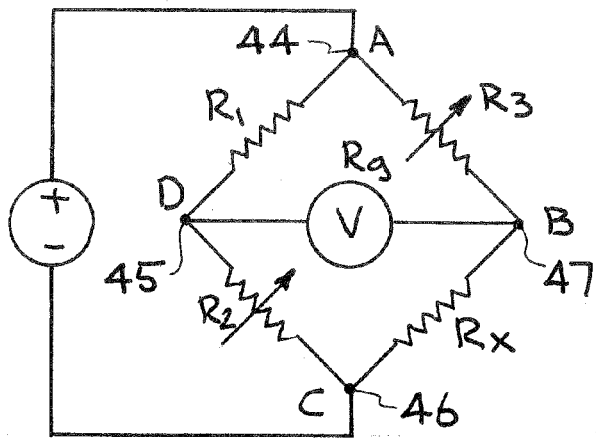
FIG. 3D shows how to connect the electrical sensing circuits and thermal normalizing circuits in a wheatstone bridge configuration.

FIG. 3B is a magnified view of the boron traces on the bottom of the flexible body, near the electrical sensing circuits 56 and 58 and thermal normalizing circuits 60 and 62. As part of the fabrication process, the boron traces 52-55, electrical sensing circuits 56 and 58 and thermal normalizing circuits 60 and 62 are implanted into the silicon flexible body. Annealing activates the piezoelectric properties of electrical sensing circuits 56 and 58 and thermal normalizing circuits 60 and 62. Electrical sensing circuits 56 and 58 are placed on the <110> crystalline axis of the elastic body and thermal normalizing circuits 60 and 62 are placed on the <100> crystalline axis. The electrical response depends on the crystallographic orientation. Traces on the <100> axes have minimal response to strain and traces on the <110> axes have maximal response to strain for p-type silicon. FIG. 3C shows the orientation of the <110> axis and the <100> axis the elastic body of FIG. 3A. The thermal normalizing circuits are placed on axes that show little strain sensitivity but sit on the diaphragm to respond thermally identically to the stress sensing circuit. The thermal normalizing circuit may also be placed in the bulk silicon (not on the diaphragm) and their orientation may be altered. FIG. 3D shows how to connect electrical sensing circuits 56 and 58 and thermal normalizing circuits 60 and 62 in a wheatstone bridge configuration.

The base layer (BL), which is layer 10 in FIG. 1A, is the foundation of the sensor package. In this embodiment, it provides electrical conduits to the elastic body (sometimes referred to as the "die") to connect the electrical circuits thereon with the outside world. It must accomplish these electronic goals and also serves other functions. The BL, and package as a whole, electrically isolates the sensor from the outside environment to avoid fouling of the electrical signals. Extreme versions of this include use in vivo or in fluid environments. The BL and package also mechanically protect the die by providing a polymeric coating to isolate the die from damaging environments. The BL is very thin (some embodiments have a thickness within a range from 12-50 μm) to help form a complete system of minimal thickness. Finally, the BL is flexible to accommodate various applications. Embodiments of the BL are a polymer film (e.g., Polyimide; which may be used from the brand name KAPTON) with patterned metal traces (e.g., gold or copper) on the film. Other films, flexible and rigid, may be used for the BL or cover layers.

Patterned electrical traces 12 are located on BL 10 as shown in FIG. 1A. These conductive traces can be metal or other conducting materials (e.g., patterned polymers). The trace geometries are typically photolithographically defined. Screen printing and other methods may be used in their definition. Conductive patterns have dimensions as small as 25 μm but are typically larger. The conductive traces electrically communicate with electrical traces 23 on elastic body 22 through direct contact, bonds or solder joints. Signal carried on the conductive traces can be brought to a circuit board, a connector or other hardware.

To enable a package that maintains a uniform thickness, a cover layer (CL) 16 is implemented that acts as a shim or a standoff in the multi-layer package. The sensor has a finite thickness (typically 50 μm but thicker and thinner sensors are possible). When mounted on the BL 10, it rests above the plane of the BL. If the cover layer did not have an opening into which the elastic body were to be emplaced, and a capping layer, such as cover layer 24, was simply placed over the elastic body and BL, the region of the package at the elastic body would be thicker (bulge) than the surrounding regions (the elastic body is a small element on a larger BL). Further, if such a package were placed between stiff, flat surfaces, all the load would focus on the elastic body as it would be thicker than the rest of the package. The load focusing or perturbation would introduce significant error in the measurement for which the elastic body is designed. To avoid this effect, which is herein referred to as a "load riser", the thickness of the package can be maintained by including material of matched thickness placed adjacent to the elastic body. This is a cover layer (CL) (sometimes referred to herein as the mid-layer) with cutouts (the first CL is referred to in FIG. 1A as cover layer 16 and comprises two sub layers 18 and 20). An opening is defined in CL 16 (e.g., defined by laser cutting or stamp cutting) that is closely matched to the perimeter shape of the sensor and similar in thickness. Typically the two sub-layers of CL 16 are a KAPTON layer (layer 20) combined with an adhesive layer (layer 18) that bonds CL 16 to BL 10. Typical adhesives include epoxies and acrylic adhesives. An adhesiveless package, described infra, has also been designed that uses a polyimide-polyimide bond through the use of B-stage polyimides (brand name ESPANEX).

The elastic body must electrically communicate with the conductive traces. This is most commonly accomplished with use of a solder joint. As the thickness of the packaged sensor and the loading of the EB are critical to the accurate function of the sensor system, the solder geometry must be very carefully defined. Arbitrary buildup of solder material under the EB would be detrimental to sensor function. The solder thus must achieve electrical communication between the traces and the EB but must maintain strict geometric constraints. Its thickness can be controlled through electroplating or other methods (e.g., solder leveling, solder dipping, preforms, etc.). The solder must also be adequately strong to sustain stresses that exist between the package and the EB (e.g., thermal strains due to Coefficient of Thermal Expansion (CTE) mismatch between the EB and BL).

Once mounted on BL 10, the EB 22 can be mechanically protected by entirely encapsulating it in the multi-ply package. The capping or cover layer 24 is applied over the non-trace side of the EB 22 and can be bonded to the layer beneath it to entirely capture and encapsulate the EB. CL 24 is laminated to CL 16 (or to the BL if desired in some applications) e.g., with adhesive as described above, except in the adhesiveless package described infra. CL 24 typically comprises two sub layers; the outer layer is a polyimide layer 28 and the under layer is an adhesive layer 26.

Figure 4:
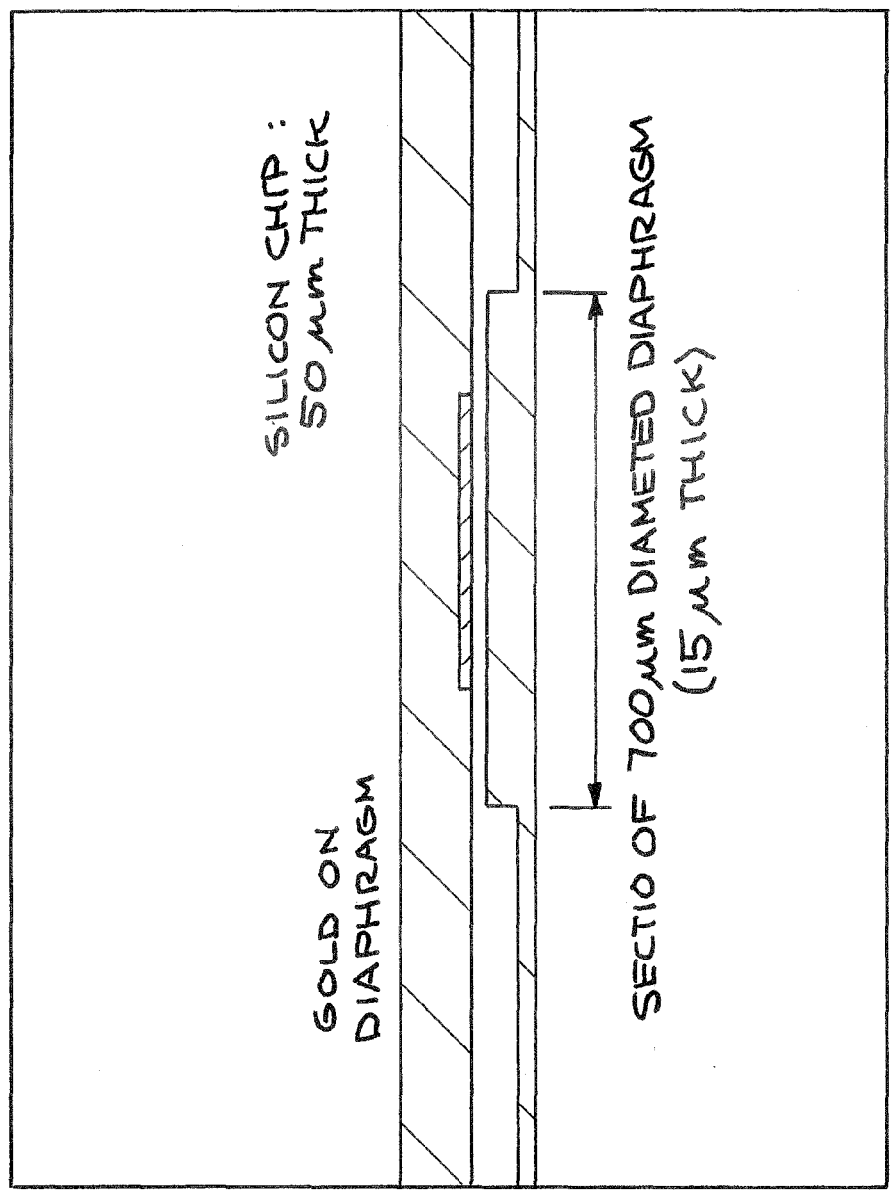
FIG. 4 shows a photograph of a cross-section of a 700 µm diameter by 15 µm thick diaphragm in a 50 µm thick silicon ship with a gold overlay on the back side of the diaphragm.
Figure 5:
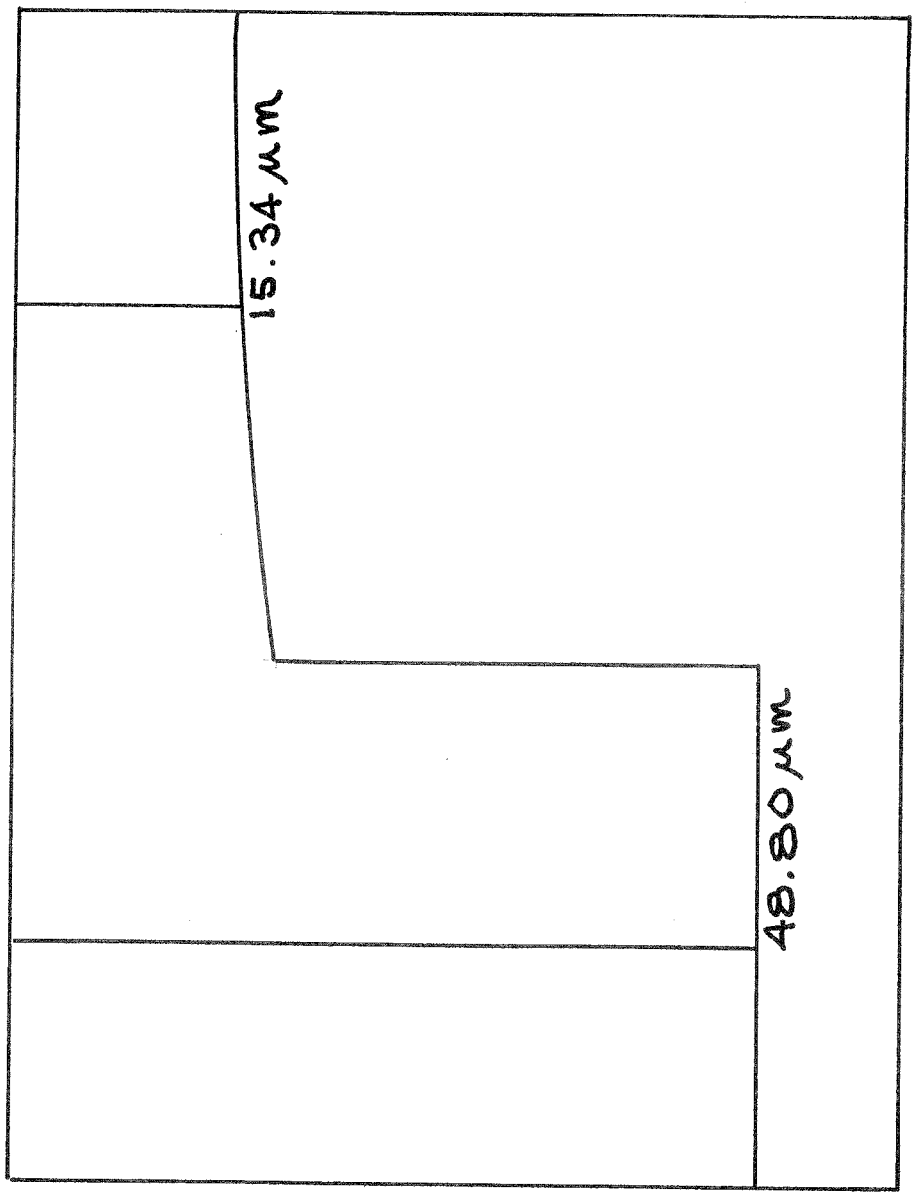
FIG. 5 shows a photograph of the cross-section of a 15.34 µm thick diaphragm in a 48.80 µm thick silicon chip.

Silicon is selected as the material for elastic body 22 due to its excellent material properties, machinability, electrical properties and well characterized behavior. It is a semi-conductor that can be selectively doped, or treated, to behave as a piezoresistor. As discussed above, the traces in some embodiments are formed by implanting boron into the silicon and then annealing it so it functions as a piezoresistor. The overall form of the elastic body is a very thin structure with an etched diaphragm in certain embodiments or a cantilever in other embodiments. FIG. 4 shows a photograph of a cross-section of a 700 µm diameter by 15 µm thick diaphragm in a 50 µm thick silicon chip with a gold overlay on the back side of the diaphragm. The gold overlay may be of arbitrary thickness to concentrate loads on the diaphragm thus enhancing device sensitivity. FIG. 5 shows a photograph of the cross-section of a 15.34 µm thick diaphragm in a 48.80 µm thick silicon chip. This diaphragm was formed in a standard silicon wafer. SOI wafers may also be used to facilitate diaphragm thickness control.

To accurately achieve interface load measurements, the overall sensor system must be very thin. Typically, the thinner the sensor, the less the sensor will perturb the measurement of interest. Creating a load-sensing device of membrane thickness is a very interesting and desirable feature of the present single-sensor invention. Advances in silicon processing and packaging have allowed for this accomplishment. Silicon devices of arbitrary thickness can be created. A process described below has reproducibly produced EBs with thicknesses as little as 10 microns. Even thinner devices are possible but require modification to the process. The EBs can be formed up to large thicknesses (e.g., 500 microns) if desired.

The sensor functions by relating applied loads to electrical output. This is accomplished by using the applied loads to deform the pressure sensitive element on the EB. The pressure sensitive element, for the diaphragm type sensor, is formed by etching a blind hole in the EB to leave a thinned silicon diaphragm. Other methods may be used to form the recessed body including a 2-step anisotropic etching method. For an embodiment of the diaphragm pressure sensitive element, the recessed portion is formed by removal of silicon material to sculpt the shape of the body. The removal process may be a wet or dry chemical etch. Dry etching (e.g., by plasma) is often desirable because it is anisotropic and well controlled. Etch recipes have been formed that leave very smooth surfaces of silicon where material has been removed. Non-smooth surfaces negatively affect mechanical toughness because they can act as initiation sites for fractures. Therefore, the smoothness of the backside of the deforming load sensitive element is an important consideration as well as the sides of the chip and blind hole that may act as crack initiation points.

Excellent control and process robustness can be achieved by using a stopping layer to define the recessed portion. By using a silicon-on-insulator (SOI) wafer, the insulating layer acts as an etch stop to leave the device layer silicon unetched. Purchase of precision SOI wafers pre-determines the load sensitive element's thickness.

The pressure sensitive element is a structure that deforms with applied loads that are being measured. The deformation produces material strain. Piezoresistive traces are strategically placed at areas of high strain to produce large resistance change as a function of strain. By electrically monitoring the resistance values, the applied loads can be measured as device resistance is directly proportional to applied loads. For a circular diaphragm shaped pressure sensitive element, the load-sensing resistors are placed at the outer radius of the diaphragm where bending strains are greatest. This optimizes signal to noise performance of the device.

For silicon, the crystallographic axes determine the piezoresistive behavior of the material. For p-type resistors, the <110> directions give greatest load sensitivity. The load sensitive elements doped into the EB are oriented radially inward on the diaphragm along the <110> direction in some embodiments. Some of these embodiments include four resistive elements in the EB to permit thermal compensation. Two elements measure strain (and are thermally sensitive) and two elements are included to measure temperature only. The temperature only elements are positioned in the unstrained EB or at the diaphragm but on the <100> directions where there is no significant piezoresistive response to strain. This is a configuration referred to both herein and in the art, as a standard Wheatstone bridge configuration.

B. Basic Multi-Layered Sensor without Solder Shim Layer Embodiment:

An embodiment of the invention is the same as the device described above, except that it does not have the solder shim layer. The solder shim layer provides a thick solder connection between the elastic body and base layer, which helps long term reliability. It alleviates thermally induced stresses resulting from different coefficients of thermal expansion between the elastic body and base layer. The solder shim layer does this while maintaining critical load continuity with the pressure sensitive element.

C. Basic Multi-Layered Sensor with Load Dot Embodiment:

This embodiment includes a load dot on top, on bottom or on top and bottom of the base layer (10 in FIG. 1). This load dot is placed in line with the pressure sensitive element and helps transmit stress to the pressure sensitive element. The load dot helps transmit the stress applied by a flat surface to the pressure sensitive element. Without the load dot, the pressure sensitive element might not be deformed by the stress applied, especially against very stiff surfaces. The load dot provides a geometric feature that accentuates load over the sensing element.

D. Basic Multi-Layered Sensor with a Compliant Layer Embodiment:

In this embodiment, the multi-layered package includes a compliant layer (e.g., silicone rubber put on the underside of the base layer). The added compliant layer assists with the transmission of stress to the elastic body. The pressure sensitive element deforms slightly with applied loads. As the sensor structure around the pressure sensitive element bears load but is not compliant, it may shield the pressure sensitive element (PSE) from the load. This means the sensor will not function if the load is not transmitted to the PSE. This problem surfaces most when a very stiff surface contacts the sensor (e.g., applications with stiff surfaces like in the headgasket of an automobile engine). If the surface is adequately stiff, its applied force will only load the surrounding structure once the PSE has deformed beneath the plane of the surrounding structure. The addition of a compliant structure between the PSE and the surface applying load (e.g., a thin membrane of a rubber-like material between the PSE and the hard surface), ensures that load continues to be transmitted to the PSE even once deformed from that load. The sensor's response depends on the hardness of the surface it is in contact with. As the surface grows in hardness, use of an added compliant surface at the interface with the sensor can augment its function and accuracy. The compliant surface can cover the entire sensor package or be a small structure placed over the PSE only.

E. Basic Multi-Layered Sensor with B-stage Polyimide Embodiment:

FIG. 1D shows a device that has no adhesive between the polyimide layers. Thus, all the elements are identical or similar to those of FIG. 1A, except that cover layers 16 and 24 of FIG. 1A do not consist of sub-layers. The basic sensor package can exist with or without the solder shim layer. This changes the material used in the cover layer to strictly polyimide, free of adhesives. The elimination of adhesive material from the package permits operation at higher temperatures and enhances dynamic performance of the device (polyimide is more elastic; the adhesives have known visco-elastic limitations).

F. Solder Free Multi-Layered Sensor Embodiment:

For this configuration, the elastic body is placed into the cutout in the cover layer (16 in FIG. 1A) and it is not soldered into place. The cover layer 24 then presses the elastic body down to make contact with the gold traces. This version of the device does not use solder. The electrical communication between the elastic body and the package is achieved through direct contact of conducting surfaces (e.g., gold to gold contact). Solder produces a variability of thickness in the package which can increase the variability in measurements between sensors, particularly in stiff applications. Also, eliminating the solder eliminates coefficient of thermal expansion (CTE) mismatch between the silicon MEMS and the polyimide package. The solder joint welds the elastic body to the package and the two materials show different thermal response. At extreme temperatures, this may introduce an error in the sensor's readout or induce solder failure. By mechanically decoupling the elastic body from the package, the thermal differences will no longer affect sensor performance.

G. Some Variations for Basic Multi-Layered Sensor Embodiment:

In this type of sensor, the solder shim layer is optional and the cover layer made of adhesive material is optional. If the cover layer is omitted, a capping layer can still be used. One can still make a recess for the chip to have a constant thickness, or one can accept a non-uniform thickness. One can also omit the capping layer. In this case, the elastic body may or may not protrude above the capping layer. So, one can have both a uniform and non-uniform thickness design.

H. Simple Single-Layered Sensor Embodiment:

This single-layered package consists of a base layer and patterned electrical (copper) traces on the base layer. The EB is attached by soldering it to the traces on the base layer. The EB can be attached to the package, i.e., it can be electrically connected to the copper traces. The EB may be joined to a thin package base layer (e.g., KAPTON), a circuit board (e.g., an FR4 board) or any surface of any thickness (e.g., the sidewalk to detect passersby for use as a surveillance device.

I. Basic Off Chip Connect Multi-Layered Sensor Embodiment:

The elastic body consists of a solid body, and pads extending off the solid body. The pads can be on photolithographically defined polyimide which is attached to the solid body. This is mainly a variation in the connection between the conductive traces of the sensor and its package. Instead of having the electrical pads on the solid body, the design puts the pads off the body at a distance using photolithographically defined free-standing metal traces or metal traces supported by polyimide (or other materials) attached to the solid body. Establishing the solder joint off the chip allows the chip to be smaller and alleviates concerns of solder thickness variability under the chip.

The bond pads extending off the body can be recessed and non-recessed. For all the on-chip pad designs described above, the electrical communication between the silicon device and the outside world was established by metal pads that sit on the EB. These pads on the EB communicate with conductive traces on the package. As the EB held the metal contact pads, the EB was forced to be of a size large enough to house the pads. This also forces the electrical communication to be achieved on the same face of the EB as the pressure sensitive element (PSE). This mechanical constraint limits the performance of the device as factors like solder thickness can impact the load conduction to the PSE. The pads can be placed off the chip by extending the metal off the EB. This allows the EB to be greatly reduced in size, offering a variety of advantages. The smaller EB is stiffer allowing it to be thinner. Smaller and thinner EB's extend the applications that the sensor can be used in. Removal of the solder from the face of the chip that contains the PSE improves device accuracy and reduces variability between devices. The total thickness of the package can be reduced with off-chip pads as well.

The metal can be extended off the chip by patterning the metal beyond the physical limits of the EB. This requires unique processing to allow the freestanding metal to exist beyond the support of the EB. Use of frames and tethers are design solutions to this problem. The metal can be patterned to exist in a single plane. In this case it simply extends beyond the edge of the EB. Alternatively, the metal may be led off the edge of the EB in a recessed slot. The recessed slot avoids shearing of the metal at the EB edge. This is a mechanism to reduce metal failure with loads applied.

FIG. 6A is a side cutaway drawing of a non recessed elastic body 70 in a pad-off chip design or an element of a two-dimensional array. The sketch shows the electrical traces 74 and 75 sitting on supporting polyimide 72 and 73. The solder joint between these traces and the conductive traces on 76 is not shown in these sketches. The EB is fully enclosed due to its placement in the opening formed in layer 78 and on capping layer 80. Force shown by lines 82 can cause a shearing of the traces at the edge of the elastic body. FIG. 6B is a side cutaway drawing of a recessed elastic body 90 with electrical traces 94 and 95 extending from the EB and in contact with and supported by polyimide layers 93 and 93. This is a pad off chip design or an element of a two-dimensional array. The EB is fully enclosed due to its placement in the opening formed in layer 98 and on capping layer 100. Force shown by lines 102 have less shearing effect on the traces at the edge of the elastic body.

II. A Collection of Single Contact Stress Sensors in a Common Package (e.g., a Paddle)

Figure 7B:
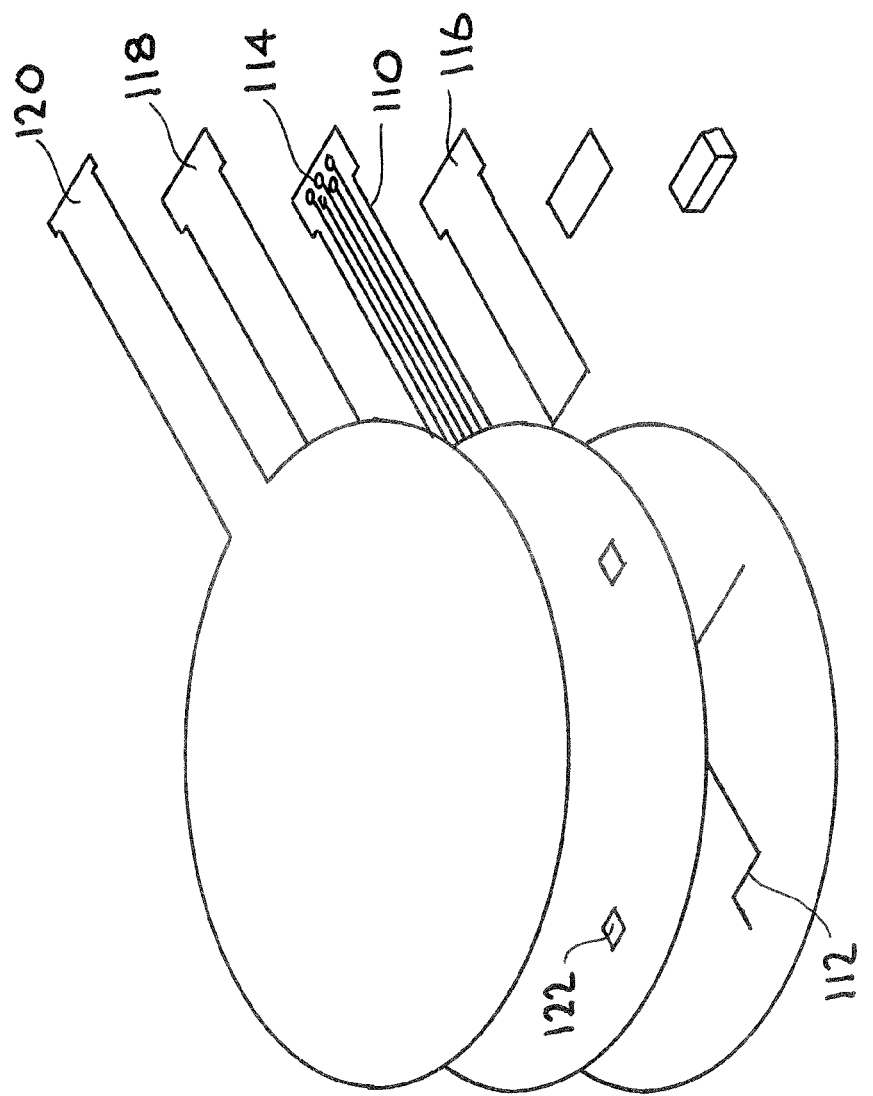
FIG. 7B shows the component layers of a multi-layered package similar to the one shown in the photograph of FIG. 7A.

A. Multi-Layered Package with Multiple Stress Sensors Embodiment:

In this embodiment, as shown in FIG. 7A, a multi-layered package includes a base layer that extends over a larger area and can accommodate multiple elastic bodies. The patterned electrical traces connect to multiple elastic bodies. The cover layer has cutouts for multiple elastic bodies. Each elastic body can be attached by soldering it to the traces in the cutouts in the cover layer. All versions of the single sensor described above can be implemented as a collection of single sensors. The package is arbitrary in shape. It can appear as a thin strip or a large surface. If a number of measurement points are desired over a surface (e.g., loads at various points on a car seat underneath the driver's pelvis), the package can be sized to accommodate the application (e.g., the shape of a car seat). The individual sensors may be accurately placed at any location on this surface. For example, 15 sensors may be deployed on the seat surface at specific locations under the bony prominences of the driver's pelvis. This is not considered herein as an array of sensors but instead as an arbitrary collection of single sensors integrated within a single sensor package. The outputs of the sensors can be at a common connector. FIG. 7A shows a photograph of a number of individual elastic bodies located in a large area multi-layered package. FIG. 7B shows the component layers of a multi-layered package similar to the one shown in the photograph of FIG. 7A. A base layer 110 with circuits 112 and through holes 114 (which are soldered to connector 3) is located between a bottom cover layer 116 and cover layer 118. Backside coverfilm 116 covers a metal pattern (that is not visible in this view) on the underside of 110. This underside metal pattern is a ground plane that helps reduce electrical noise on the circuit. Use of a ground plane is a circuit design option implemented in embodiments of this flex circuit assembly. A top cover layer 120 is placed over cover layer 118. Cover layer 118 includes cutout sections 122 at various places for location of an elastic body.

The above described elastic bodies and variations thereof can be utilized in arrays that are unpackaged or packaged. Exemplary embodiments, interconnection and fabrication techniques are provided below.

Figure 8A:
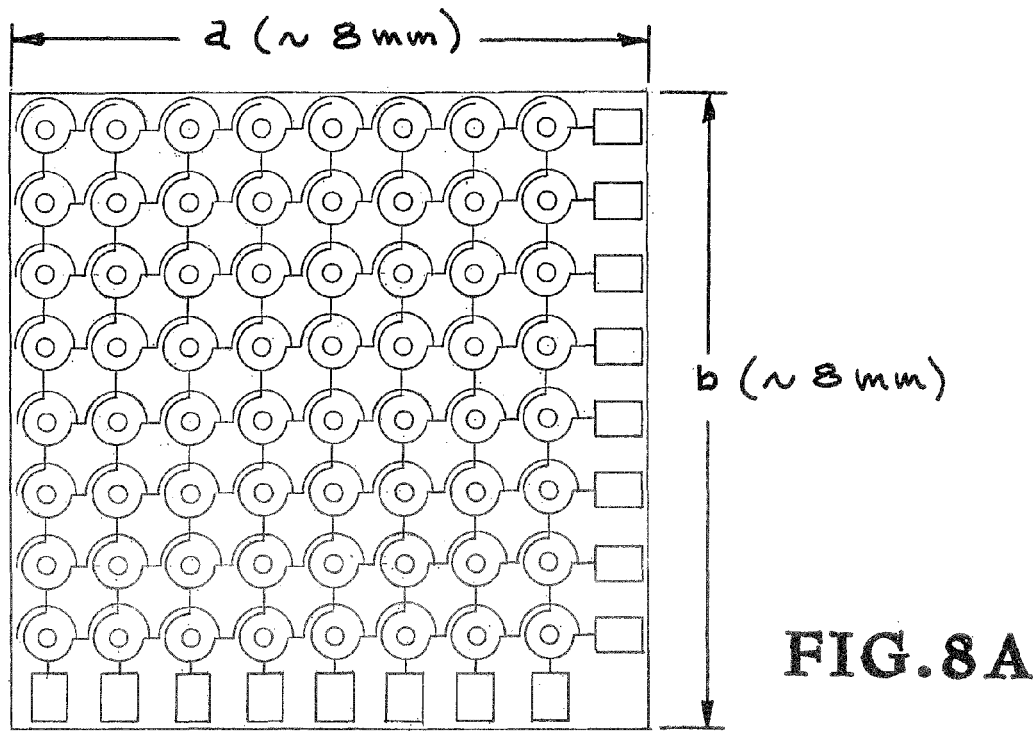
FIG. 8A shows a picture of an array of 64 diaphragms (on a dime) as indicated by the gold dots on the un-etched side of the silicon device.
Figure 8B:
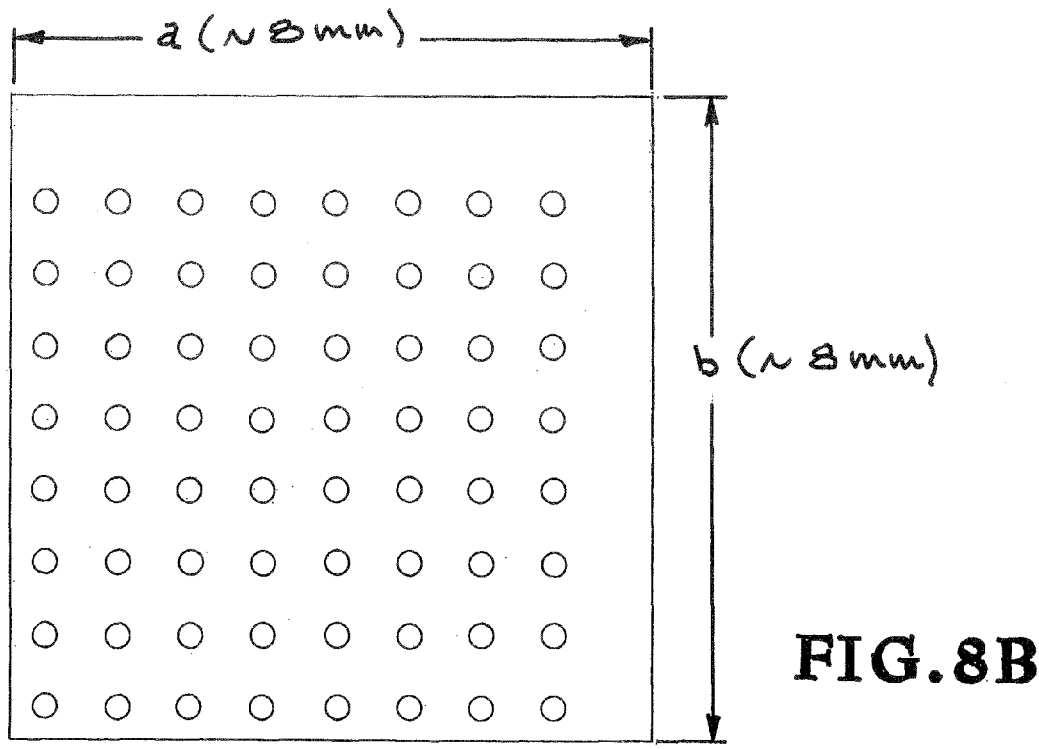
FIG. 8B shows the etched side (on a dime) of the array of FIG. 8A.
Figure 9:
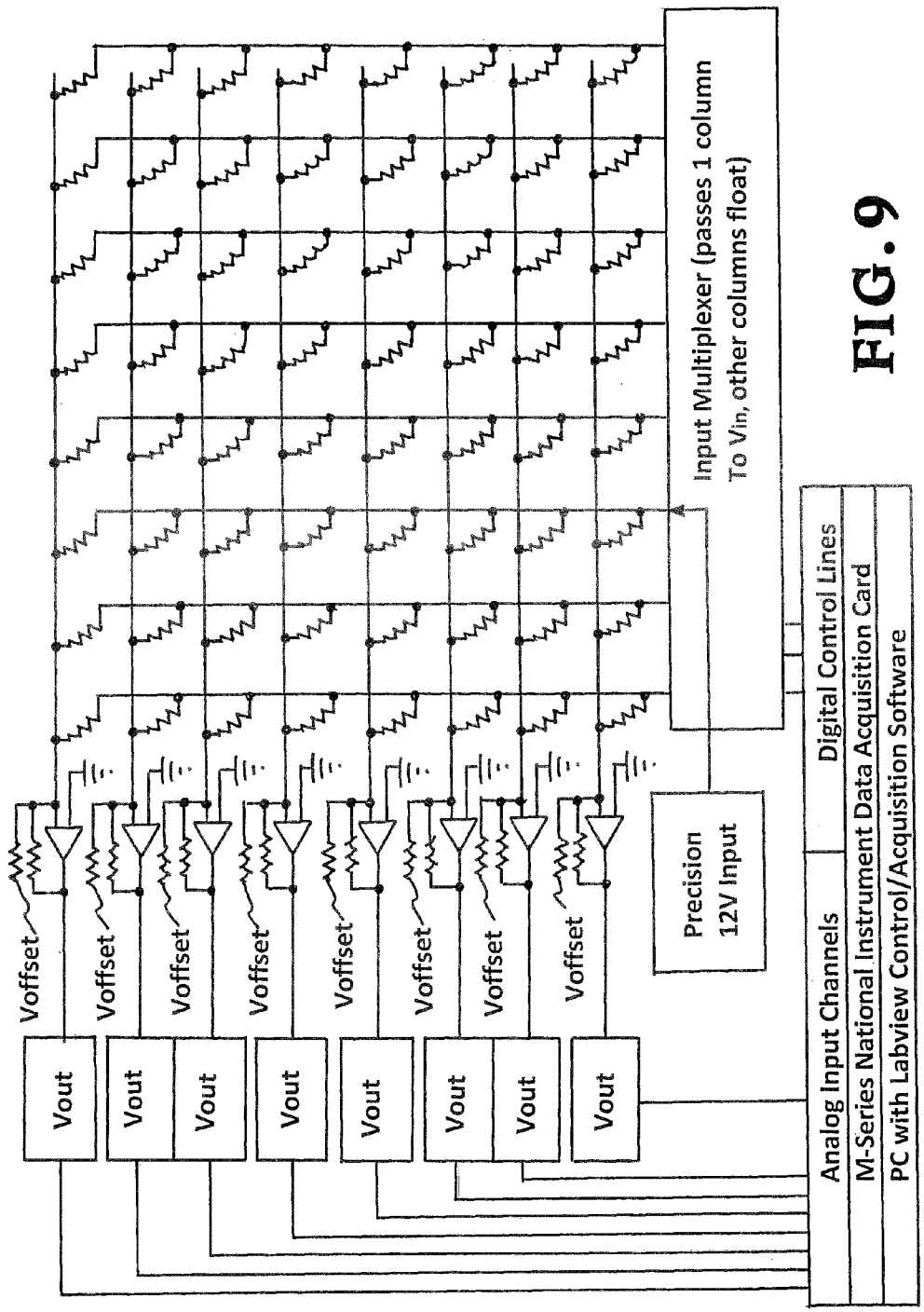
FIG. 9 shows an exemplary electronic control and data acquisition system for an 8×8 array.
Figure 10:
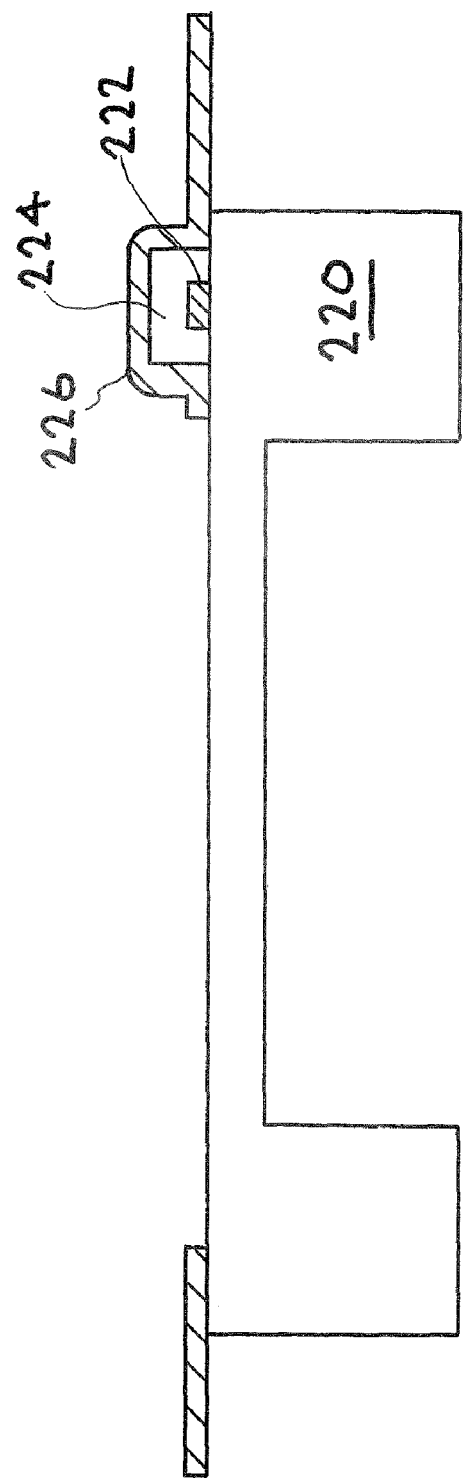
FIG. 10 illustrates a technique for enabling conductive traces to cross on the MEMS elastic body.
Figure 11:
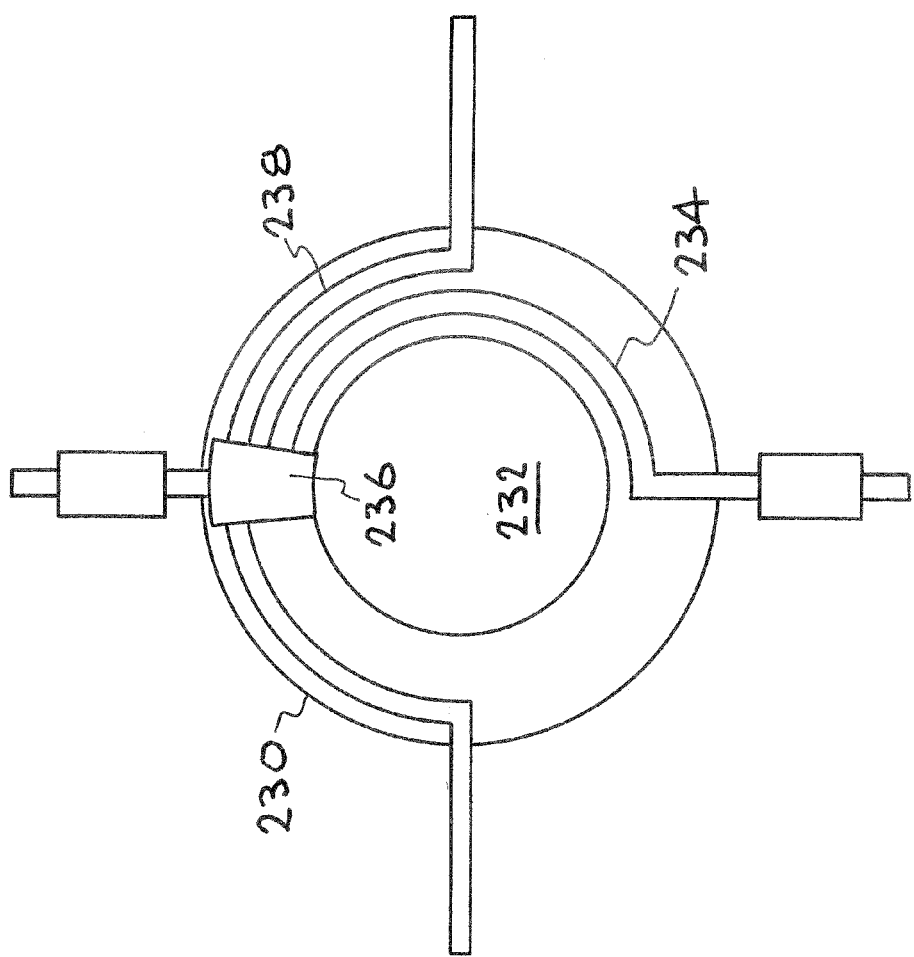
FIG. 11 shows the use of a polyimide bump to enable non-electrical contact crossing of electrical traces.
Figure 12:
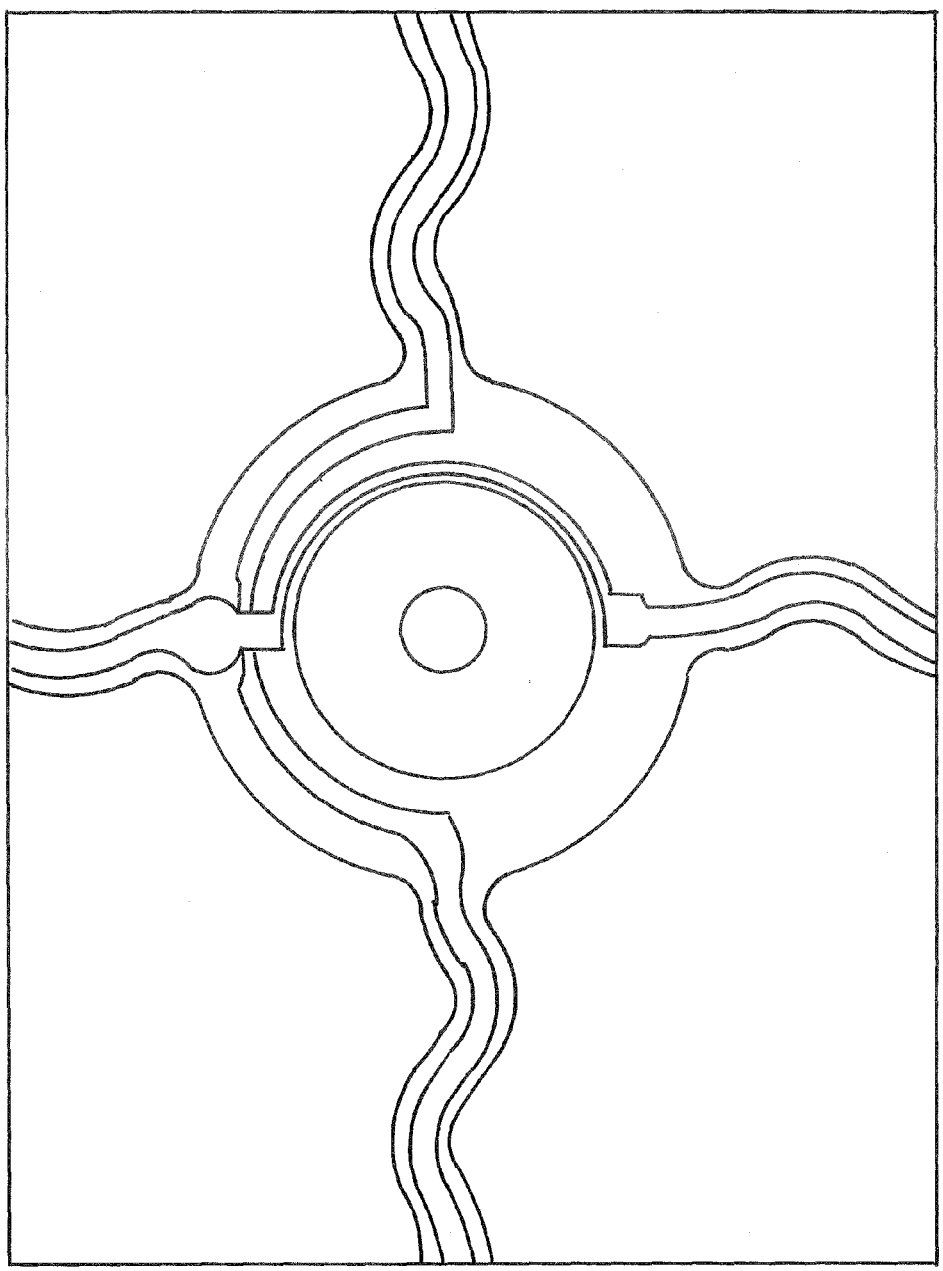
FIG. 12 is a picture of the use of a polyimide bump to enable two traces to cross without making contact.
Figure 13A:
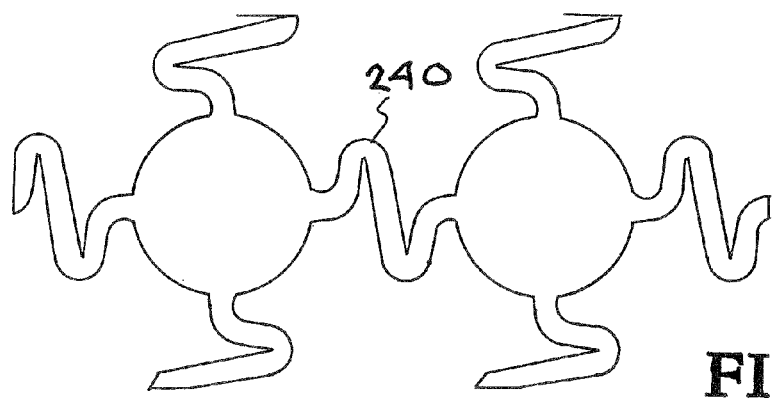
FIGS. 13A-C shows several types of interconnection configurations.
Figure 13B:
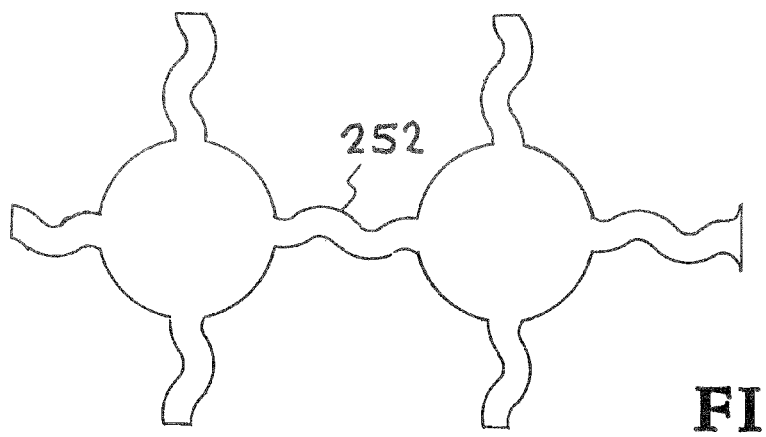
Figure 13C:
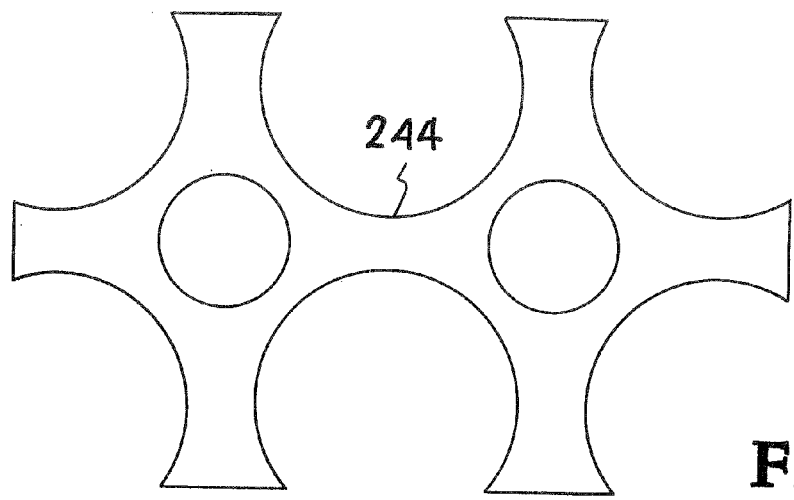
Figure 13D:
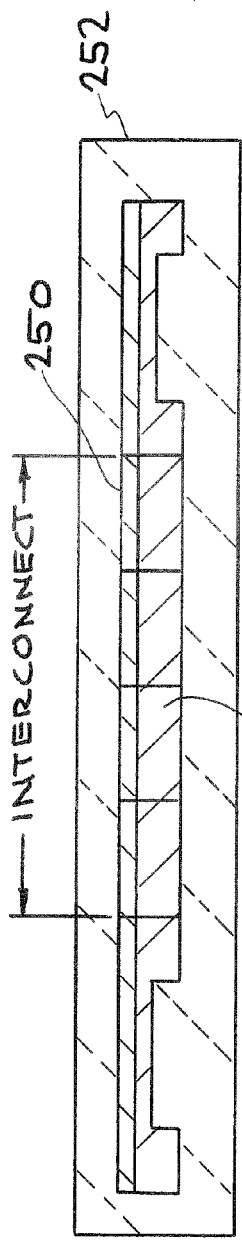
FIG. 13D shows a metal on silicon-spring interconnect embedded in a package.
Figure 13E:
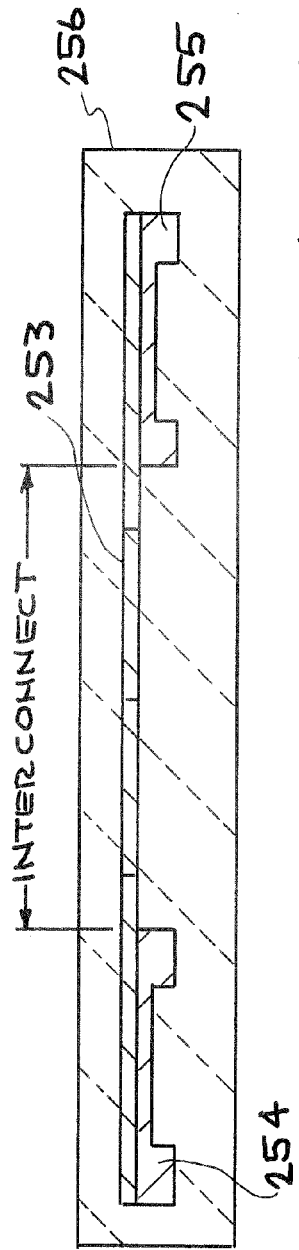
FIG. 13E shows a free-standing metal interconnect with elastic bodies at each end, all embedded in a package.

FIG. 8A shows a picture of an array of 64 diaphragms (on a dime) as indicated by the gold dots on the un-etched side of the diaphragm. The gold dots are used to indicate the location of the diaphragm. FIG. 8B shows the etched side (on a dime) of the array of FIG. 8A. The total chip thickness is 50 µm. FIG. 9 shows an exemplary electronic control and data acquisition system for an 8×8 array. FIG. 10 illustrates a technique for enabling conductive traces to cross on the MEMS elastic body 220 as needed to accomplish the circuit shown in FIG. 9. A conductive trace 222 on elastic body 220 is covered with a polyimide bump 224, which is then covered with the crossing conductive trace 226. FIG. 11 a top view of the crossing shown in FIG. 10 in cross-section, shows the silicon outline 230, the diaphragm outline 232, metal trace 234 on silicon, polyimide bump 236 that bridges over metal trace 234 and metal trace 238 which is laid over polyimide bump 236 to cross without touching metal trace 234. FIG. 12 is a picture of the use of a polyimide bump to enable two traces to cross without making contact, a physical implementation of FIG. 11. FIGS. 13A-C show several types of interconnection configurations. The interconnect 240 of FIG. 13A will allow for greater flexibility between connected diaphragms than interconnect 252 of FIG. 13B, which in turn will allow for greater flexibility than interconnect 244 of FIG. 13C. Each interconnect is formed of an electrical trace embedded in polyimide. FIG. 13D shows a metal 250 on silicon-spring 251 interconnect embedded in a package 252. FIG. 13E shows a freestanding metal interconnect 253 with silicon diaphragms 254 and 255 at each end, all embedded in package 256. A motivation for the freestanding metal interconnect (13E) is to allow greater flexibility than 13D although 13D does not suffer from the metal shearing problem discussed earlier as the metal is entirely supported by silicon.

Figure 14:
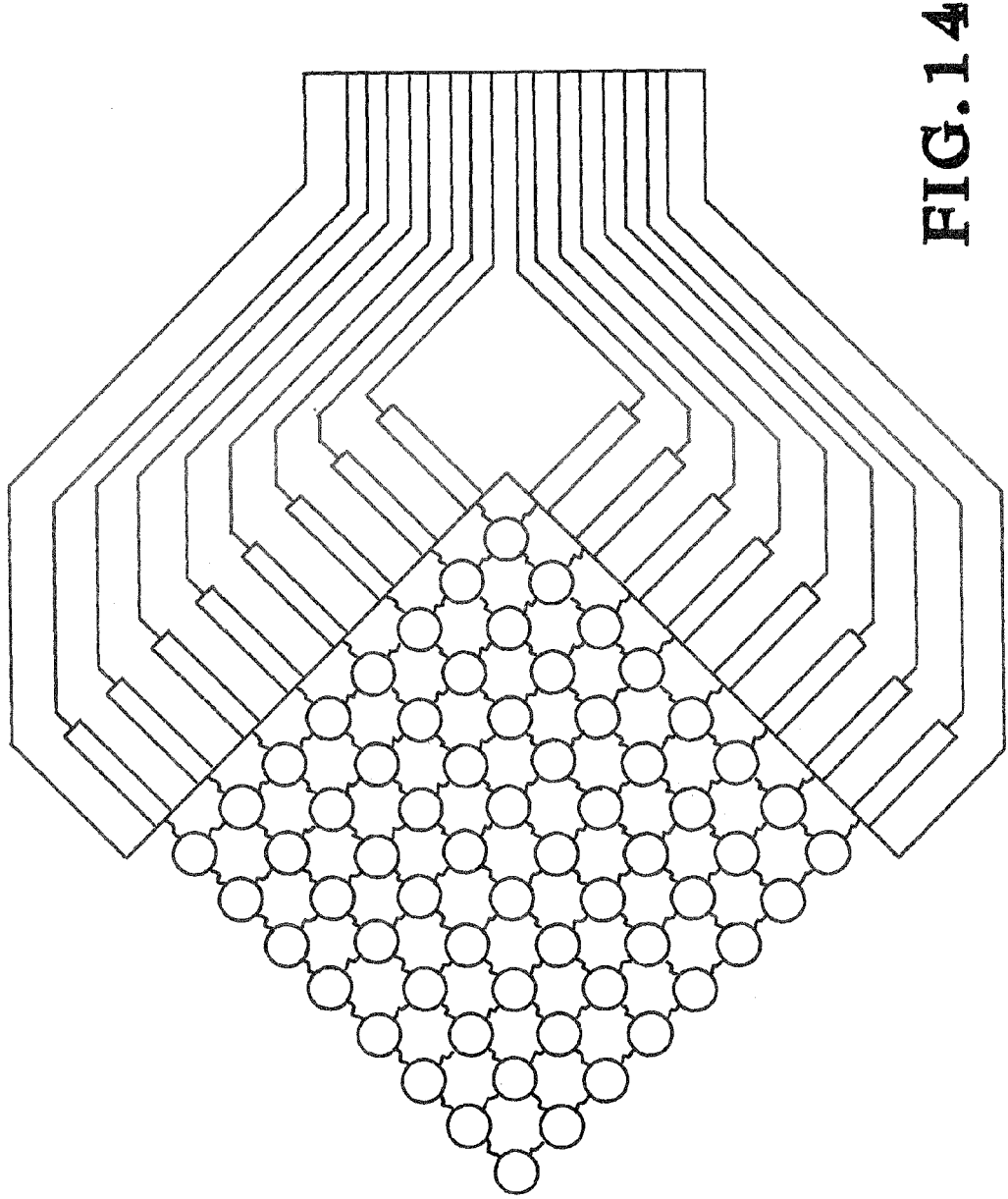
FIG. 14 is a picture of an unframed array with each row and column soldered to a single flexible cable.
Figure 15:
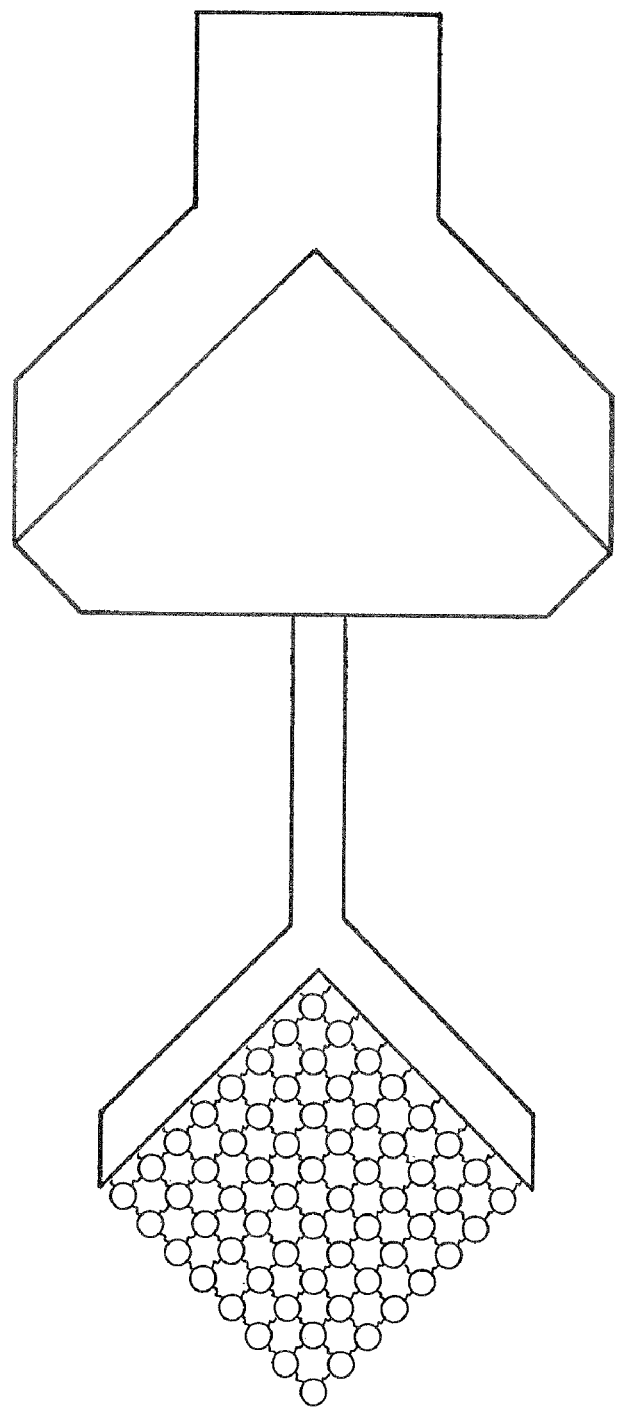
FIG. 15 is a picture of a flexible array.
Figure 16:
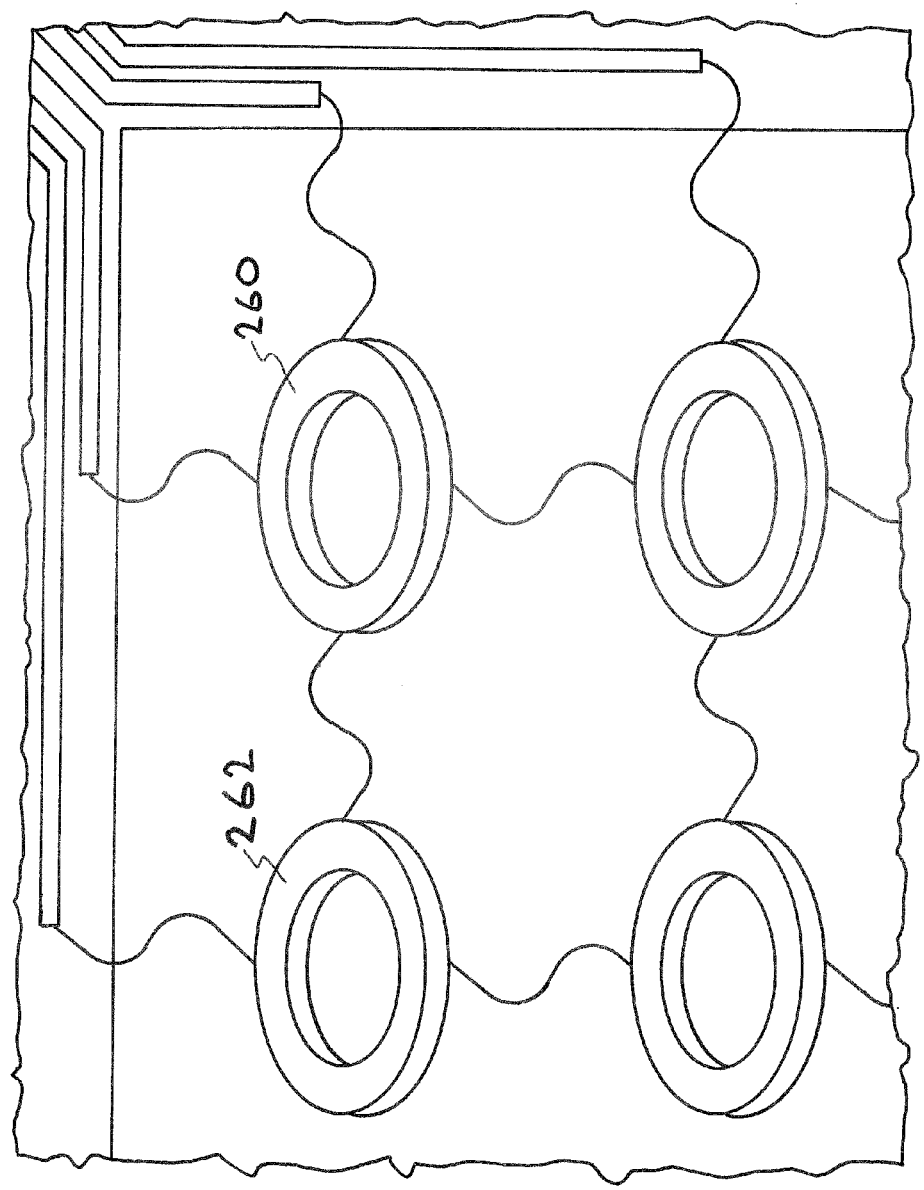
FIG. 16 is a picture showing an unetched element next to an etched diaphragm.

FIG. 14 is a picture of an unframed array with each row and column soldered to a single flexible cable. FIG. 15 is a picture of a flexible array. FIG. 16 is a picture showing an unetched element 260 next to an etched diaphragm 262. When an array uses diaphragms that do not include the use of the <100> axis of the silicon diaphragm to correct for thermal effects on the signal, the signal measured on this unetched element shown in FIG. 16 is usable to cancel the thermally induced signal. It also can be used to measure temperature at an arbitrary number of locations (i.e., a temperature mapping array). Although these designs show arrays of contact stress sensors, any silicon device may be arrayed with this interconnection scheme (a temperature sensor or other).

Figure 17A:
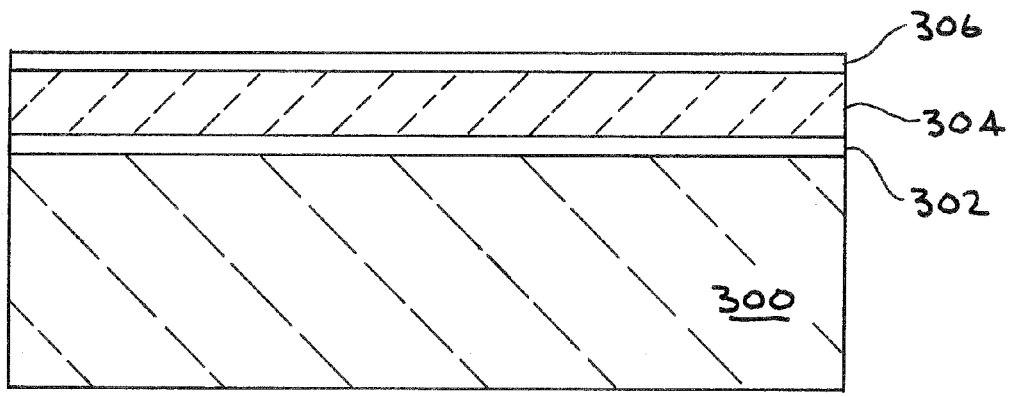
FIGS. 17A-I illustrate steps for producing an embodiment of the diaphragm type elastic body of the present invention.
Figure 17B:
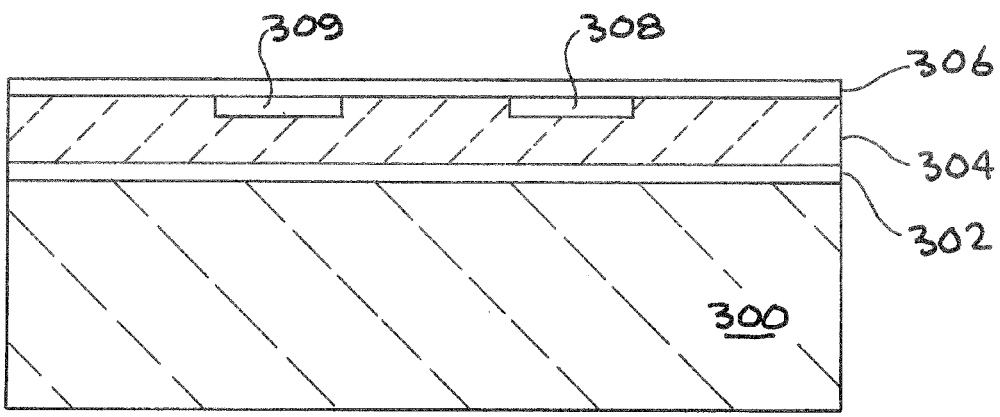
Figure 17C:
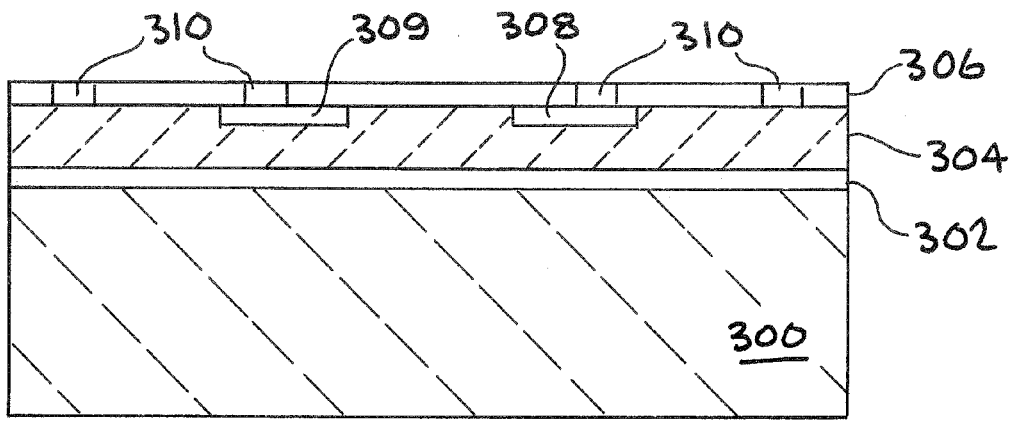
Figure 17D:
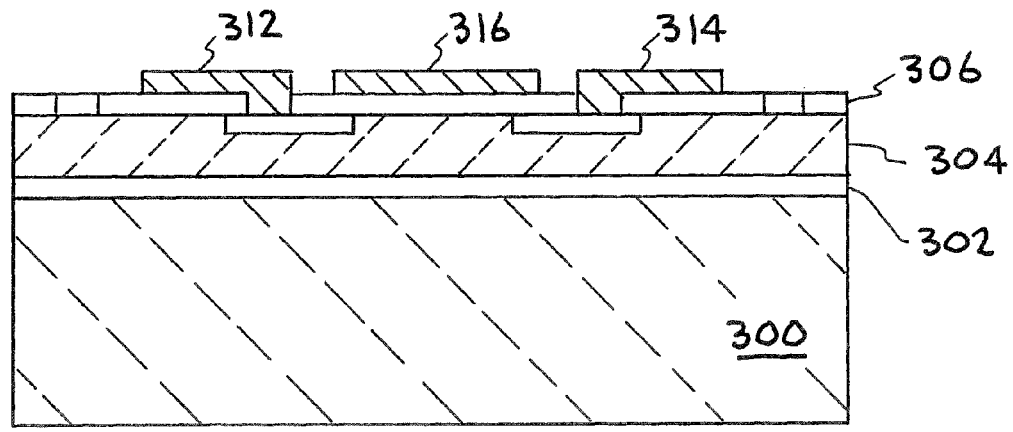
Figure 17E:
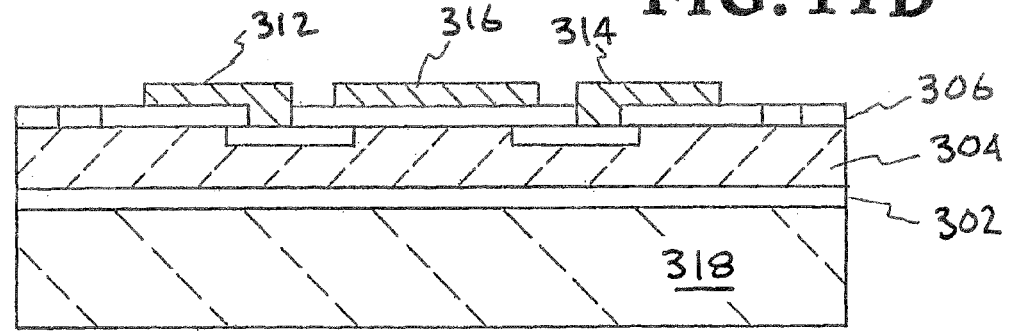
Figure 17F:
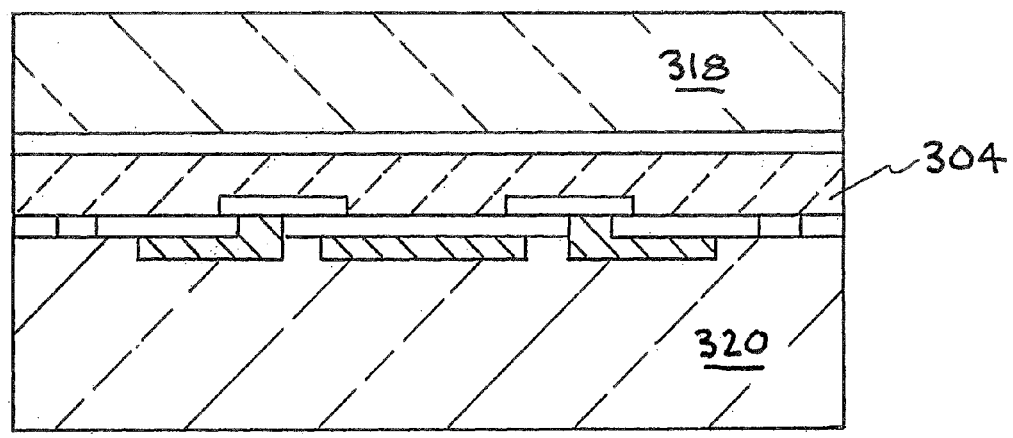
Figure 17G:
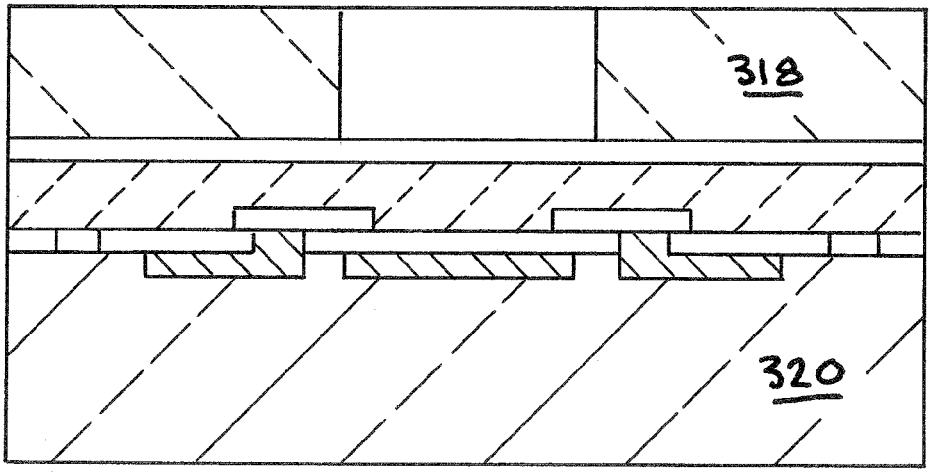
Figure 17H:
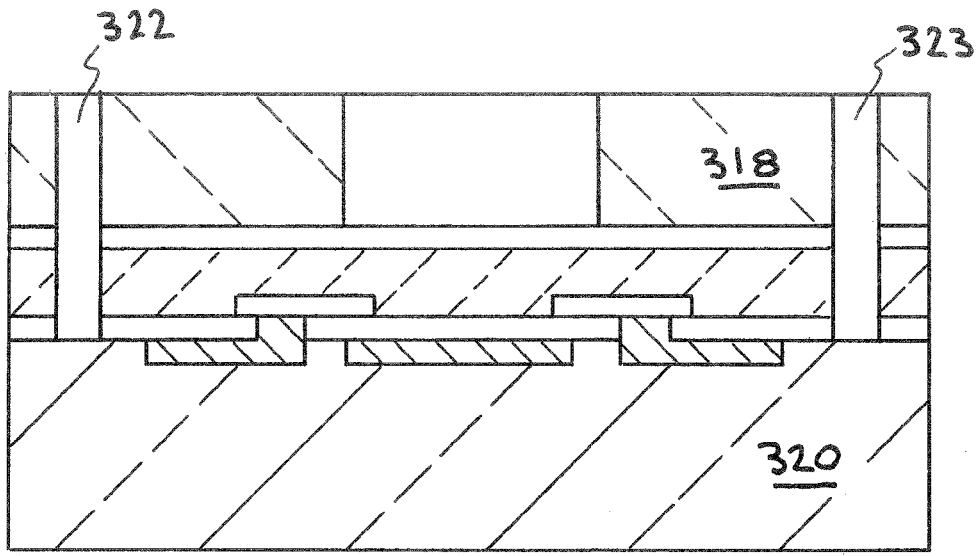
Figure 17I:
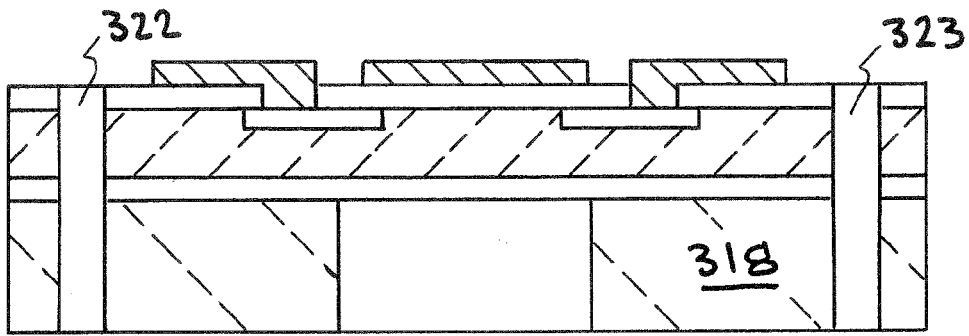

FIGS. 17A-I illustrate steps for producing an embodiment of the diaphragm type elastic body of the present invention. This embodiment includes the electrical contact pads on the chip, as e.g., shown in FIG. 22 discussed below. FIG. 17A shows the starting wafer configuration. In this example, the starting wafer includes a silicon handle 300 (e.g., ~500 µm thick), a BOX layer 302 (e.g., 0.2 µm thick), a silicon device layer 304 (e.g., varying thicknesses: 10, 15, 20, 25 µm), and masking oxide layer 306 (e.g., 0.1 µm). FIG. 17B shows boron 308 implanted into the silicon device layer to form the resistors. FIG. 17C shows the results of etching through the masking oxide layer 306 to form the contact holes 310 to communicate with the boron implants. Holes 310 are etched through the masking oxide layer and include etches in the streets between adjacent dies. FIG. 17D shows the metal contacts 312 and 314 formed by evaporation and patterning of metal (e.g., Ti/Ni/Au or other). The metal 316 covering the diaphragm is used solely to help visualize the diaphragm location from the top of the device and to potentially build a load concentrating 'bump' on the chip as previously described for the package. The original silicon handle 300 of FIG. 17A is thinned to ~40 µm to form handle 318 as shown in FIG. 17E. FIG. 17F shows the result of attaching the thin silicon wafer, upside down, to a quartz handle 320, to allow further processing without breaking the silicon wafer and to facilitate the backside etching. FIG. 17G shows the results of etching through the silicon handle (from the backside), stopping at the BOX layer, to form the diaphragm. FIG. 17H illustrates the step of etching through the silicon handle (from the backside), the BOX layer, and the silicon device layer to form the streets 322 and 323 between adjacent dies, allowing individual dies to be singulated from the wafer. FIG. 17I shows the released silicon device after release from the quartz handle.

Figure 18A:
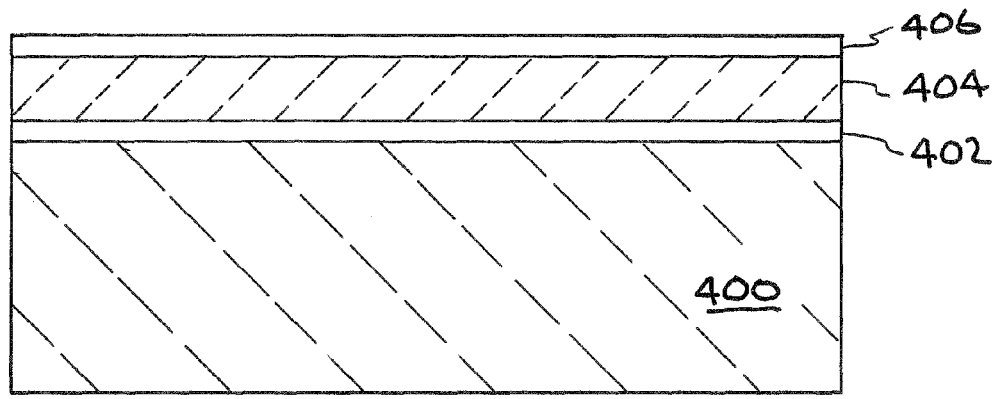
FIGS. 18A-J illustrate steps for producing an embodiment of the diaphragm type elastic body of the present invention where the electrical contact pads are extended from the chip.
Figure 18B:
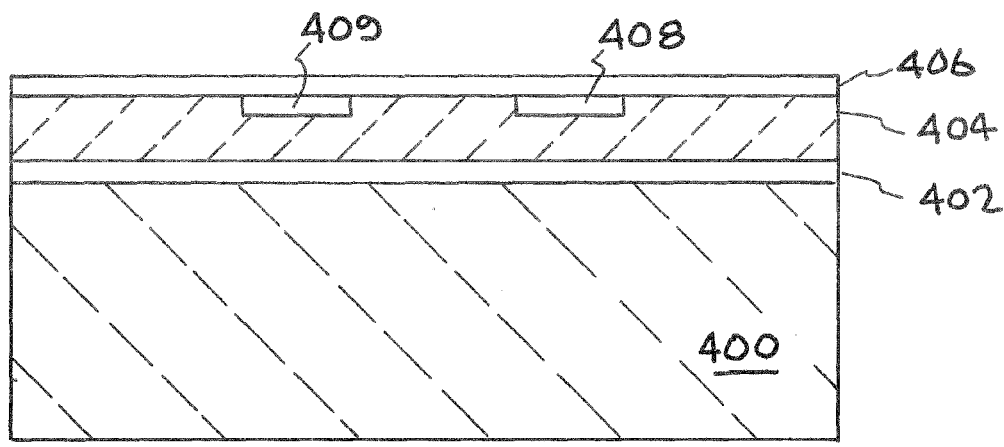
Figure 18C:
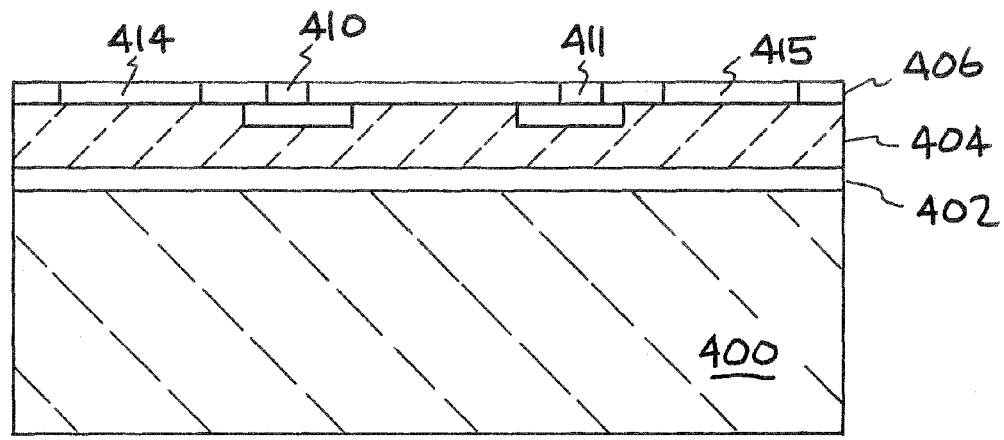
Figure 18D:
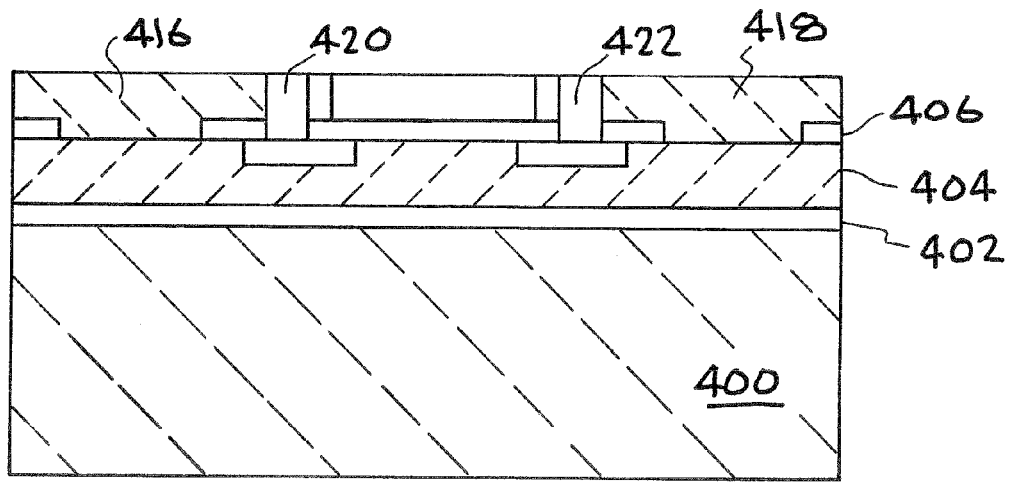
Figure 18E:
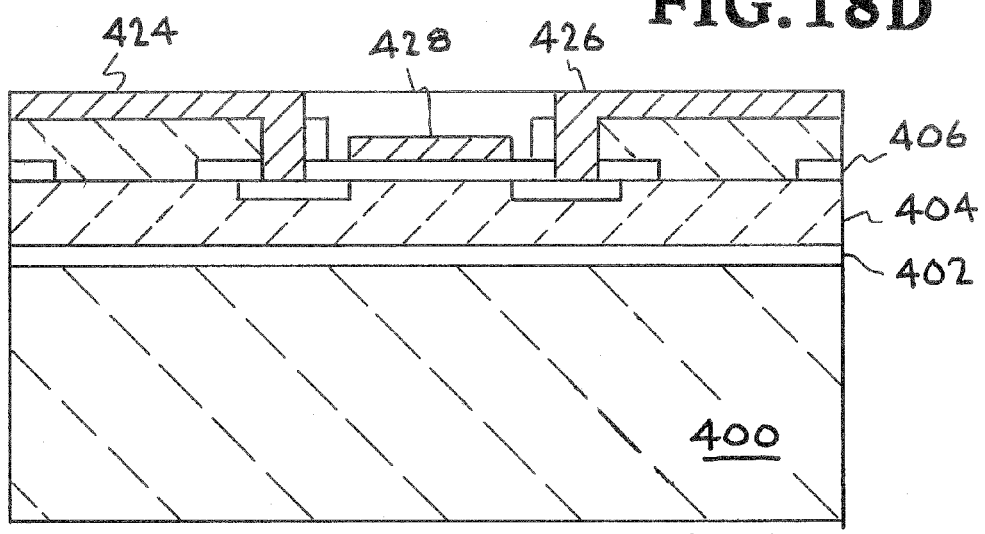
Figure 18F:
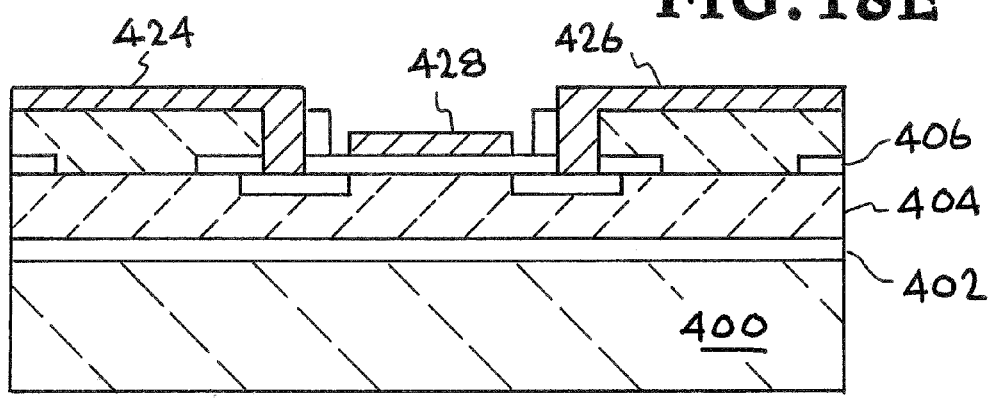
Figure 18G:
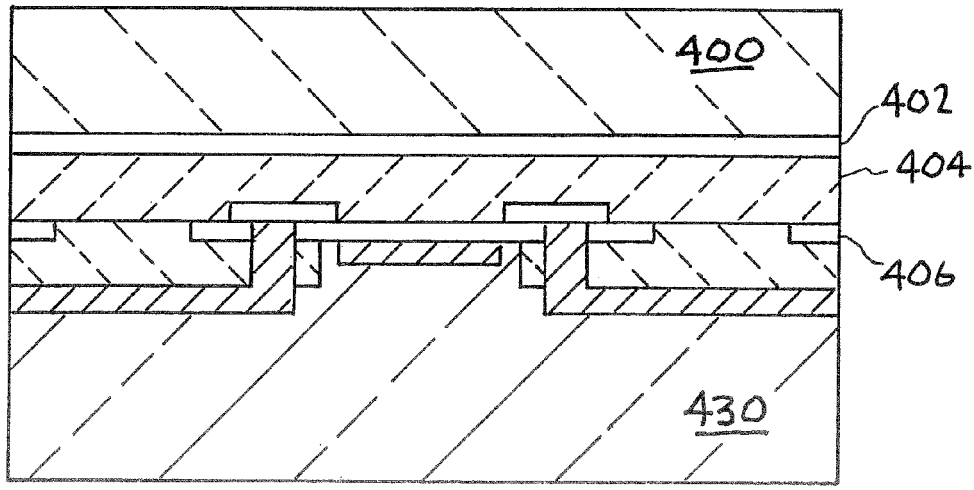
Figure 18H:
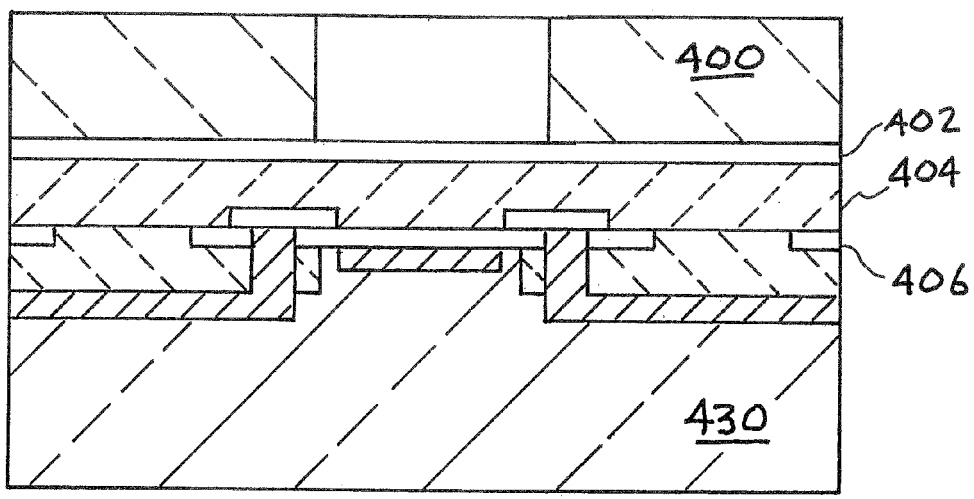
Figure 18I:
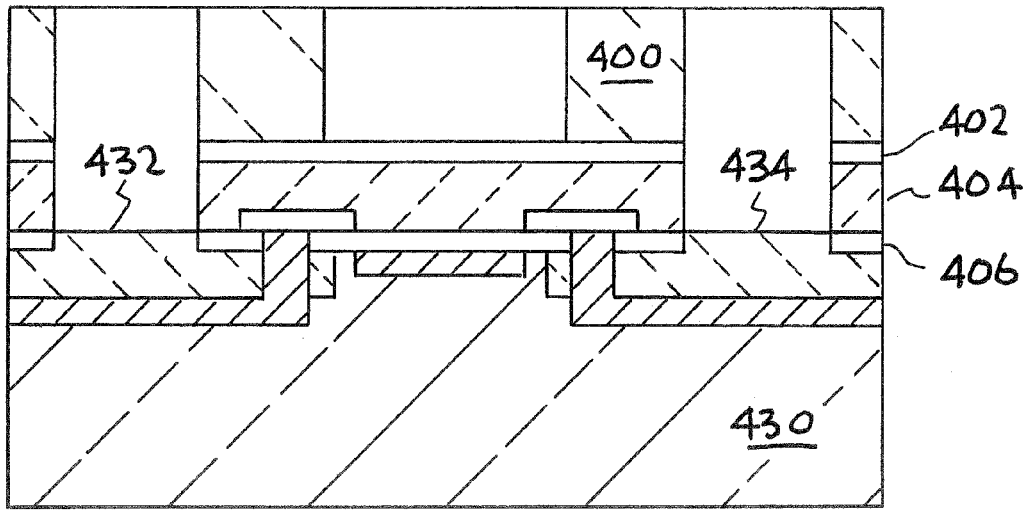
Figure 18J:
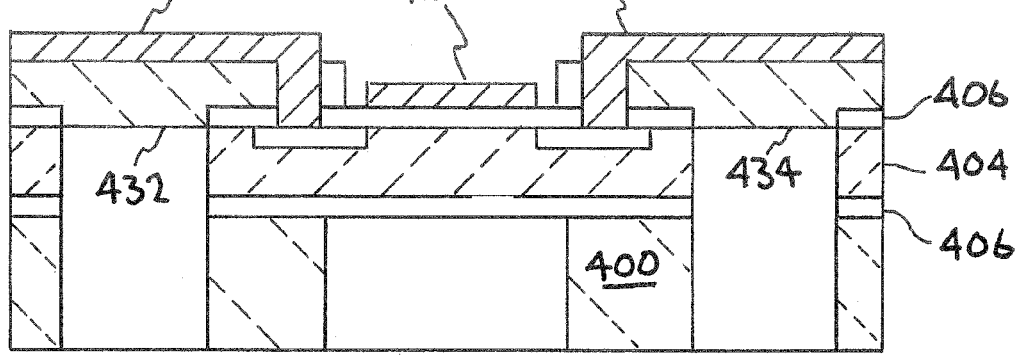

FIGS. 18A-J illustrate steps for producing an embodiment of the diaphragm type elastic body of the present invention where the electrical contact pads are extended from the chip, as e.g., shown in FIG. 23 discussed below. FIG. 18A shows the starting wafer configuration. In this example, the starting wafer includes a silicon handle 400 (e.g., ~500 µm thick), a BOX layer 402 (e.g., 0.2 µm thick), a silicon device layer 404 (e.g., varying thicknesses: 10, 15, 20, 25 µm), and masking oxide layer 406 (e.g., 0.1 µm). FIG. 18B shows boron 408 and 409 implanted into the silicon device layer to form the resistors. FIG. 18C shows the results of etching through the masking oxide layer 406 to form the contact holes 410 and 411 for the boron implants. Holes 414 and 415 are also etched through the masking oxide layer (at the polyimide bridge locations). FIG. 18D shows the results from spinning on and curing polyimide (e.g., ~5 μm) to form the bridges 416 and 418 for the metal lines. Open holes 420 and 422 in the polyimide form the contact holes for the boron implants. As shown in FIG. 18E, a pattern of Ti/Ni/Au (or other metals) is then evaporated to form the metal contacts 424 and 426. The metal covering 428 on the diaphragm is used solely to help visualize the diaphragm location from the top of the device and potentially create a load accentuating bump over the diaphragm as previously described for the package. The silicon handle is then thinned to ~40 μm as shown in FIG. 18F. The thinned silicon wafer is then attached, upside down, to a quartz handle 430, to allow further processing without breaking the silicon wafer and to facilitate the backside etching. The silicon handle is then etched down to the stopping oxide layer, as shown in FIG. 18H, to form the diaphragm. As shown in FIG. 18I, etching through the silicon handle (from the backside), the BOX layer, and the silicon device layer forms the polyimide bridges 432 and 434 and the streets between adjacent dies, allowing individual dies to be released. FIG. 18J shows the silicon device released from the quartz handle.

Figure 19A:
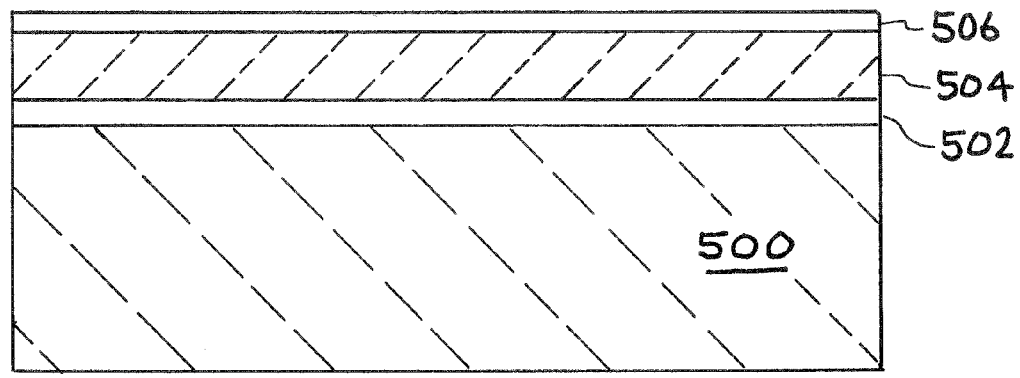
FIGS. 19A-J illustrate steps for producing another embodiment of the diaphragm type elastic body of the present invention where the electrical contact pads are extended from the chip.
Figure 19B:
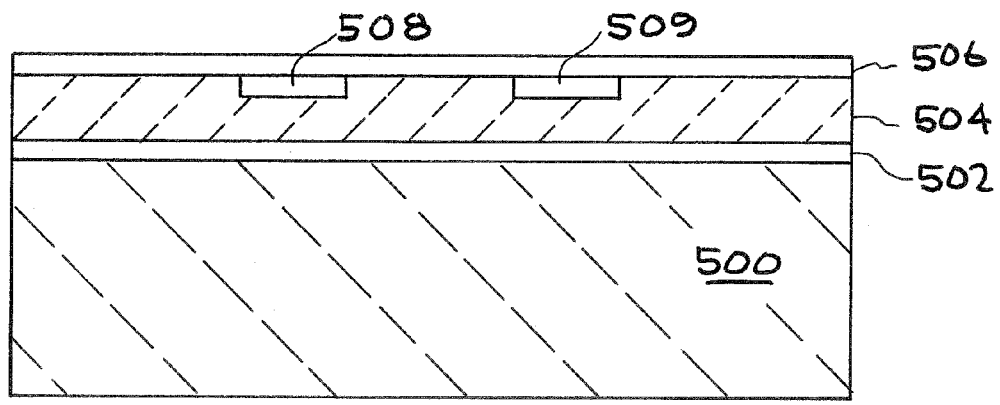
Figure 19C:
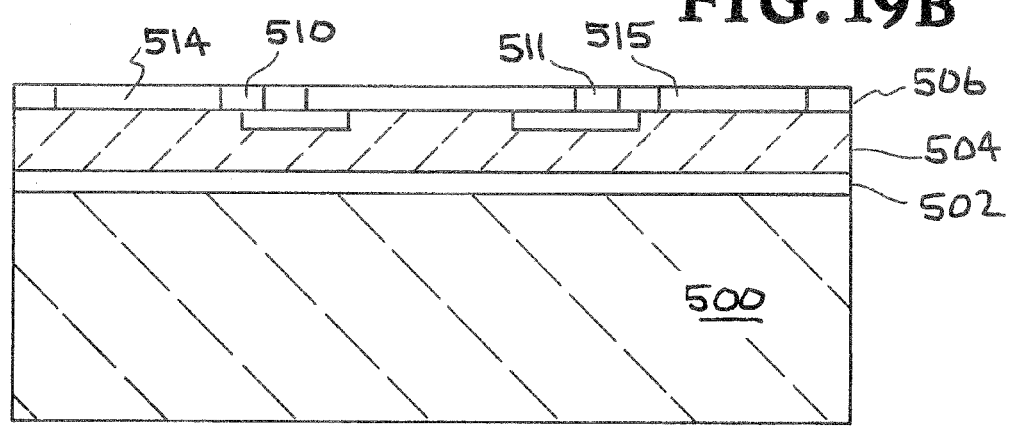
Figure 19D:
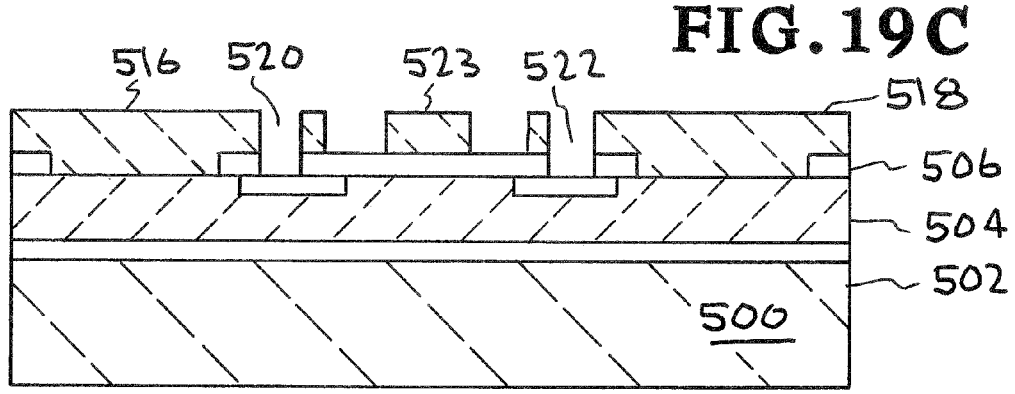
Figure 19E:
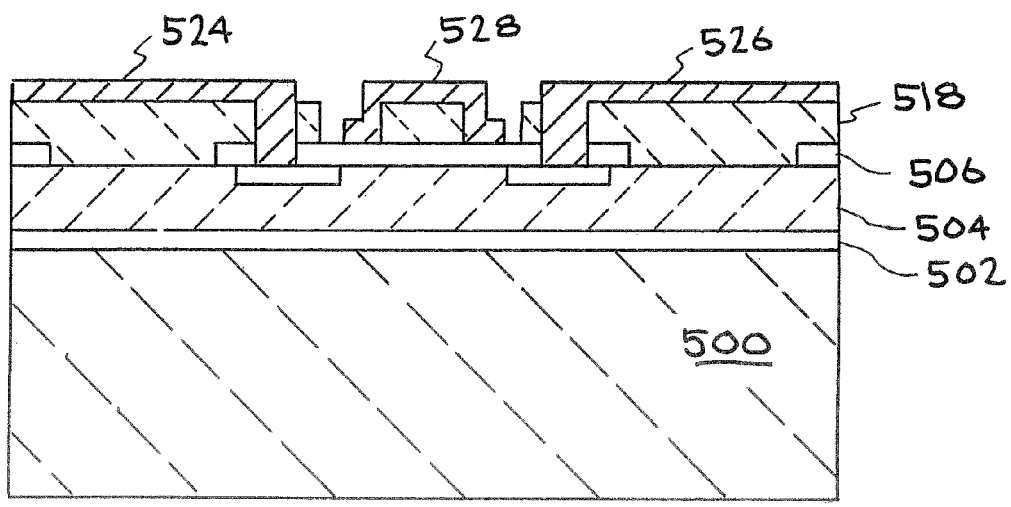
Figure 19F:
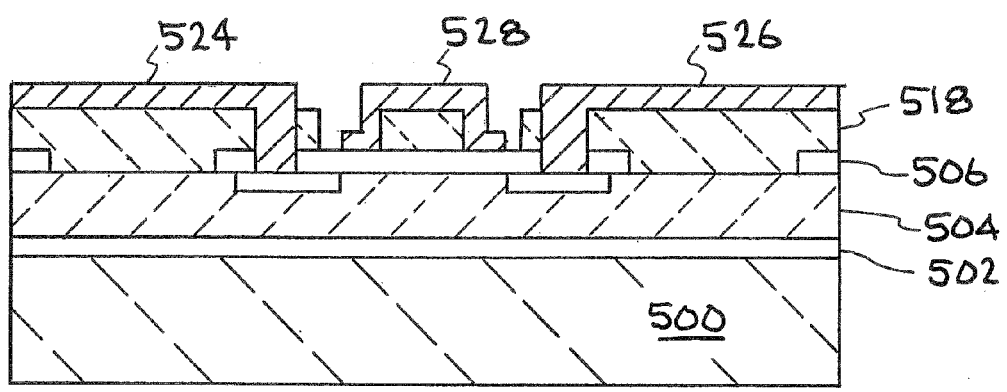
Figure 19G:
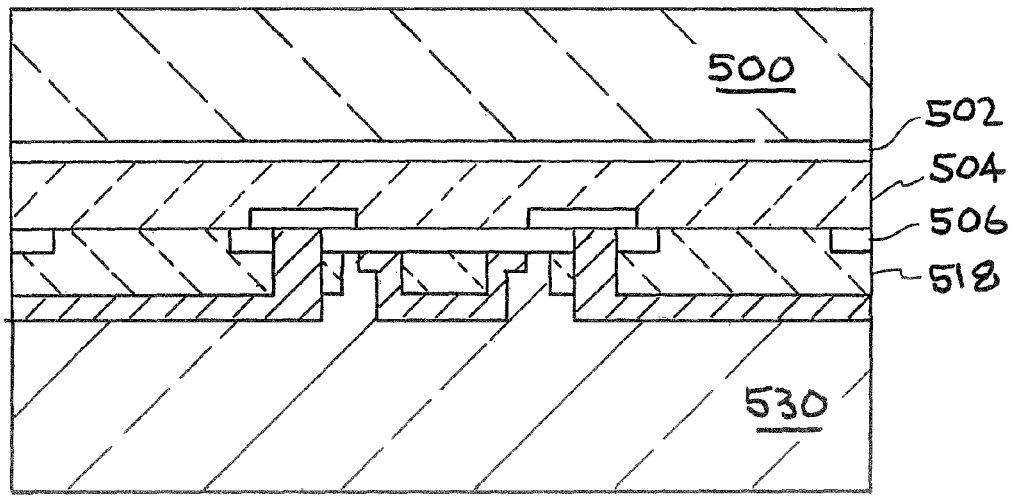
Figure 19H:
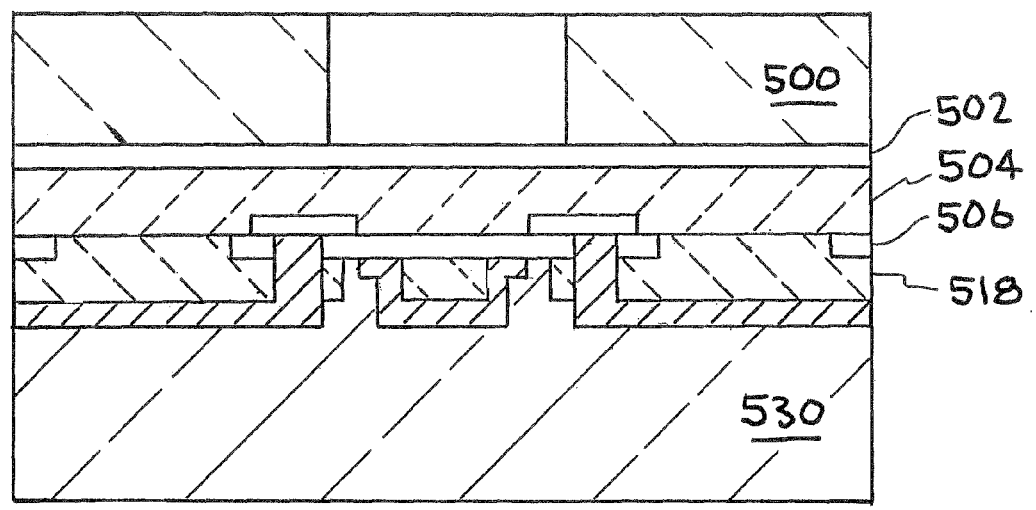
Figure 19I:
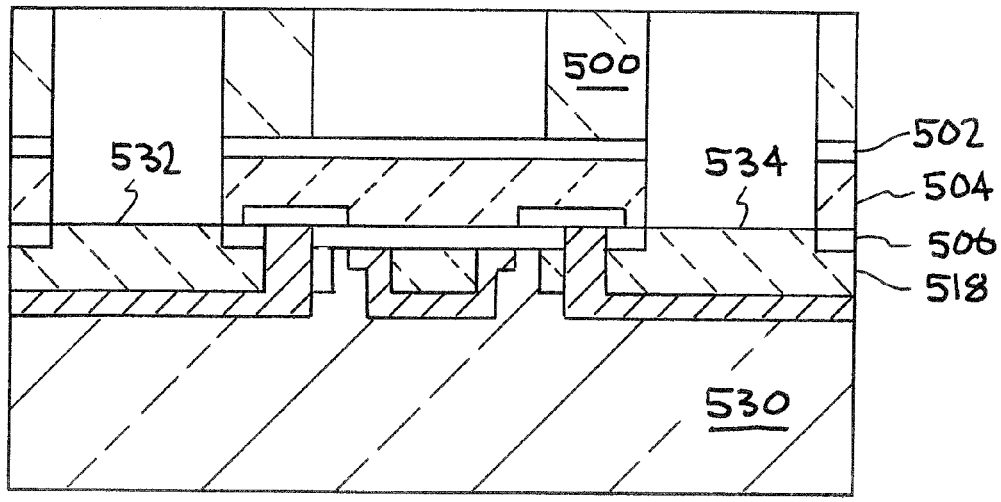
Figure 19J:
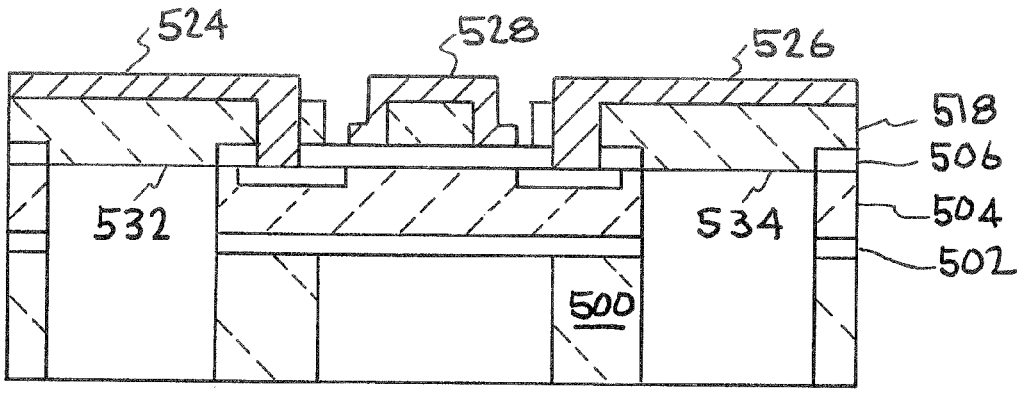

FIGS. 19A-J illustrate steps for producing another embodiment of the diaphragm type elastic body of the present invention where the electrical contact pads are extended from the chip, as e.g., shown in FIG. 23 discussed below. FIG. 19A shows the starting wafer configuration. In this example, the starting wafer includes a silicon handle 500 (e.g., ~500 μm thick), a BOX layer 502 (e.g., 0.2 μm thick), a silicon device layer 504 (e.g., varying thicknesses: 10, 15, 20, 25 μm), and masking oxide layer 506 (e.g., 0.1 μm). FIG. 19B shows boron 508 and 509 implanted into the silicon device layer to form the resistors. FIG. 19C shows the results of etching through the masking oxide layer 506 to form the contact holes 510 and 511 for the boron implants. Holes 514 and 515 are also etched through the masking oxide layer (at the polyimide bridge locations). FIG. 19D shows the results from spinning on and curing polyimide (e.g., ~5 μm) to form the bridges 516 and 518 for the metal lines. Open holes 520 and 522 in the polyimide form the contact holes for the boron implants. A polyimide bump 523 is created in the center of the diaphragm (used to planarize the surface, thus minimizing the stress on the polyimide bridges at the silicon edges and preventing breakage of the metal lines and to accentuate load on the diaphragm). A pattern of Ti/Ni/Au (or other metals) is then evaporated to form the metal contacts 524 and 526. The metal covering 528 on the diaphragm is used solely to help visualize the diaphragm location from the top of the device. The silicon handle is then thinned to ~40 μm as shown in FIG. 19F. The thinned silicon wafer is then attached, upside down, to a quartz handle 530, to allow further processing without breaking the silicon wafer and to facilitate the backside etching. The silicon handle is then etched down to the stopping oxide layer, as shown in FIG. 19H, to form the diaphragm. As shown in FIG. 19I, etching through the silicon handle (from the backside), the BOX layer, and the silicon device layer forms the polyimide bridges 532 and 534 and the streets between adjacent dies, allowing individual dies to be released. FIG. 19J shows the silicon device released from the quartz handle.

Figure 20A:
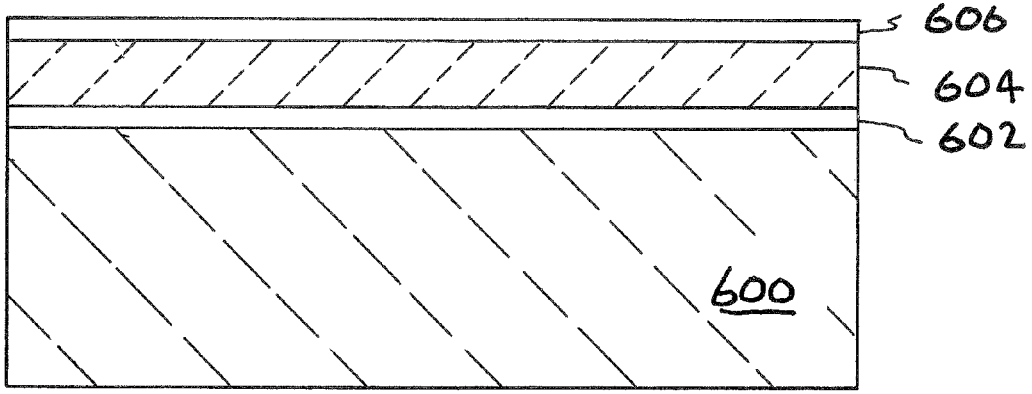
FIGS. 20A-K illustrate a process for fabricating an elastic body that includes a recessed electrical connection to electrical contact pads that are extended from the chip.
Figure 20B:
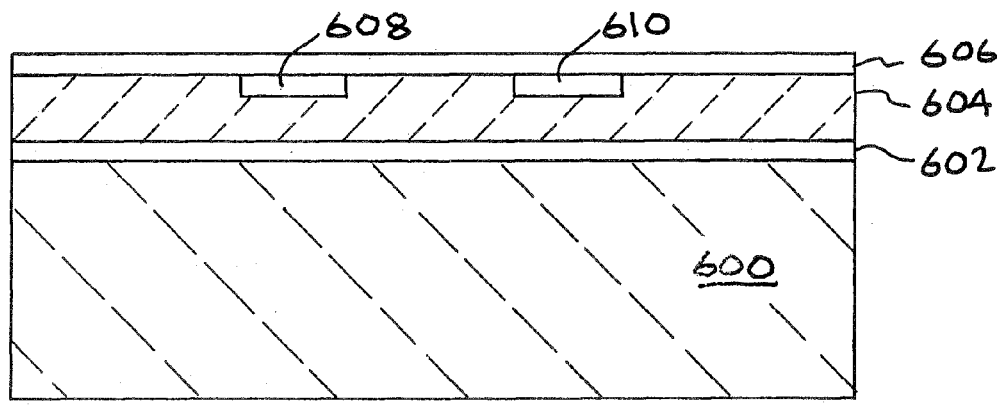
Figure 20C:
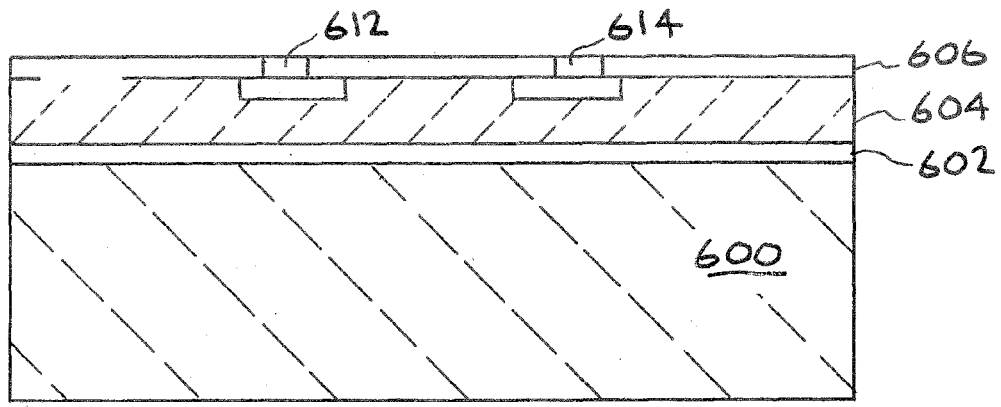
Figure 20D:
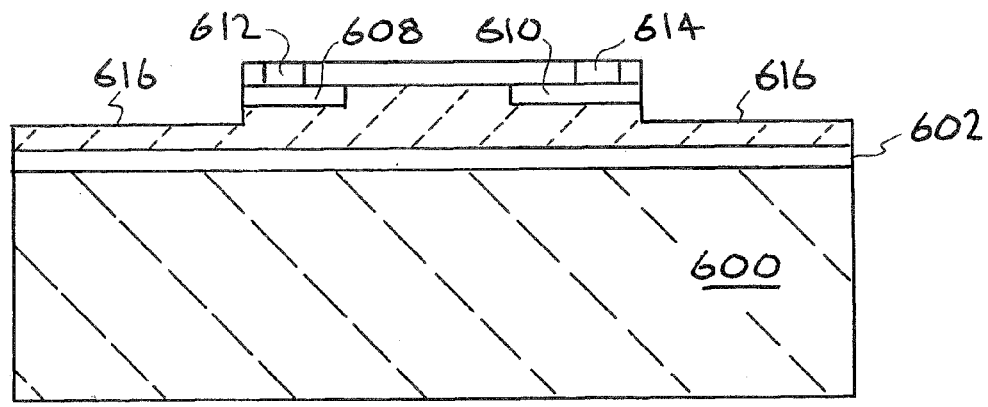
Figure 20E:
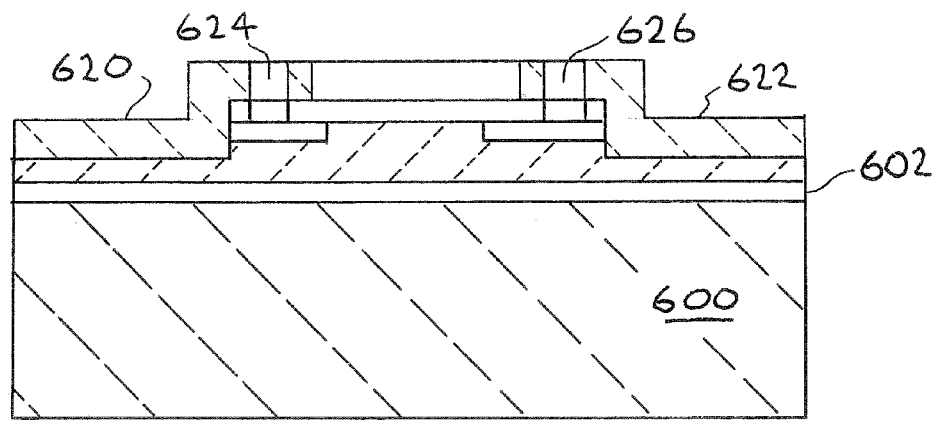
Figure 20F:
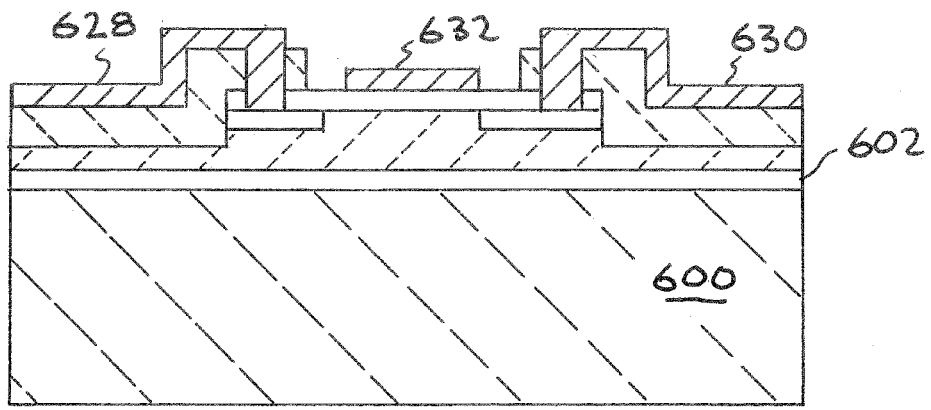
Figure 20G:
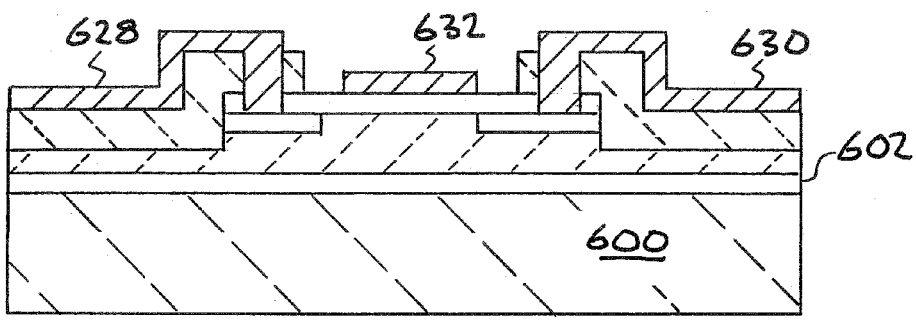
Figure 20H:
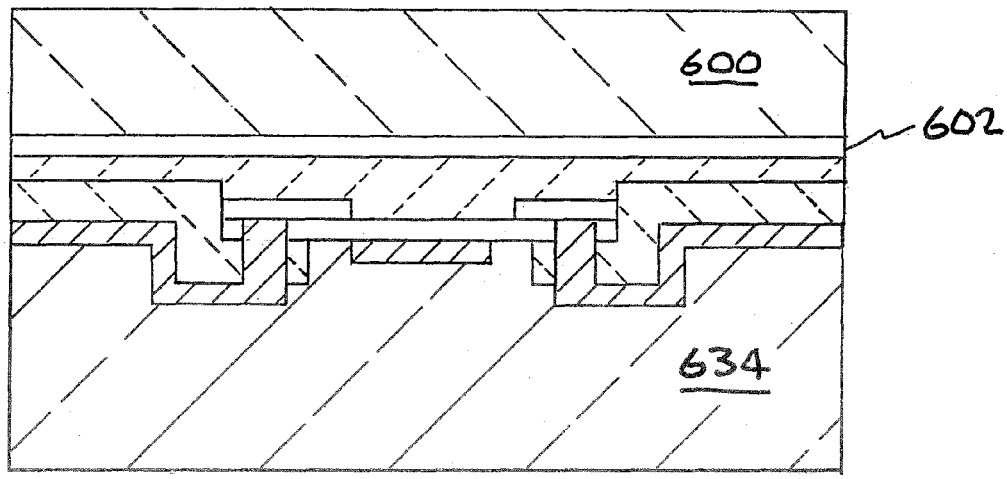
Figure 20I:
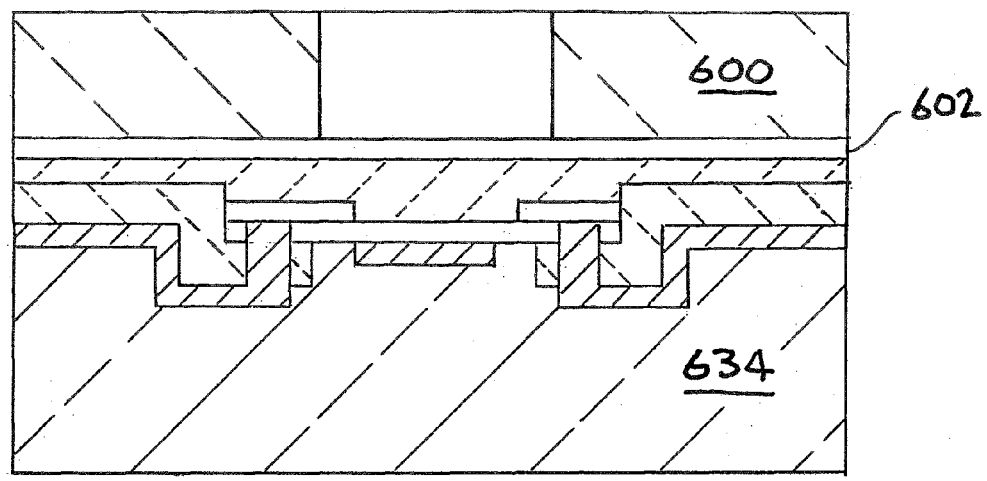
Figure 20J:
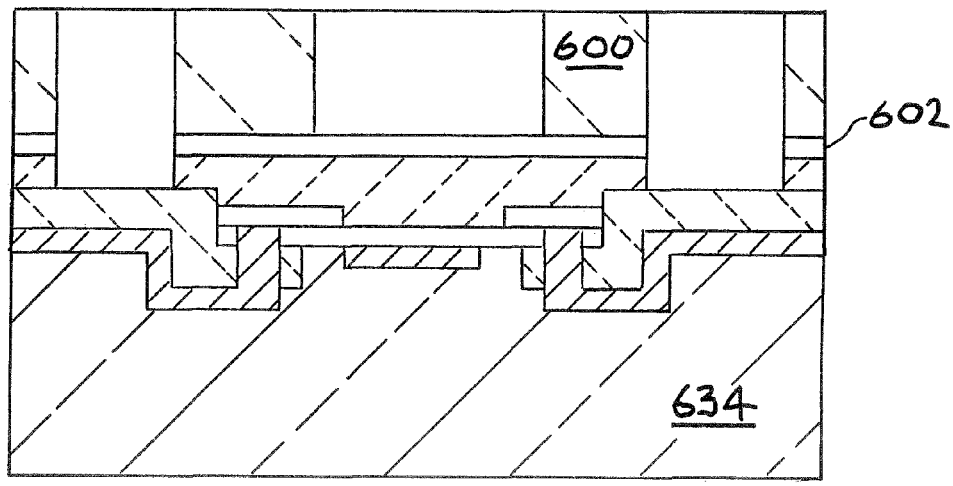
Figure 20K:
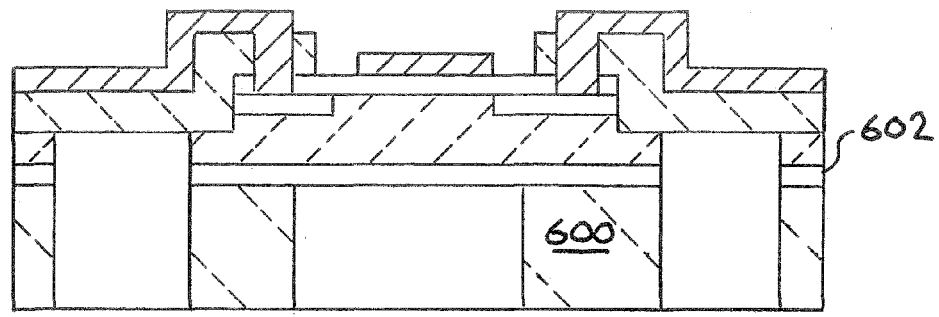

FIGS. 20A-K illustrate a process for fabricating an elastic body that includes a recessed electrical connection to electrical contact pads that are extended from the chip. The starting wafer includes a silicon handle 600 (e.g., ~500 μm thick), BOX layer 602 (e.g., 0.2 μm thick), silicon device layer 604 (e.g., thicknesses: 10, 15, 20, 25 μm), and masking oxide layer 606 (0.1 μm). Boron portions 608 and 610 are implanted in the silicon layer 604 (FIG. 20B) to form the resistors. The masking oxide layer is etched through to form the contact holes 612 and 614 for the boron implants (FIG. 20C). FIG. 20D illustrates the recesses 616 and 618 for the polyimide bridges. Recesses 616 and 618 are formed by etching through the masking oxide layer 606 and into the silicon device layer 604. Recesses 616 and 618 are used to recess the surface off which the metal lines depart the EB, thus minimizing the stress on the polyimide bridges at the silicon edges and preventing breakage of the metal lines. FIG. 20E shows results from the step of spinning on and curing the polyimide (e.g., ~5 μm thick) to form the bridges 620 and 622 for the metal lines. Open holes 624 and 626 in the polyimide form the contact holes for the boron implants. FIG. 20F shows the pattern of Ti/Ni/Au that forms the metal contacts 628 and 630. The metal covering 632 on the diaphragm is used solely to help visualize the diaphragm location from the top of the device. The silicon handle is thinned to ~40 μm (FIG. 20G). FIG. 20H shows the results from attaching the thin silicon wafer, upside down, to a quartz handle 634, to allow further processing without breaking the silicon wafer and to facilitate the backside etching. FIG. 20I shows the silicon handle after it has been etched through (from the backside), with the etch stopping at the BOX layer, to form the diaphragm. FIG. 20J shows the results of etching through the silicon handle (from the backside), the BOX layer, and the silicon device layer to form the polyimide bridges and the streets between adjacent dies, allowing individual dies to be released. FIG. 20K shows the silicon device released from the quartz handle.

Figure 21A:
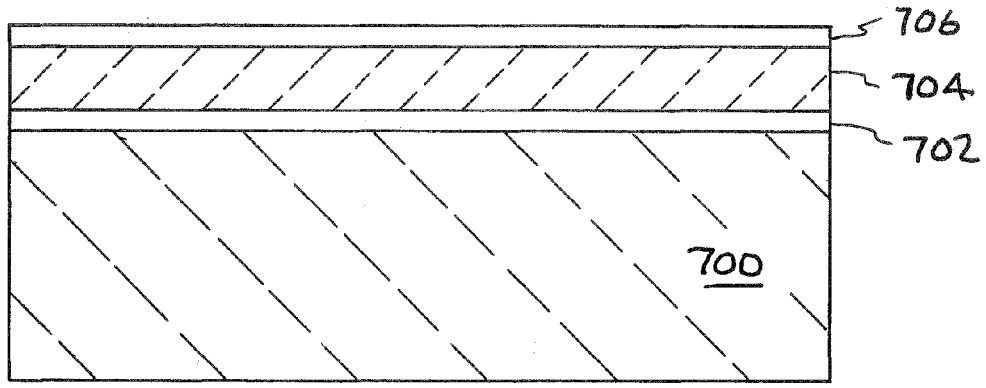
FIGS. 21A-M illustrate another process for fabricating an elastic body that includes a recessed electrical connection to electrical contact pads that are extended from the chip.
Figure 21B:
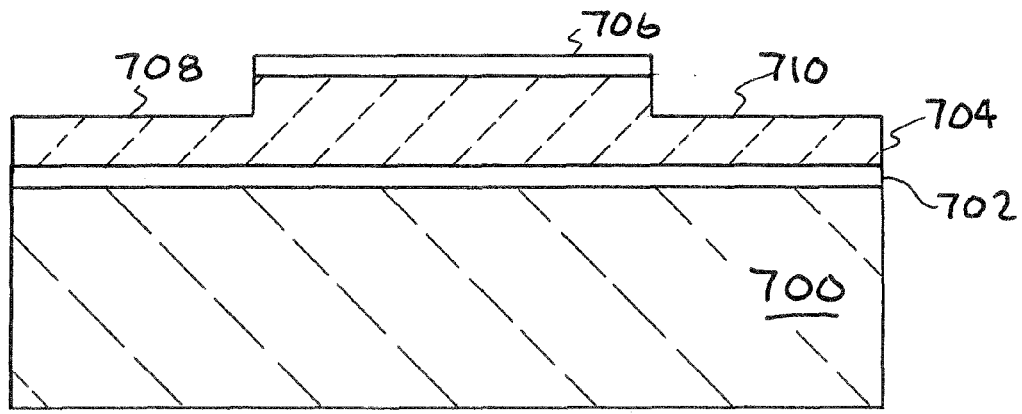
Figure 21C:
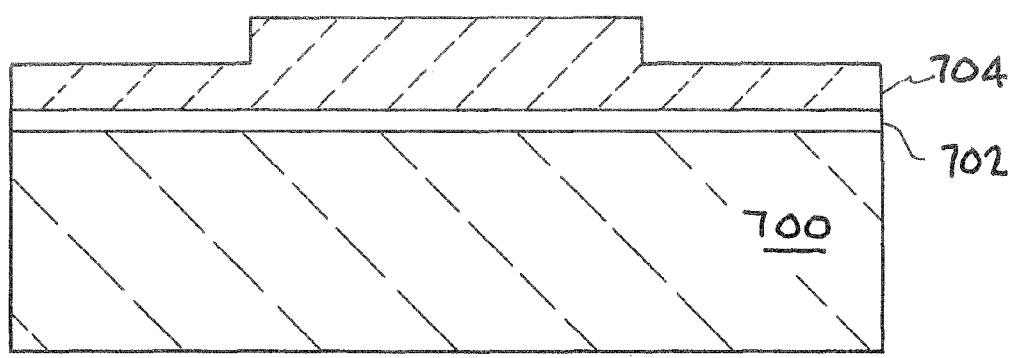
Figure 21D:
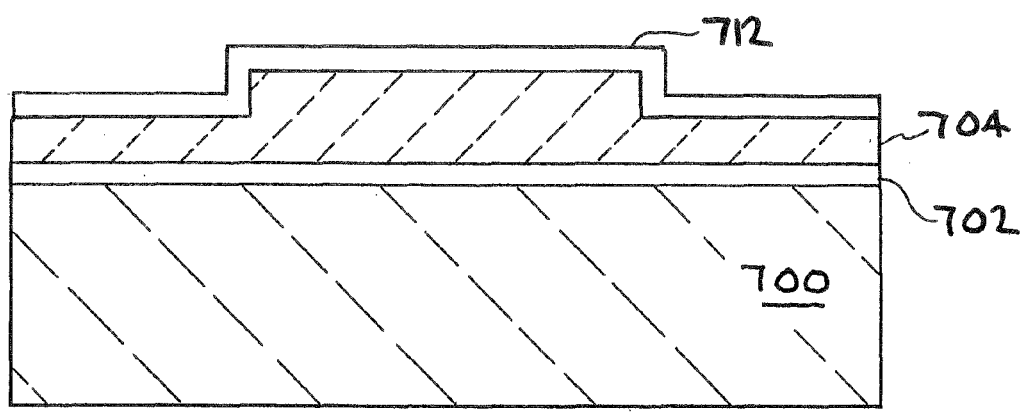
Figure 21E:
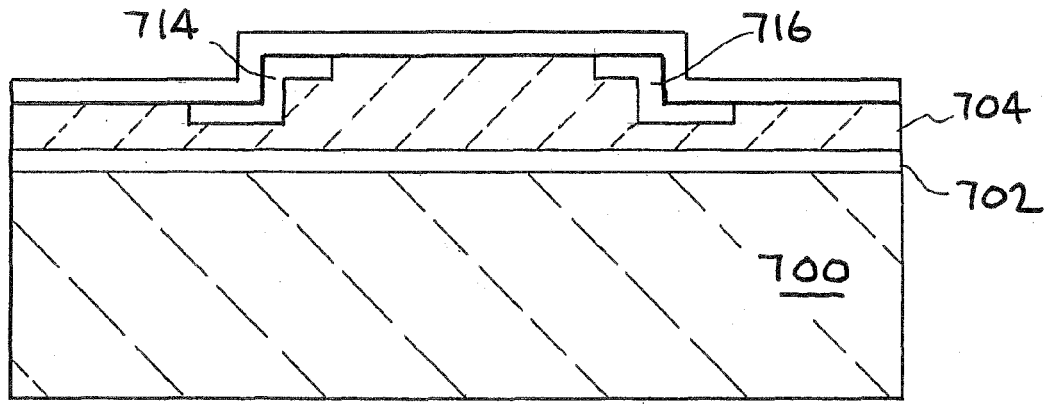
Figure 21F:
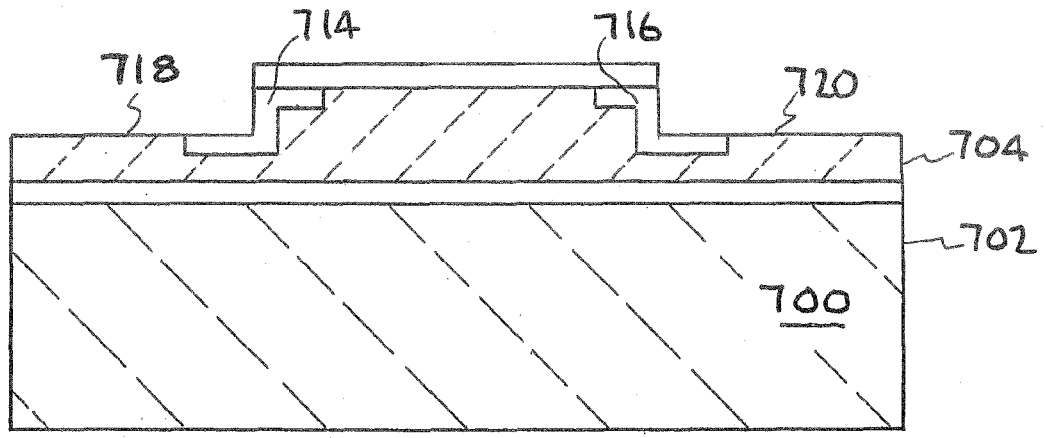
Figure 21G:
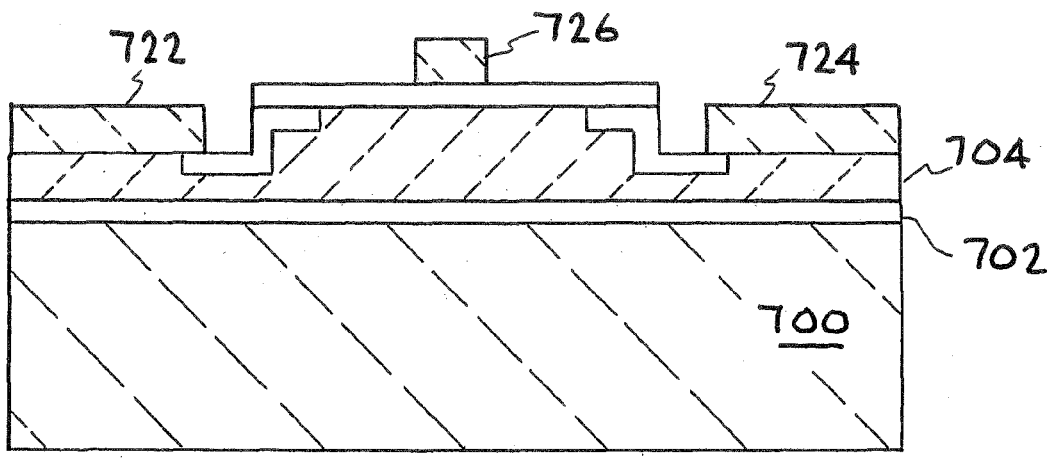
Figure 21H:
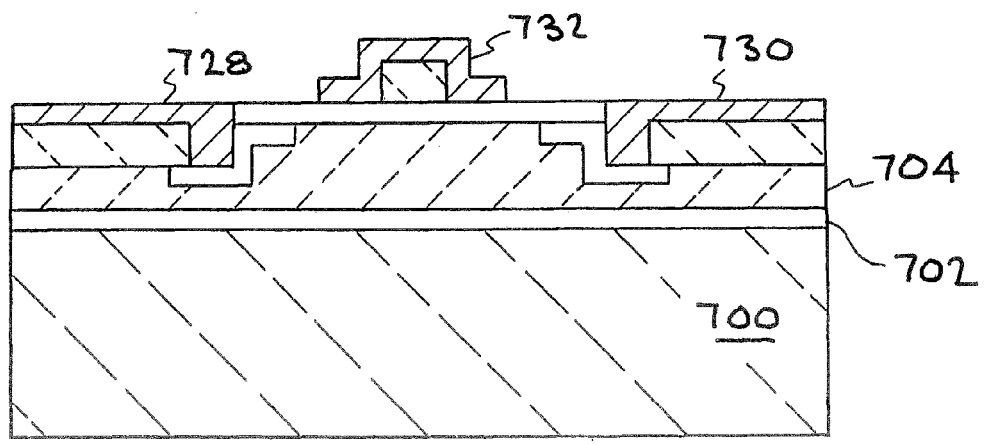
Figure 21I:
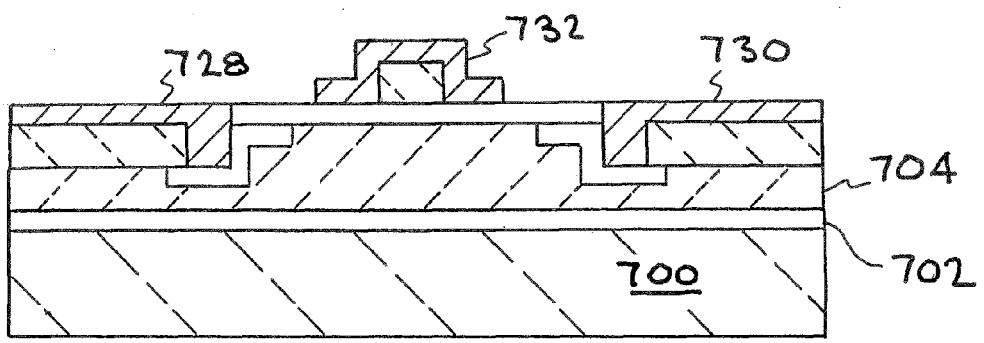
Figure 21J:
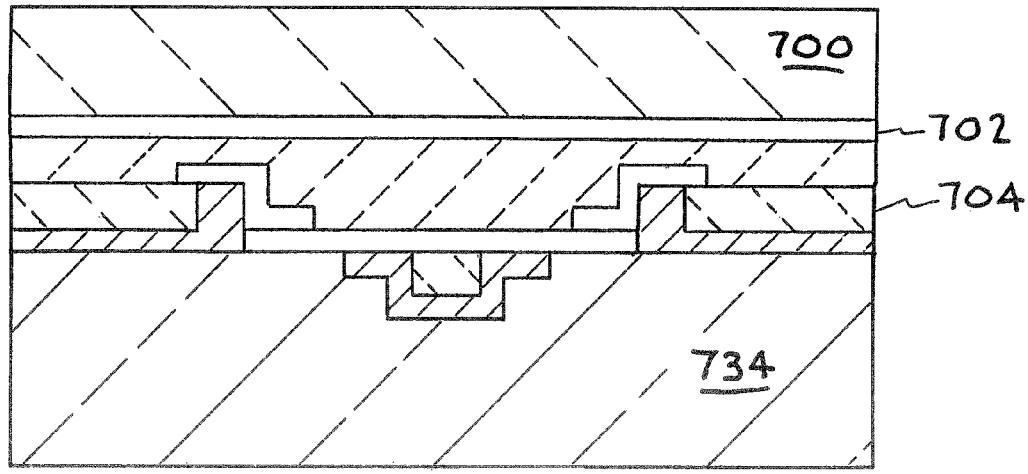
Figure 21K:
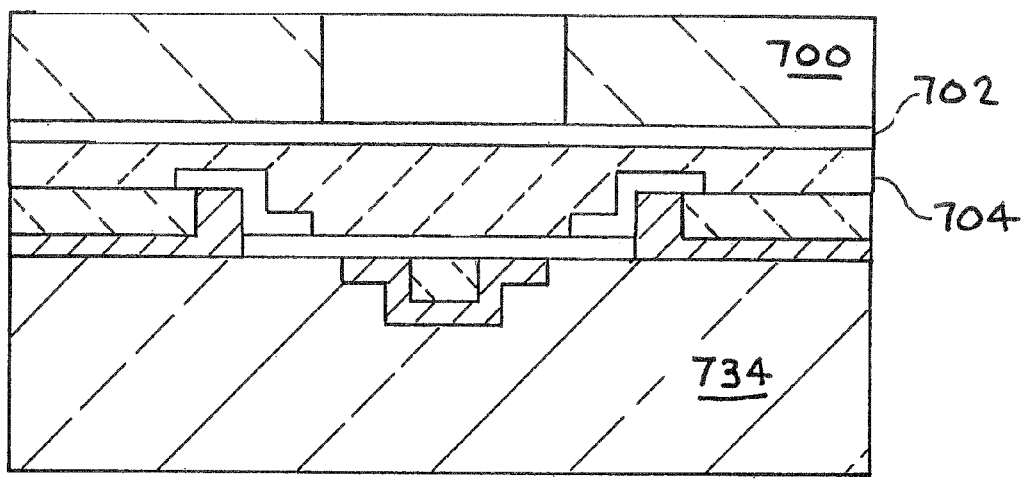
Figure 21:
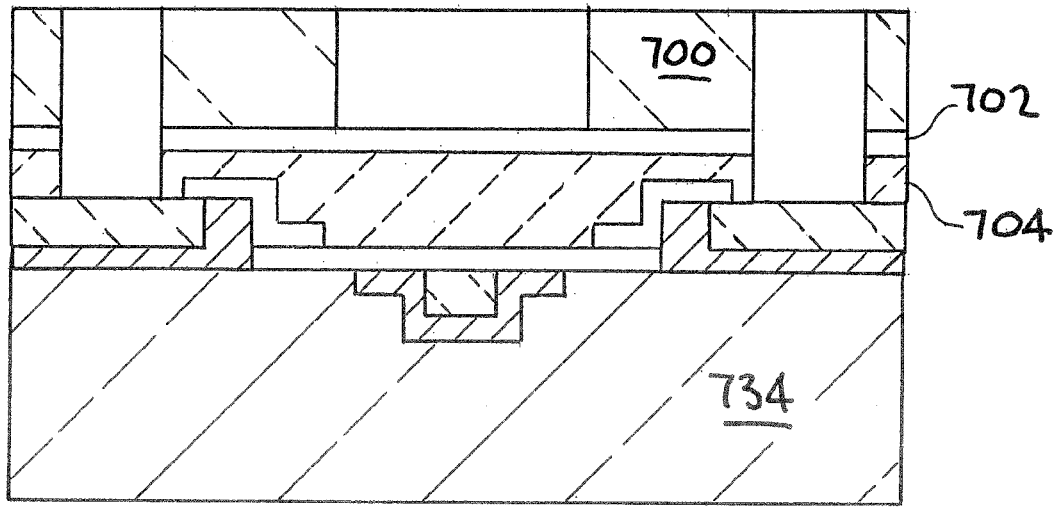
Figure 21:
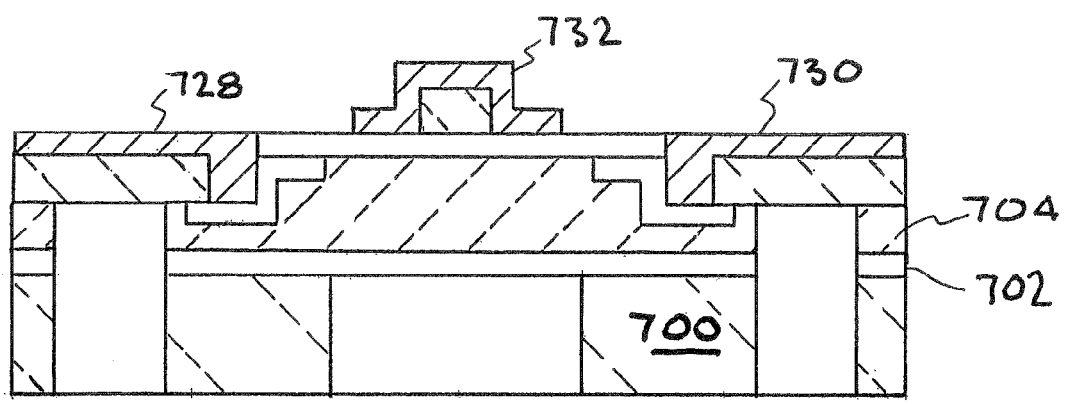

FIGS. 21A-M illustrate another process for fabricating an elastic body that includes a recessed electrical connection to electrical contact pads that are extended from the chip. In FIG. 21A, Starting wafer: Silicon Handle (~500 μm) 700, BOX layer (0.2 μm) 702, Silicon Device Layer (Varying Thicknesses: 10, 15, 20, 25 μm) 704, and Masking Oxide Layer (0.1 μm) 706. In FIG. 21B, etch through the masking oxide layer and into the silicon device layer to form the recesses 708 and 710 for the polyimide bridges (used to planarize the surface, thus minimizing the stress on the polyimide bridges at the silicon edges and preventing breakage of the metal lines). In FIG. 21C, strip the masking oxide layer. In FIG. 21D, thermally oxidize the silicon (0.1 μm) to provide oxide layer 712. In FIG. 21E, implant Boron 714 and 716 into the silicon device layer to form the resistors. In FIG. 21F, etch the oxide to form the contact holes 718 and 720 for the metal contacts to the Boron implants. In FIG. 21G, spin on and cure the polyimide (~5 μm) to form the bridges 722 and 724 for the metal lines. Open holes in the polyimide to form the contact holes for the Boron implants. Create a polyimide "bump" 726 in the center of the diaphragm (to accentuate load to the diaphragm and enhance device response). In FIG. 21H, evaporate and pattern the Ti/Ni/Au to form the metal contacts 728 and 730. (The metal layer 732 covering the diaphragm is used solely to help visualize the diaphragm location from the top of the device.) In FIG. 21I, thin the silicon handle to ~40 μm. In FIG. 21J, attach the thin silicon wafer, upside down, to a quartz handle 734, to allow further processing without breaking the silicon wafer and to facilitate the backside etching. In FIG. 21K, etch through the silicon handle (from the backside), stopping at the BOX layer, to form the diaphragm. In FIG. 21L, etch through the silicon handle (from the backside), the BOX layer, and the silicon device layer to form the polyimide bridges 736 and 738 and the streets between adjacent dies, allowing individual dies to be released. In FIG. 21M, release the silicon devices from the quartz handle.

Figure 22:
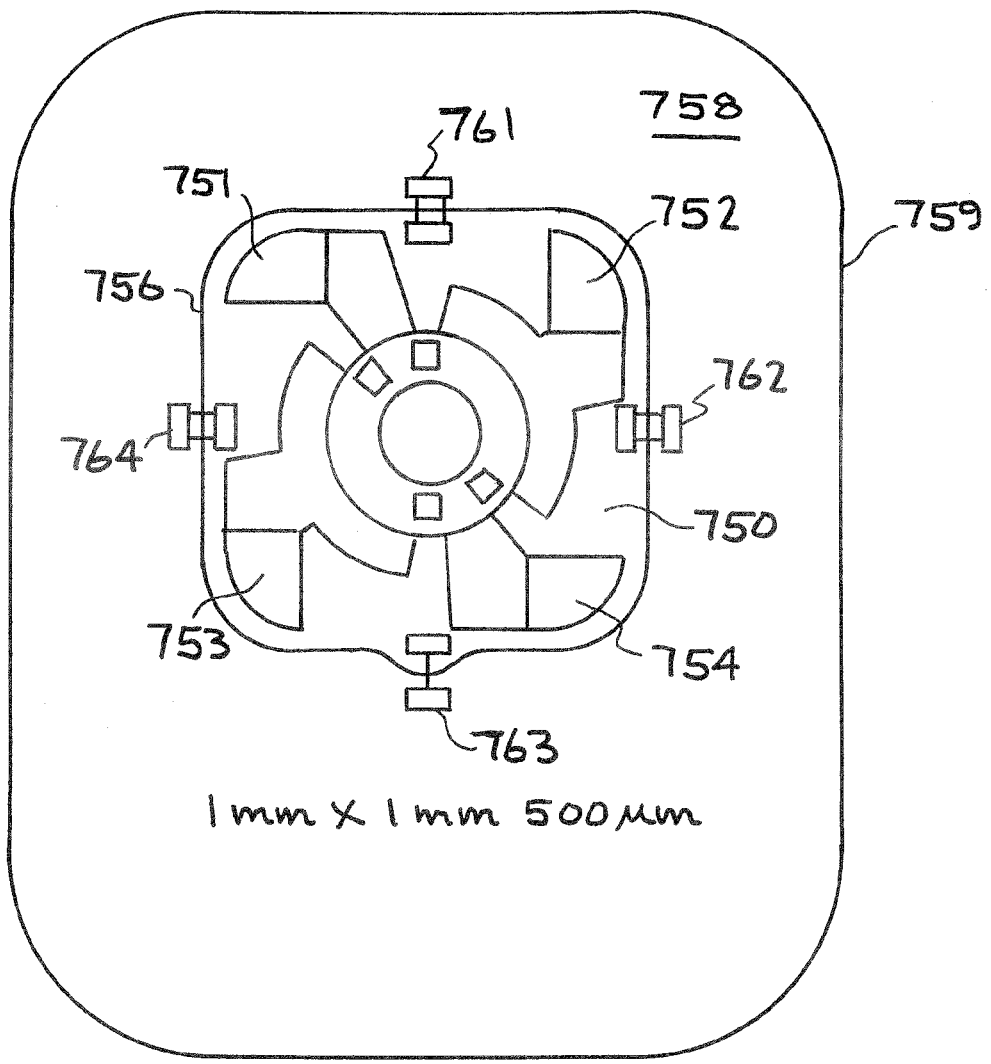
FIG. 22 shows a reduced chip area design where the contact pads are located on the chip.

FIG. 22 shows a reduced chip area design where the contact pads 751-754 are located on the chip. This embodiment also includes an etch 756 that separates the chip 750 from its handling frame 758. Breakaway tethers 761-764 temporarily hold the chip to the handling frame to allow tweezer handling of the frame. The handling frame includes an outer etch 759.

Figure 23:
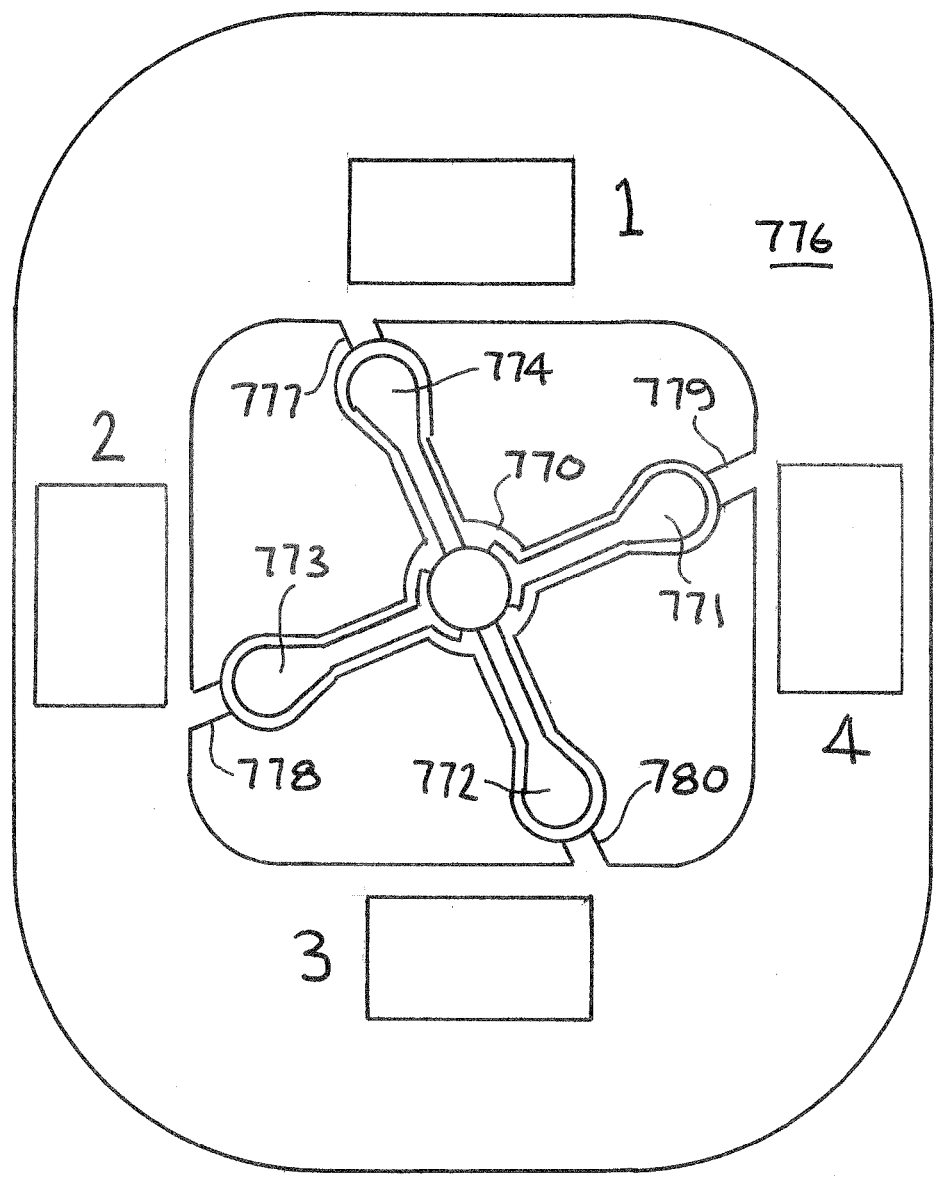
FIG. 23 shows a design where the pads are located off of the chip.

FIG. 23 shows a design where the pads 771-774 are located off of the chip 770. This design allows for excellent diaphragm load continuity, minimized die areas (e.g., 300 microns in diameter), a recessed design and includes a handling frame 776 with severable tethers 777-780.

Figure 24:
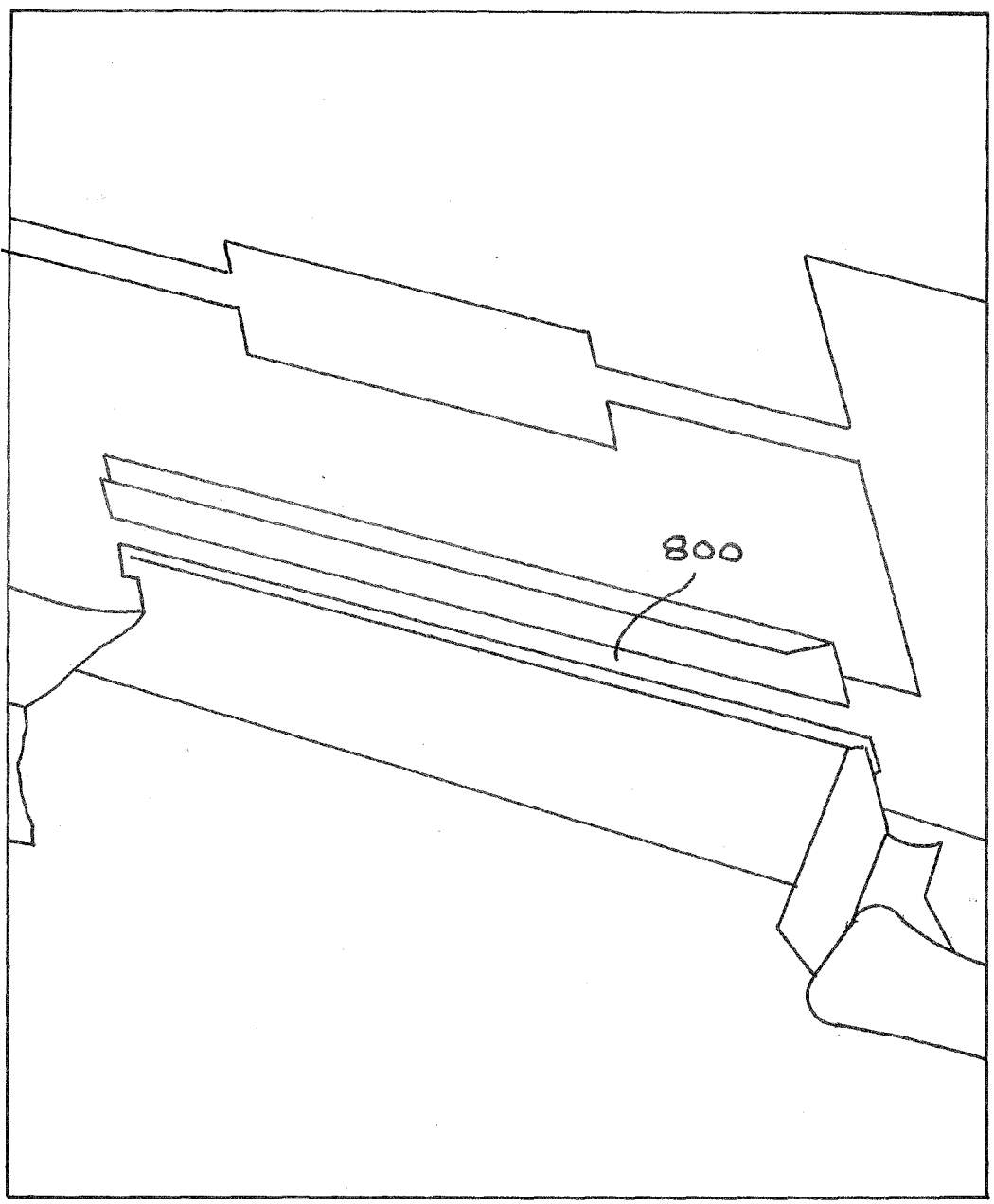
FIG. 24 shows a picture of a pressure sensitive element comprising a beam supported at its ends.
Figure 25A:
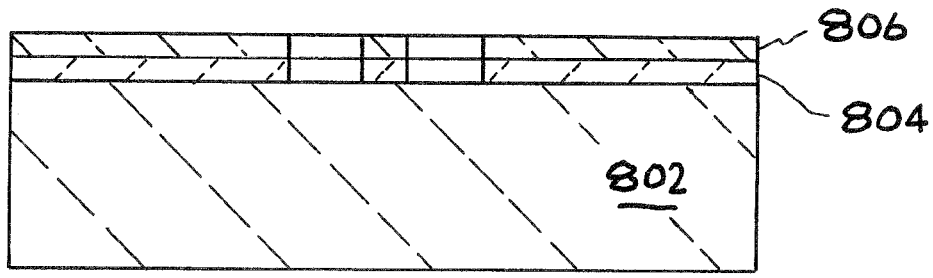
FIG. 25A shows a bulk silicon (100) wafer patterned with thermal oxide and photoresist.
Figure 25B:
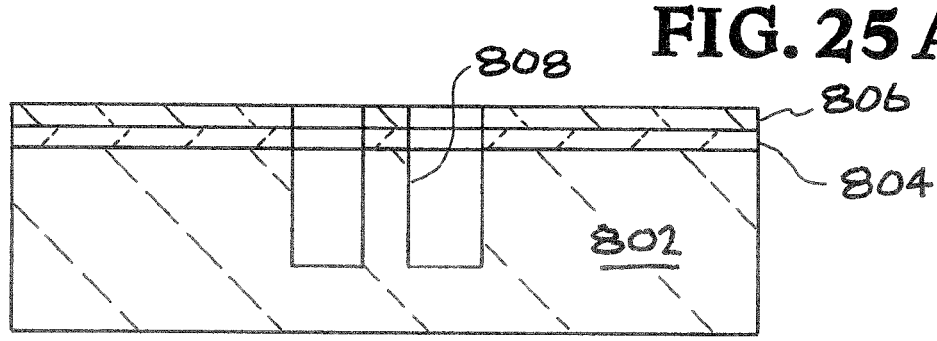
FIG. 25B shows the formation of a rib from a DRIE etch process.
Figure 25C:
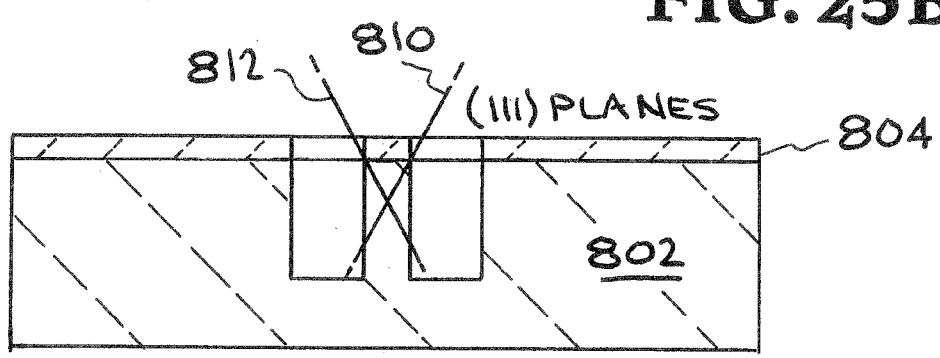
FIG. 25C shows the photoresist has been removed and the (111) planes on which a KOH etch is to be performed.
Figure 25D:
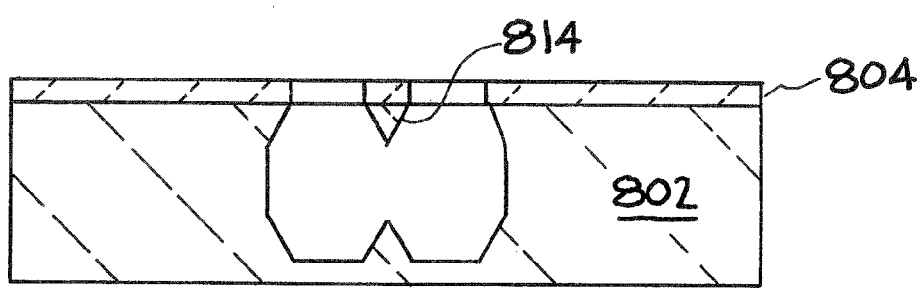
FIG. 25D shows the resulting beam following the KOH etch.

Although the diaphragm embodiments have been extensively discussed above, a cantilever beam or a beam supported at its ends can be used as the pressure sensitive element in the present invention. FIG. 24 shows a picture of a pressure sensitive element comprising a beam 800 supported at its ends. An exemplary process for making such a beam is shown in FIGS. 25A-D. FIG. 25A shows a bulk silicon (100) wafer 802 patterned thermal oxide (or silicon nitride) 804 and photoresist 806. FIG. 25B shows the formation of a rib 808 from a DRIE etch process. FIG. 25C shows the photoresist has been removed and a KOH etch it performed along the (111) planes 810 and 812. FIG. 25D shows the resulting beam 814 following the KOH etch.

Figure 26:
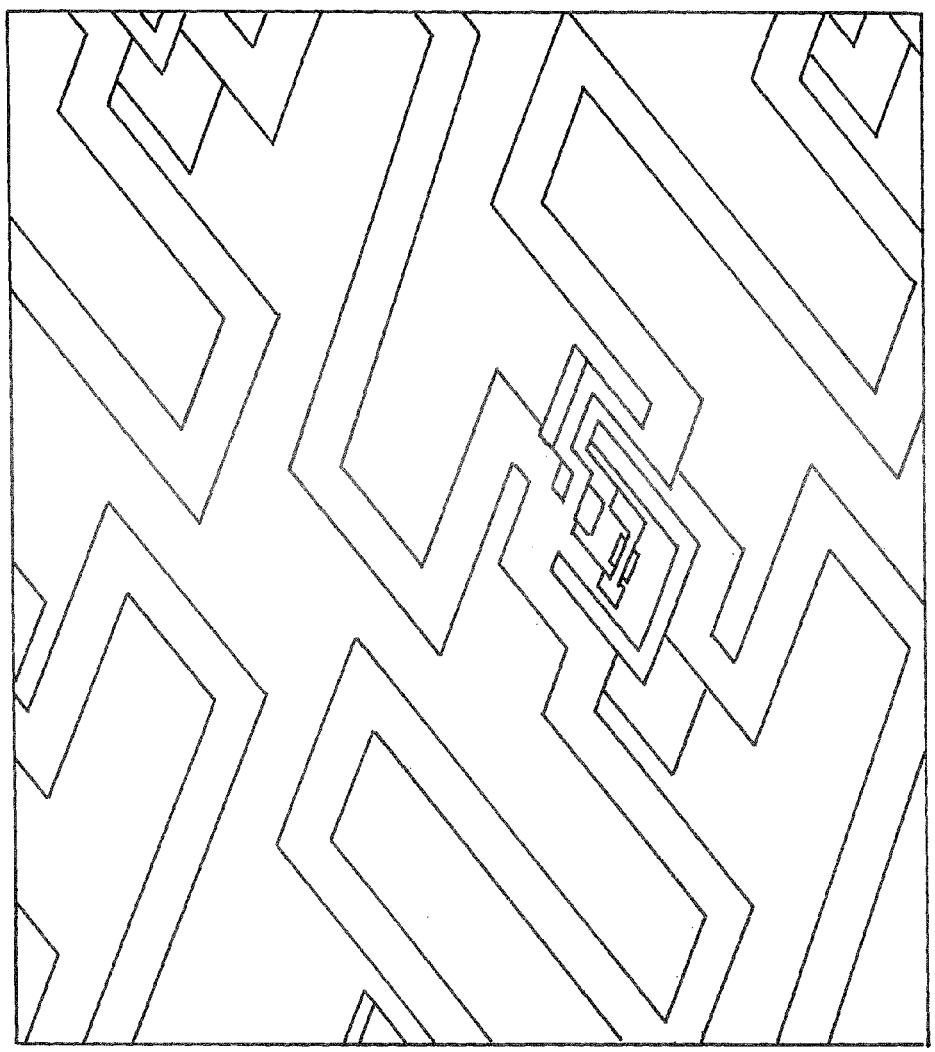
FIG. 26 shows a sensor array configuration where the flexible interconnects are metal traces on silicon springs.

FIG. 26 shows a sensor array configuration where the flexible interconnects are metal traces on silicon springs. The silicon device is formed from a single wafer and a mesh of silicon devices and interconnecting microsprings form a flexible and extensible two-dimensional array. Metal interconnects are shown on the silicon springs. Doped conductive traces are also possible. Although the metal on silicon spring is not as flexible and extensible as the free-standing metal version of the array, the metal is supported everywhere by silicon so shearing of the metal springs does not pose a concern. Various spring geometries are possible as the springs are fabricated with a plasma etch process (i.e. arbitrary spring curvatures can be formed, curved or rectilinear). In the above image, the metal conductive traces appear dark. They are positioned on the silicon which appears light. The lightest areas are the doped silicon. In this example, the doped silicon traverses a doubly supported beam. Also note that a mote exists around three sides of the stress sensitive area of the device to decouple bending of the springs from beam bending. This helps to reduce artifact of an array bending to conform to a curved surface from beam bending due to applied loads (the measurand of interest).

Figure 27:
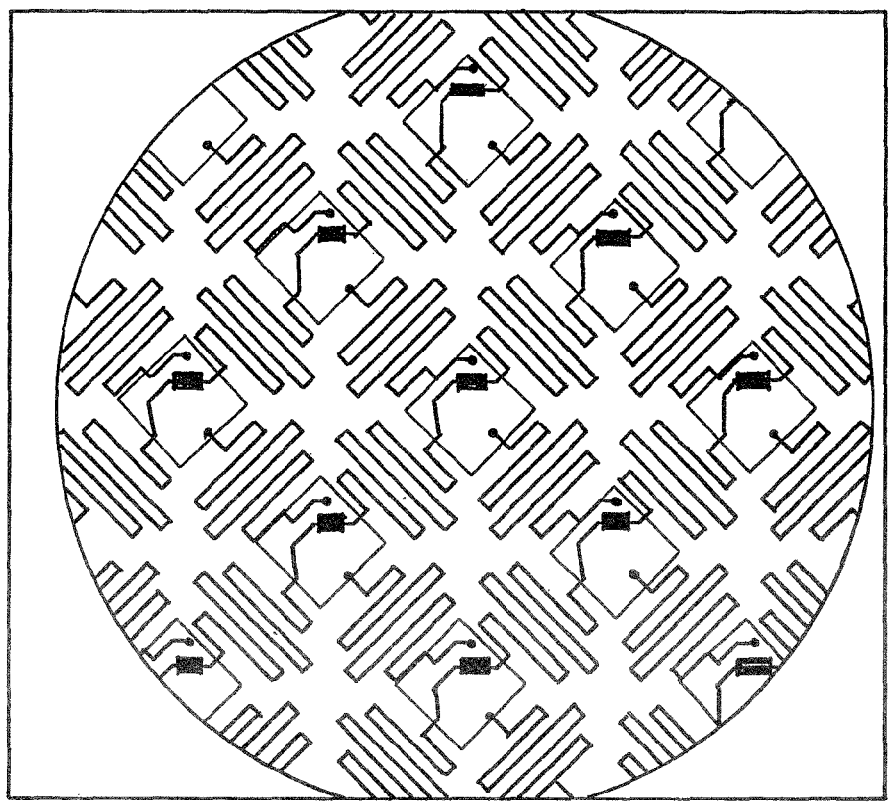
FIG. 27 is a view of a metal on silicon spring array.

FIG. 27 is a view of another metal on silicon spring array. Gold-capped metal traces form row-column wires that communicate with a doped trace that traverses each silicon doubly-supported beam.

Figure 28:
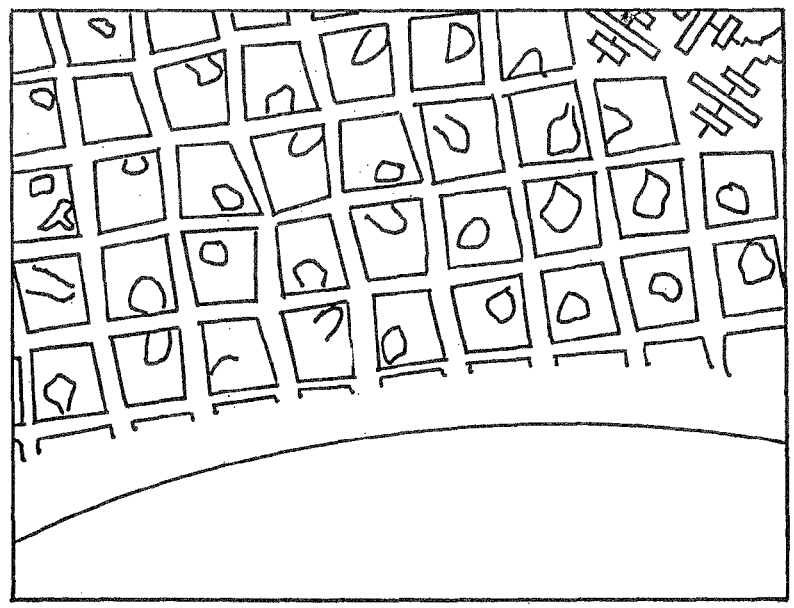
FIG. 28 is a view of independent islands of silicon that each carry a sensor arranged in a two-dimensional array.

FIG. 28 is a view of independent islands of silicon that each carry a sensor arranged in a two-dimensional array. A row-column wiring scheme interconnects the independent silicon devices. The wires are free-standing metal interconnects or metal interconnects supported by polymer or other substrates. In this example, the metal interconnects are supported and formed on silicone rubber. The silicone rubber allows flexibility and stretchability needed to conform to complex curvatures. A variety of spring geometries can be formed in the metal as their shape is arbitrarily defined by photolithography.

Figure 29:
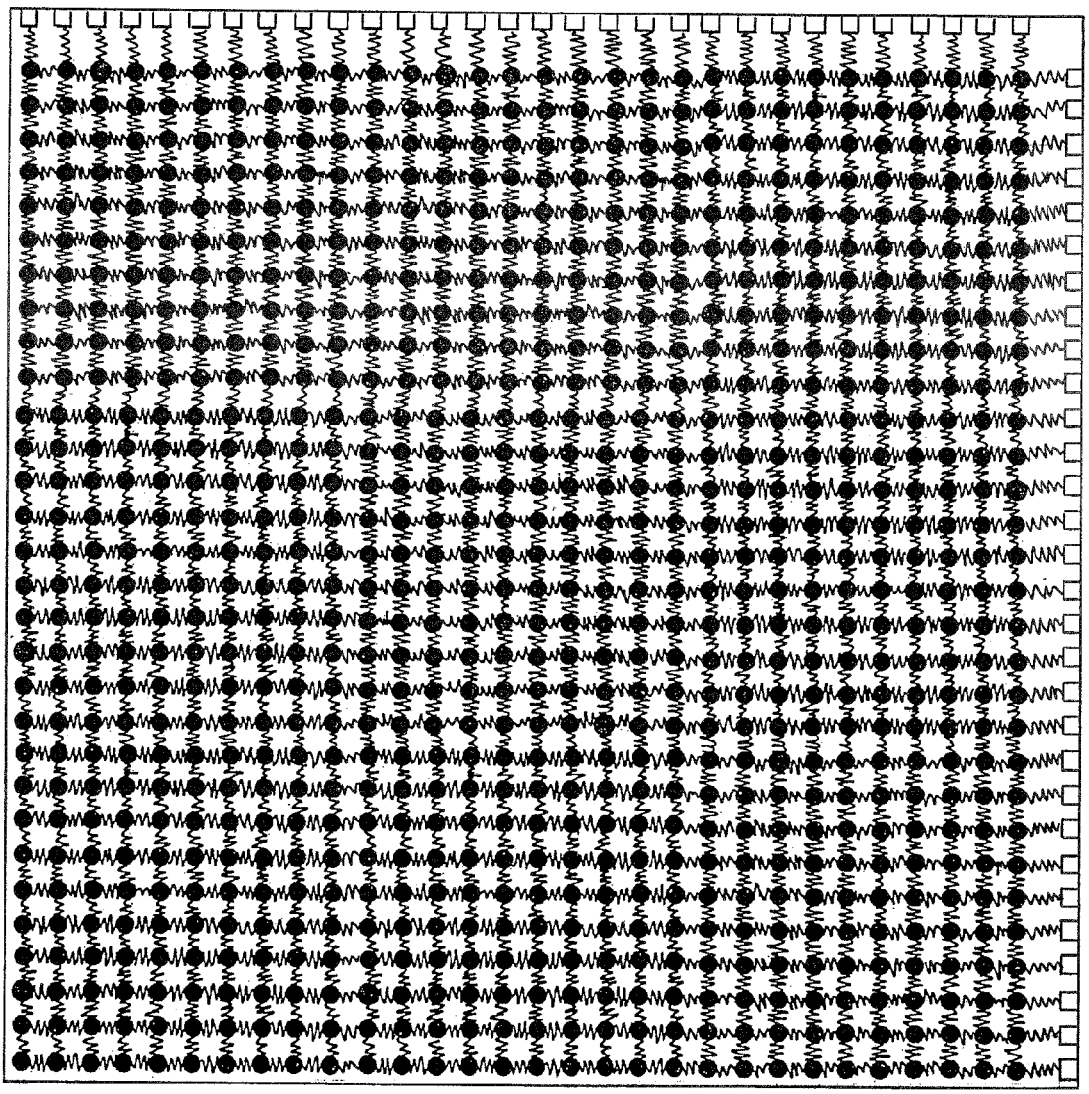
FIG. 29 is a view of a 30×30 (900 sensor) array.

FIG. 29 is a view of a 30×30 (900 sensor) array. Independent islands of silicon each carry a sensor. The sensors are interconnected by metal released on silicone-rubber as described above.

This and the following paragraphs generally describe some of the embodiments of the invention, and various alternates. One basic embodiment is an apparatus comprising a sensor element that includes a body having a thickness no greater than 280 μm, a recessed portion and a pressure sensitive element that extends over the recessed portion; and an electric circuit operatively connected to the pressure sensitive element, where the circuit includes a pressure signal generating circuit element configured to provide a signal when a force is exerted on the pressure sensitive element. The sensor element can be one of a plurality of sensor elements. The invention can further comprise a package, where the sensor element is located within the package to provide a packaged sensor element, where the sensor element together with the package comprises a total thickness no greater than 300 μm. When the invention includes a plurality of sensor elements, the plurality can be configured in an array selected from the group consisting of a one dimensional array and a two dimensional array. The sensor element is manufactured by a microfabrication process.

To enable handling, the sensor element can be processed by attaching it with an adhesive to a handle. The adhesive can be an ethylene vinyl acetate polymer. The sensor element can comprise silicon and can be single crystal silicon. The pressure sensitive element can comprise a configuration selected from the group consisting of a diaphragm, a cantilever and a doubly supported beam.

For the packaged sensor embodiments, the package can comprise a base layer, a mid-layer with an opening for the sensor element, and a capping layer, where the mid-layer is between the base layer and the capping layer. A conductive trace can be located between the base layer and the mid-layer and is in electrical contact with the electrical circuit. In some embodiments, the base layer, the mid-layer and the capping layer comprise the same material, e.g., polyimide. Solder may be located between the conductive trace and the circuit. The base layer can comprise polymer, where the mid-layer and the capping layer can each comprise at least one adhesive layer and at least one polymer layer. The base layer can further comprise a solder shim layer. The solder shim layer is configured to uniformly support the sensor element between the sensor element and the conductive trace. In other words, the base layer can comprises means for providing a deterministic solder thickness between the sensor element and the conductive trace.

In some embodiments, the conductive trace is in electrical contact with, but is not adhered or bonded to, the electrical circuit. In some embodiments, the conductive trace is not bonded to the electric circuit. In some embodiments, the invention can further comprise means for relieving residual stress curl of the package. In the diaphragm embodiment, a sealed reference gas volume can be located beneath the diaphragm. Some embodiments include a load amplification element in operative contact with the pressure sensitive element. The load amplification element can comprises an electroplated bump.

The electric circuit can comprise implant material implanted into the pressure sensitive element, where the pressure sensitive element comprises a substrate selected from the group consisting of an N type substrate, a P type substrate, an N type well in a P type substrate and a P type well in an N type substrate. When the substrate comprises an N type substrate, the implant material can comprise a P type material, where when the substrate comprises a P type substrate, the implant material can comprise an N type material. Where when the substrate comprises an N type well in a P type substrate the implant can comprise a P type implant and when the substrate comprises a P type well in an N type substrate the implant can comprise an N type implant. The implant material is generally activated by annealing. The implant material can be electrically connected to a conductor that extends off of the sensor element. The implant material can be electrically connected, at a bond pad, to a conductor that extends off of the sensor element, where the bond pad is stress shielded to prevent damage to the thin-film conductor.

Embodiments where the pressure sensitive element comprises a diaphragm can further comprise a thermal compensator comprising at least one piezoresistive circuit operatively placed on the diaphragm, where the pressure signal circuit element comprises at least one piezoresistive circuit operatively placed on the diaphragm. Embodiments where the sensor element comprises single crystal silicon, the single crystal silicon can comprise a <100> crystalline axis and a <110> crystalline axis, where a thermal compensator can be operatively placed on the <100> crystalline axis and where the pressure signal circuit element can be operatively placed on the <110> crystalline axis for p-type piezoresistors in a (100) wafer. The thermal compensator can comprise a first pair of piezoresistive circuits located about 180 degrees apart and where the pressure signal circuit element can comprise a second pair of piezoresistive circuits located about 180 degrees apart.

In embodiments where the pressure sensitive element comprises a diaphragm, the thermal compensator can comprise at least one piezoresistive circuit placed on the non-recessed portion, where the pressure signal circuit element comprises at least one piezoresistive circuit operatively placed on the diaphragm. In some cases, the base layer, the mid-layer and/or the capping layer comprise a B-stage polyimide. Sometimes the diaphragm is about 15 μm thick, and the body has a thickness that is about 50 μm. A compliant layer can be attached to the base layer on the side of the base layer opposite to that of the mid-layer.

The invention includes a variety of means for connecting the plurality of sensor elements together. The means for connecting can comprise an extensible interconnect that allows complex curvature conformability. The flexible interconnect can comprise a conductive trace which can further be embedded in polymer. The flexible interconnect can comprise a metal trace on a silicon spring. The plurality of sensor elements can be in a row and column electrical configuration.

A wide variety of alternate configurations and methods for are within the scope of the present invention. The cantilever or beam can be formed by a deep reactive ion etch followed by a potassium hydroxide etch. The basic sensor element can include means for providing thermal compensation to the signal. The package can comprise a material selected from the group consisting of ceramic, metal, and plastic. The plastic can be selected from the group consisting of hard plastic and epoxy based plastic. In some case, the package has a thickness no greater than 100 μm. The package can comprise a material selected from the group consisting of polymide, silicone and mylar. In some cases, the sensor element comprises a thickness no greater than 100 μm. The pressure sensitive element can comprise a thickness no greater than 50 μm. In some cases, the sensor element has a thickness no greater than 25 μm. The means for providing thermal compensation can be selected from the group consisting of a full wheat-stone bridge, a half wheat-stone bridge, a quarter bridge and a temperature device. The pressure sensitive element can comprise a circuit comprising a circuit element selected from the group consisting of a piezoresistive circuit element, a piezoelectric circuit element and a capacitive circuit element. The present invention includes the methods for fabricating all of the above described embodiments.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
   a sensor element that includes a body having a thickness no greater than 280 μm, a recessed portion and a pressure sensitive element that extends over said recessed portion;
   an electric circuit operatively connected to said pressure sensitive element, wherein said circuit includes a pressure signal generating circuit element configured to provide a signal when a force is exerted on said pressure sensitive element; and
   a package, wherein said sensor element is located within said package to provide a packaged sensor element, wherein said sensor element together with said package comprises a total thickness no greater than 300 μm and wherein said package comprises a material selected from the group consisting of ceramic, metal, and plastic.

2. The apparatus of claim 1, wherein said sensor element is one of a plurality of sensor elements.

3. The apparatus of claim 2, wherein said plurality of sensor elements is configured in an array selected from the group consisting of a one dimensional array and a two dimensional array.

4. The apparatus of claim 2, further comprising means for connecting said plurality of sensor elements together.

5. The apparatus of claim 4, wherein said means for connecting comprise an extensible interconnect that allows complex curvature conformability.

6. The apparatus of claim 5, wherein said flexible interconnect comprises a conductive trace.

7. The apparatus of claim 6, wherein said conductive trace is embedded in polymer.

8. The apparatus of claim 1, wherein said sensor element is manufactured by a microfabrication process.

9. The apparatus of claim 1, wherein said sensor element is processed by attaching it with an adhesive to a handle.

10. The apparatus of claim 9, wherein said adhesive comprises an ethylene vinyl acetate polymer.

11. The apparatus of claim 1, wherein said sensor element comprises silicon.

12. The apparatus of claim 11, wherein said pressure sensitive element comprises a diaphragm, and further comprises a thermal compensator comprising at least one piezoresistive circuit, wherein said pressure signal generating circuit element comprises at least one piezoresistive circuit operatively placed on said diaphragm.

13. The apparatus of claim 1, wherein said sensor element comprises single crystal silicon.

14. The apparatus of claim 1, wherein said pressure sensitive element comprises a configuration selected from the group consisting of a diaphragm, a cantilever and a doubly supported beam.

15. The apparatus of claim 14, further comprising a sealed reference gas volume beneath said diaphragm.

16. The apparatus of claim 14, wherein said diaphragm is about 15 μm thick, wherein said body has a thickness that is about 50 μm.

17. The apparatus of claim 14, wherein said cantilever or beam is formed by a deep reactive ion etch followed by a potassium hydroxide etch.

18. The apparatus of claim 1, wherein said package comprises a base layer, a mid-layer with an opening for said sensor element, and a capping layer, wherein said mid-layer is between said base layer and said capping layer.

19. The apparatus of claim 18, wherein a conductive trace is located between said base layer and said mid-layer and is in electrical contact with said electrical circuit.

20. The apparatus of claim 19, wherein said base layer, said mid-layer and said capping layer comprise the same material.

21. The apparatus of claim 20, wherein said base layer, said mid-layer and said capping layer comprise polyimide.

22. The apparatus of claim 18, further comprising means for relieving residual stress curl of said package.

23. The apparatus of claim 1, further comprising a load amplification element in operative contact with said pressure sensitive element.

24. The apparatus of claim 1, wherein said electric circuit comprises implant material implanted into said pressure sensitive element, wherein said pressure sensitive element comprises a substrate selected from the group consisting of an N type substrate, a P type substrate, an N type well in a P type substrate and a P type well in an N type substrate.

25. The apparatus of claim 24, wherein when said substrate comprises an N type substrate, said implant material comprises a P type material, wherein when said substrate comprises a P type substrate, said implant material comprises an N type material.

26. The apparatus of claim 24, wherein said implant material is electrically connected to a conductor that extends off of said sensor element.

27. The apparatus of claim 1, wherein said plurality of sensor elements are electrically in a row and column configuration.

28. The apparatus of claim 1, further comprising means for providing thermal compensation to said signal.

29. The apparatus of claim 28, wherein said means for providing thermal compensation are selected from the group consisting of a full wheat-stone bridge, a half wheat-stone bridge, a quarter bridge and a temperature device.

30. The apparatus of claim 1, wherein said plastic is selected from the group consisting of hard plastic and epoxy based plastic.

31. The apparatus of claim 1, wherein said package has a thickness no greater than 100 μm.

32. The apparatus of claim 1, wherein said package comprises a material selected from the group consisting of polymide, silicone and mylar.

33. The apparatus of claim 1, wherein said sensor element comprises a thickness no greater than 100 μm.

34. The apparatus of claim 1, wherein said pressure sensitive element comprises a thickness no greater than 50 μm.

35. The apparatus of claim 1, wherein said sensor element has a thickness no greater than 25 μm.

36. The apparatus of claim 1, wherein said pressure sensitive element comprises a circuit comprising a circuit element selected from the group consisting of a piezoresistive circuit element, a piezoelectric circuit element and a capacitive circuit element.

37. An apparatus, comprising:
a sensor element that includes a body having a thickness no greater than 280 μm, a recessed portion and a pressure sensitive element that extends over said recessed portion;
an electric circuit operatively connected to said pressure sensitive element, wherein said circuit includes a pressure signal generating circuit element configured to provide a signal when a force is exerted on said pressure sensitive element;
a package, wherein said sensor element is located within said package to provide a packaged sensor element, wherein said sensor element together with said package comprises a total thickness no greater than 300 μm, wherein said package comprises a base layer, a mid-layer with an opening for said sensor element, and a capping layer, wherein said mid-layer is between said base layer and said capping layer, wherein a conductive trace is located between said base layer and said mid-layer and is in electrical contact with said electrical circuit; and
solder between said conductive trace and said circuit.

38. The apparatus of claim 37, wherein said base layer comprises polymer, wherein said mid-layer and said capping layer each comprise at least one adhesive layer and at least one polymer layer.

39. The apparatus of claim 38, wherein said base layer further comprises a solder shim layer.

40. The apparatus of claim 39, wherein said solder shim layer is configured to uniformly support said sensor element between said sensor element and said conductive trace.

41. The apparatus of claim 37, wherein said base layer comprises polymer, wherein said mid-layer and said capping layer each comprise at least one adhesive layer and at least one polymer layer, wherein said base layer further comprises a solder shim layer, wherein said polymer comprises polyimide.

42. An apparatus, comprising:
a sensor element that includes a body having a thickness no greater than 280 μm, a recessed portion and a pressure sensitive element that extends over said recessed portion;
an electric circuit operatively connected to said pressure sensitive element, wherein said circuit includes a pressure signal generating circuit element configured to provide a signal when a force is exerted on said pressure sensitive element; and
a package, wherein said sensor element is located within said package to provide a packaged sensor element, wherein said sensor element together with said package comprises a total thickness no greater than 300 μm, wherein said package comprises a base layer, a mid-layer with an opening for said sensor element, and a capping layer, wherein said mid-layer is between said base layer and said capping layer and wherein said base layer comprises means for providing a deterministic solder thickness between said sensor element and said conductive trace.

43. An apparatus, comprising:
a sensor element that includes a body having a thickness no greater than 280 μm, a recessed portion and a pressure sensitive element that extends over said recessed portion;
an electric circuit operatively connected to said pressure sensitive element, wherein said circuit includes a pressure signal generating circuit element configured to provide a signal when a force is exerted on said pressure sensitive element; and a package, wherein said sensor element is located within said package to provide a packaged sensor element, wherein said sensor element together with said package comprises a total thickness no greater than 300 µm, wherein said package comprises a base layer, a mid-layer with an opening for said sensor element, and a capping layer, wherein said mid-layer is between said base layer and said capping layer, wherein a conductive trace is located between said base layer and said mid-layer and is in electrical contact with said electrical circuit and wherein said conductive trace is in electrical contact with, but is not adhered or bonded to, said electrical circuit.

44. An apparatus, comprising:
a sensor element that includes a body having a thickness no greater than 280 µm, a recessed portion and a pressure sensitive element that extends over said recessed portion;
an electric circuit operatively connected to said pressure sensitive element, wherein said circuit includes a pressure signal generating circuit element configured to provide a signal when a force is exerted on said pressure sensitive element; and
a package, wherein said sensor element is located within said package to provide a packaged sensor element, wherein said sensor element together with said package comprises a total thickness no greater than 300 µm, wherein said package comprises a base layer, a mid-layer with an opening for said sensor element, and a capping layer, wherein said mid-layer is between said base layer and said capping layer, wherein a conductive trace is located between said base layer and said mid-layer and is in electrical contact with said electrical circuit and wherein said conductive trace is not bonded to said electric circuit.

45. An apparatus, comprising:
a sensor element that includes a body having a thickness no greater than 280 µm, a recessed portion and a pressure sensitive element that extends over said recessed portion;
an electric circuit operatively connected to said pressure sensitive element, wherein said circuit includes a pressure signal generating circuit element configured to provide a signal when a force is exerted on said pressure sensitive element; and
a load amplification element in operative contact with said pressure sensitive element, wherein said load amplification element comprises an electro-plated bump.

46. An apparatus, comprising:
a sensor element that includes a body having a thickness no greater than 280 µm, a recessed portion and a pressure sensitive element that extends over said recessed portion; and
an electric circuit operatively connected to said pressure sensitive element, wherein said circuit includes a pressure signal generating circuit element configured to provide a signal when a force is exerted on said pressure sensitive element, wherein said electric circuit comprises implant material implanted into said pressure sensitive element, wherein said pressure sensitive element comprises a substrate selected from the group consisting of an N type substrate, a P type substrate, an N type well in a P type substrate and a P type well in an N type substrate, wherein when said substrate comprises an N type well in a P type substrate said implant comprises a P type implant and when said substrate comprises a P type well in an N type substrate said implant comprises an N type implant.

47. An apparatus, comprising:
a sensor element that includes a body having a thickness no greater than 280 µm, a recessed portion and a pressure sensitive element that extends over said recessed portion; and
an electric circuit operatively connected to said pressure sensitive element, wherein said circuit includes a pressure signal generating circuit element configured to, provide a signal when a force is exerted on said pressure sensitive element, wherein said electric circuit comprises implant material implanted into said pressure sensitive element, wherein said pressure sensitive element comprises a substrate selected from the group consisting of an N type substrate, a P type substrate, an N type well in a P type substrate and a P type well in an N type substrate and wherein said implant material has been annealed.

48. An apparatus, comprising:
a sensor element that includes a body having a thickness no greater than 280 µm, a recessed portion and a pressure sensitive element that extends over said recessed portion; and
an electric circuit operatively connected to said pressure sensitive element, wherein said circuit includes a pressure signal generating circuit element configured to provide a signal when a force is exerted on said pressure sensitive element, wherein said pressure sensitive element comprises a diaphragm, and further comprises a thermal compensator comprising at least one piezoresistive circuit operatively placed on said diaphragm, wherein said pressure signal generating circuit element comprises at least one piezoresistive circuit operatively placed on said diaphragm.

49. An apparatus, comprising:
a sensor element that includes a body having a thickness no greater than 280 µm, a recessed portion and a pressure sensitive element that extends over said recessed portion; and
an electric circuit operatively connected to said pressure sensitive element, wherein said circuit includes a pressure signal generating circuit element configured to provide a signal when a force is exerted on said pressure sensitive element, wherein said sensor element comprises single crystal silicon, wherein said single crystal silicon comprises a <100> crystalline axis and a <110> crystalline axis, wherein a thermal compensator is operatively placed on said <100> crystalline axis and wherein said pressure signal circuit element is operatively placed on said <110> crystalline axis for p-type piezoresistors in a (100) wafer.

50. The apparatus of claim 49, wherein said thermal compensator comprises a first pair of piezoresistive circuits located about 180 degrees apart and wherein said pressure signal circuit element comprises a second pair of piezoresistive circuits located about 180 degrees apart.

51. An apparatus, comprising:
a sensor element that includes a body having a thickness no greater than 280 µm, a recessed portion and a pressure sensitive element that extends over said recessed portion;
an electric circuit operatively connected to said pressure sensitive element, wherein said circuit includes a pressure signal generating circuit element configured to provide a signal when a force is exerted on said pressure sensitive element; and a package, wherein said sensor element is located within said package to provide a packaged sensor element, wherein said sensor element together with said package comprises a total thickness no greater than 300 μm, wherein said package comprises a base layer, a mid-layer with an opening for said sensor element, and a capping layer, wherein said mid-layer is between said base layer and said capping layer, wherein a conductive trace is located between said base layer and said mid-layer and is in electrical contact with said electrical circuit and wherein at least one of said base layer, said mid-layer or said capping layer comprises a B-stage polyimide.

52. An apparatus, comprising:
a sensor element that includes a body having a thickness no greater than 280 μm, a recessed portion and a pressure sensitive element that extends over said recessed portion;
an electric circuit operatively connected to said pressure sensitive element, wherein said circuit includes a pressure signal generating circuit element configured to provide a signal when a force is exerted on said pressure sensitive element;
a package, wherein said sensor element is located within said package to provide a packaged sensor element, wherein said sensor element together with said package comprises a total thickness no greater than 300 μm, wherein said package comprises a base layer, a mid-layer with an opening for said sensor element, and a capping layer, wherein said mid-layer is between said base layer and said capping layer; and
a compliant layer attached to said base layer on the side of said base layer opposite to that of said mid-layer.

53. An apparatus, comprising:
a sensor element that includes a body having a thickness no greater than 280 μm, a recessed portion and a pressure sensitive element that extends over said recessed portion; and
an electric circuit operatively connected to said pressure sensitive element, wherein said circuit includes a pressure signal generating circuit element configured to provide a signal when a force is exerted on said pressure sensitive element, wherein said electric circuit comprises implant material implanted into said pressure sensitive element, wherein said pressure sensitive element comprises a substrate selected from the group consisting of an N type substrate, a P type substrate, an N type well in a P type substrate and a P type well in an N type substrate, wherein said implant material is electrically connected, at a bond pad, to a conductor that extends off of said sensor element, wherein said bond pad is stress shielded to prevent damage to said conductor.

54. An apparatus, comprising:
a sensor element that includes a body having a thickness no greater than 280 μm, a recessed portion and a pressure sensitive element that extends over said recessed portion;
an electric circuit operatively connected to said pressure sensitive element, wherein said circuit includes a pressure signal generating circuit element configured to provide a signal when a force is exerted on said pressure sensitive element, wherein said sensor element is one of a plurality of sensor elements; and
means for connecting said plurality of sensor elements together, wherein said means for connecting comprise an extensible interconnect that allows complex curvature conformability, wherein said flexible interconnect comprises a metal trace on a silicon spring.

* * * * *